United States Patent [19]
Yoshimura et al.

[11] Patent Number: 5,950,013
[45] Date of Patent: Sep. 7, 1999

[54] MEMORY CARD WITH SUBMEMORY

[75] Inventors: Yoshimasa Yoshimura, Tokyo; Masanori Takao, Sanda, both of Japan

[73] Assignee: Mitsubishi Denki Kabushiki Kaisha, Tokyo, Japan

[21] Appl. No.: 08/908,596

[22] Filed: Aug. 8, 1997

[30] Foreign Application Priority Data

Mar. 17, 1997 [JP] Japan ..................................... 9-063012

[51] Int. Cl.⁶ ..................................................... G06F 15/00
[52] U.S. Cl. .......................... 395/825; 395/186; 235/492; 365/52
[58] Field of Search ............................. 235/492; 395/186, 395/825; 365/52

[56] References Cited

U.S. PATENT DOCUMENTS 5,875,349  2/1999  Cornaby et al. ..................... 395/825

FOREIGN PATENT DOCUMENTS 4-15847    1/1992  Japan .
5-135566   6/1993  Japan .
6-89377    3/1994  Japan .

Primary Examiner—Harold I. Pitts
Attorney, Agent, or Firm—McDermott, Will & Emery

[57] ABSTRACT

A memory card consisting of volatile memory that is used connected to a host system apparatus and operated by a power supplied from said host system apparatus, comprises a main memory consisting of volatile memory and a submemory consisting of flash memory wherein when the power is tuned off, the host system apparatus copies data stored in the main memory into the submemory at addresses, corresponding to addresses of the main memory, and when the power is turned on, the host system apparatus writes data stored in the submemory into the main memory at the original addresses.

20 Claims, 40 Drawing Sheets

MEMORY CARD WITH SUBMEMORY

BACKGROUND OF THE INVENTION

1. Field of the Invention

The present invention relates to memory cards, and particularly to memory cards where batteries are used to make a backup of volatile memory.

2. Description of the Related Art

FIG. 41 is a block diagram illustrating an example of prior memory cards that use batteries. In FIG. 41, a memory card 300 comprises a memory section 301 that consists in an IC memory of SRAM, a power supply control section 302 that consists in a power supply IC that controls the power supply to memory section 301, and a primary battery 303 for a backup. When memory card 300 is connected to a host system apparatus 305, an external power supply Vcc is provided to power supply control section 302 by host system apparatus 305. Power supply control section 302 supplies the source voltage Vcc provided by host system apparatus 305 directly to memory section 301 regardless of primary battery 303. When a backup of data in memory card is made by primary battery 303, the voltage of primary battery 303 becomes the source voltage for memory section 301 to retain data stored in memory section 301.

As described above, prior memory card 300 has to replace primary battery 303 with a new one, before the voltage of the primary battery 303 declines. Therefore, when using memory card 300, one must care about battery life, because data disappears if the voltage of primary battery 303 declines. Further, phenomena inherent in RAM, such as changes in data due to α rays, occur during a backup of data in the SRAM, so that soft errors occur with a certain probability.

SUMMARY OF THE INVENTION

The present invention has been therefore devised to solve the above problems. Its object is to provide memory cards that use volatile memory, can be used without caring about battery life, and can prevent soft errors during a data backup.

According to the present invention, in a memory card that is used by being connected to a host system apparatus that consists in data processing equipment, operates by a power supply provided by the host system apparatus, and uses volatile memory, the memory card has a main memory section consisting in volatile memory and a submemory section consisting in flash memory. When the power is tuned off, the host system apparatus copies data stored in the main memory into the submemory section, corresponding to addresses of the main memory section. When the power is turned on, the host system apparatus writes data stored in the submemory section into the main memory section at the original addresses.

The host system apparatus memorizes the addresses of the main memory section at which data has been stored, during the time after the power is turned on and before the power is turned off. The host system apparatus copies data stored in the main memory section at the memorized addresses into the submemory section, corresponding to addresses of the main memory section, when the power is turned off. The host system apparatus writes data stored in the submemory section into the main memory section at the original addresses.

The memory card of the present invention further has a battery that is used for a backup of the main memory section and a power switching section that switches between the power supplies provided by the host system apparatus and by the battery to supply source power to the main memory section. The power switching section preferably supplies source power to the main memory section using the battery, when the power provided by the host system apparatus is cut off.

When writing data into the main memory section, the host system apparatus preferably also writes information about the time spent for writing the data. When the power is turned on, the host system apparatus preferably reads out the latest time information stored in the main memory section and the submemory section to determine which of the data stored in the main memory section and the data stored in the submemory section to use.

Further, the host system apparatus preferably adds an error-correcting code to data stored in the main memory section to write into the submemory section, and writes data stored in the submemory section into the main memory section after performing an error correction procedure using the added error-correcting code.

Further, the host system apparatus adds a copy of the data and a checksum to data stored in the main memory section to write into the submemory section, and writes data stored in the submemory section into the main memory section after performing an error correction procedure using the added copy and checksum.

The host system apparatus may compress data stored in the main memory section to write into the submemory section following a predetermined method, and may decompress data stored in the submemory section following a predetermined method to write into the main memory section.

Still further, the host system apparatus may encipher data stored in the main memory section following a predetermined method to write into the submemory section. The host system apparatus may read out data stored in the submemory section only if a password input from the host system apparatus agrees with a preset password, and may decipher the read data following a predetermined method to write into the main memory section.

In a second memory card of the present invention that is used by being connected to a host system apparatus consisting in information processing equipment, operates by a power supply provided by the host system apparatus, and uses volatile memory, the memory card has a main memory section that consists in volatile memory, a submemory section that consists in flash memory, a clock generator that generates and outputs a clock signal, and a control section that operates based on the clock signal output from the clock generator and copies data between the main memory section and the submemory section.

In the second memory card, when receiving a predetermined power-off signal output from the host system apparatus at the power-off time, the control section may write all the data stored in the main memory section into the submemory section, corresponding to addresses of the main memory section. Alternatively, when receiving a write-enable signal output from the host system apparatus during the writing of data into the main memory section, the control section may write data stored in the main memory section into the submemory section, corresponding to addresses of the main memory section. Alternatively, when receiving a write-enable signal output from the host system apparatus during the writing of data into the main memory section, the control section may memorize the addresses of the main memory section at which data is stored; when receiving a predetermined power-off signal output from the host system apparatus at the power-off time, the control section may write data stored at the memorized addresses of the main memory section into the submemory section, corresponding to addresses of the main memory section. In each of these alternatives, when receiving a predetermined power-on signal output from the host system apparatus at the power-on time, the control section writes all the data stored in the submemory section into the main memory section at the original addresses.

The second memory card of the present invention has preferably a control section that operates based on the clock signal output from the clock generator and to copy data between the main memory section and the submemory section, a battery that supplies power to each section of the memory card, and a power switching section that detects whether power is provided by the host system apparatus or not, to supply power to each section of the memory card by switching between the power provided by the host system apparatus and the power provided by the battery. The power switching section supplies power to each section of the memory card using the battery, when the power provided by the host system apparatus is cut off. In that case, when the power provided by the host system apparatus is cut off, the power switching section preferably outputs a predetermined power-off detection signal into the control section. When receiving the power-off detection signal, the control section writes all the data stored in the main memory section into the submemory section, corresponding to addresses of the main memory section. Alternatively, when the power provided by the host system apparatus is cut off, the power switching section may output a predetermined power-off detection signal into the control section. When receiving a write-enable signal output from the host system apparatus during the writing of data in the main memory section, the control section memorizes the addresses of the main memory section at which data is written. When receiving the power-off detection signal output from the power switching section, the control section writes data stored at the memorized addresses of the main memory section into the submemory section, corresponding to addresses of the main memory section. In either alternative, when power is provided by the host system apparatus, the power switching section supplies power to each section of the memory card using the power provided by the host system apparatus and outputs a predetermined power-on detection signal into the control section. When receiving the power-on detection signal, the control section writes all the data stored in the submemory section into the main memory section at the original addresses.

In the second memory card, the control section may add an error-correcting code to data stored in the main memory section to write into the submemory section, and may write data stored in the submemory section into the main memory section after performing an error correction procedure using the added error-correcting code. The control section may add a copy of the data and a checksum to data stored in the main memory section to write into the submemory section, and may write data stored in the submemory section into the main memory section after performing an error correction procedure using the added copy and checksum. The control section may compress data stored in the main memory section to write into the submemory section following a predetermined method, and may decompress data stored in the submemory section following a predetermined method to write into the main memory section.

In the second memory card of the present invention, the control section may encipher data stored in the main memory section following a predetermined method to write into the submemory section. The control section may read out data stored in the submemory section only if a password input from the host system apparatus agrees with a preset password, and may decipher the read data following a predetermined method to write into the main memory section.

In a memory card of the present invention, the host system apparatus may output a write-enable signal into the main memory section and the control section and may write into the main memory section data stored in the memory card and address data about the addresses at which the data is written. In this case, when receiving the write-enable signal, the control section writes data stored in the main memory section into the submemory section at the addresses indicated by the address data stored in the main memory section.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which:

FIG. 3 is a flowchart illustrating an example of operation of the host system 5 for the memory card 1 of FIG. 1 at the time when the power is turned on.

FIG. 6 is a flowchart illustrating an example of operation of the host system apparatus 26 for the memory card 25 of FIG. 5 at the time when the power is turned on.

FIG. 9 is a flowchart illustrating an example of operation of the memory card 35 of FIG. 7 at the time when the power supply is turned on.

FIG. 12 is a flowchart illustrating an example of operation of the control section 31 of FIG. 10 at the time when the power is turned on.

FIG. 17 is a flowchart illustrating an example of operation of the memory card 75 in FIG. 15 at the time when the power is turned on.

FIG. 20 is a flowchart illustrating an example of operation of the control section 73 in FIG. 15 at the time when the power is turned on.

FIG. 22 is a flowchart illustrating an example of operation of memory cards in the sixth embodiment at the time when the power is turned on.

FIG. 25 is a flowchart illustrating an example of operation of the control section 91 in FIG. 23 at the time when the power is turned on.

FIG. 29 is a flowchart illustrating an example of operation of the control section 101 in FIG. 26 at the time when the power is turned on.

FIG. 32 is a flowchart illustrating an example of operation of the control section 111 in FIG. 30 at the time when the power is turned on.

FIG. 35 is a flowchart illustrating an example of operation of the control section 121 in FIG. 33 at the time when the power is turned on.

DETAILED DESCRIPTION OF THE PREFERRED EMBODIMENTS

The preferred embodiments according to the present invention will be described below in conjunction with the attached drawings.

First Embodiment

Figure 1:
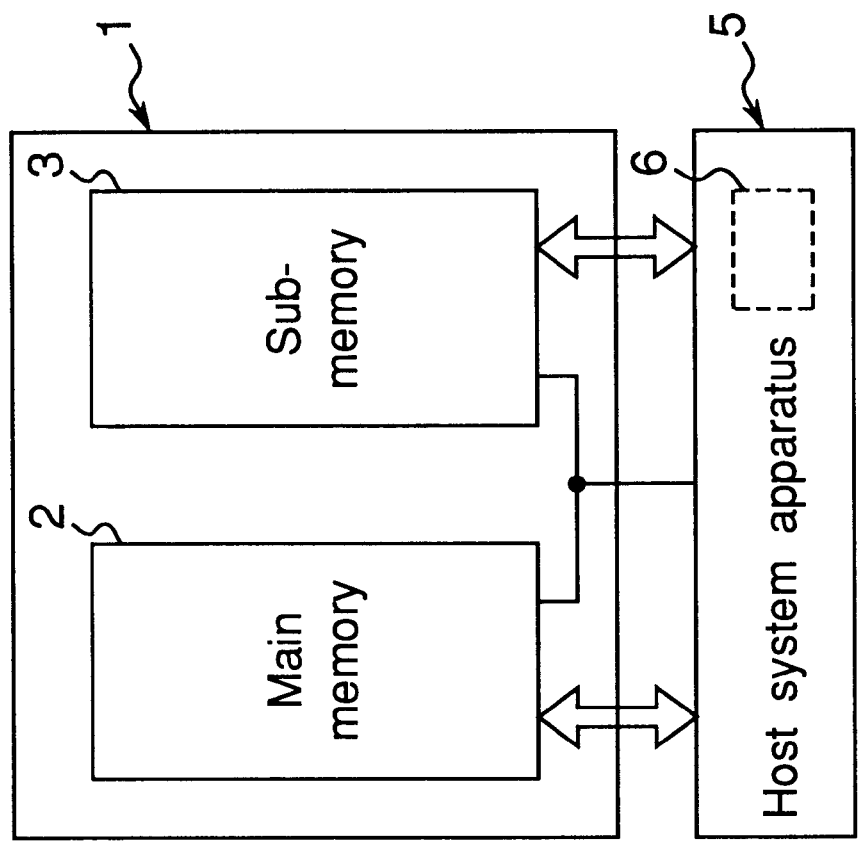
FIG. 1 is a block diagram illustrating an example of memory cards in a first embodiment of the present invention.

FIG. 1 is a block diagram illustrating an example of memory cards in a first embodiment of the present invention. Referring to FIG. 1, a memory card 1 comprises a main memory section 2 consisting in SRAM and a submemory section 3 consisting in flash memory. Main memory section 2 and submemory section 3 are connected to a host system apparatus 5 consisting in information processing equipment. Submemory section 3 has a memory size larger than that of main memory section 2.

In the above construction, host system apparatus 5 provides a power supply to main memory section 2 and submemory section 3. Host system apparatus 5 accesses main memory section 2 to read and write data from and into main memory section 2. When the operator performs an action of turning off the power of host system apparatus 5, host system apparatus 5 automatically copies all the data stored in main memory section 2 into submemory section 3 through a buffer 6. After finishing the processing that copies all the data stored in main memory section 2 into submemory section 3, host system apparatus 5 cuts off the power supply to memory card 1 and turns off the power of host system apparatus 5.

Next, when the power of host system apparatus 5 is turned on, host system apparatus 5 supplies power to memory card 1, reads out data stored in submemory section 3 of memory card 1, and writes the data into main memory section 2 through buffer 6 to copy all the data stored in submemory section 3 into main memory section 2. After the completion of copying into main memory section 2, host system apparatus 5 uses memory card 1 as a conventional memory card for reading and writing data from and into main memory section 2.

Figure 2:
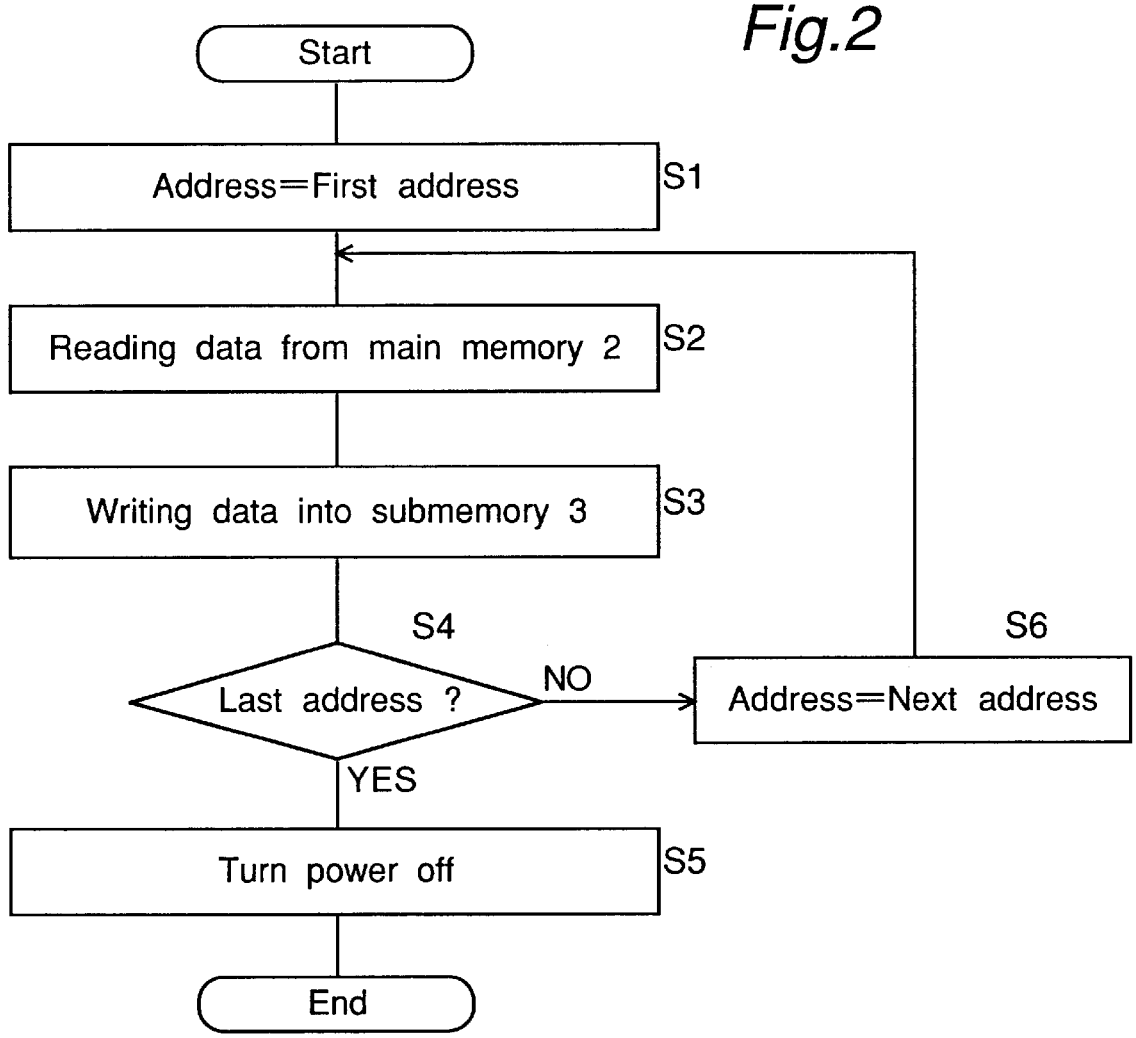
FIG. 2 is a flowchart illustrating an example of operation of the host system apparatus 5 for the memory card 1 of FIG. 1 at the time when the power is turned off.

FIG. 2 is a flowchart illustrating an example of operation by host system apparatus 5 for the memory card 1 of FIG. 1 at the time when the power is turned off. In FIG. 2, all the processing in the flow is performed by host system apparatus 5, unless otherwise mentioned.

Referring to FIG. 2, in step S1, when the operator performs an action of turning off the power, host system apparatus 5 reads out a predetermined initial address, for example, the first address of main memory section 2 from which data is read out. Next, in step S2, host system apparatus 5 reads out data from the assigned address of main memory section 2 to transfer into buffer 6. In step S3, host system apparatus 5 writes the data transferred into buffer 6 into submemory section 3, corresponding to the address of main memory section 2.

Next, in step S4, host system apparatus 5 tests whether the address of the data read out from main memory section 2 is the last address. If it is (YES), then in step S5, host system apparatus 5 cuts off the supply of power to memory card 1 and turns off the power of host system apparatus 5, since data stored in main memory section 2 has been already copied into submemory section 3. In this way, the present flow terminates. If the data address is not the last address in step S4 (NO), then in step S6, host system apparatus 5 reads out data stored in the next address of main memory section 2 to return to step S2.

Figure 3:
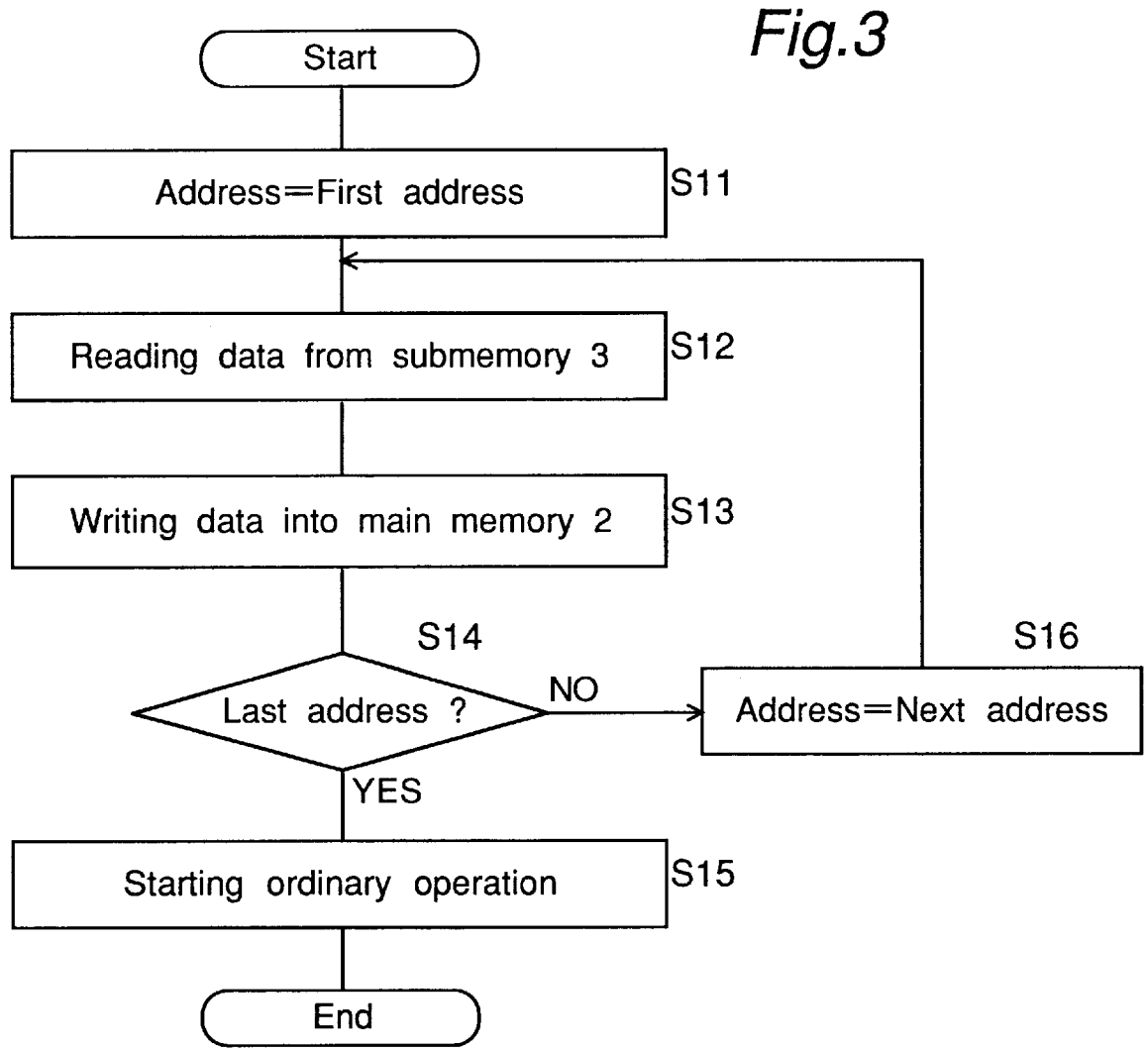

FIG. 3 is a flowchart illustrating an example of operation by host system 5 for the memory card 1 of FIG. 1 at the time when the power is turned on. In FIG. 3, all the processing in the flow is performed by host system apparatus 5, unless otherwise mentioned.

Referring to FIG. 3, in step S11, when the operator performs an action of turning on the power, host system apparatus 5 reads out a predetermined initial address, for example, the first address of submemory section 3 from which data is read out. Next, in step S12, host system apparatus 5 reads out data from the assigned address of submemory section 3 to transfer into buffer 6. In step S13, host system apparatus 5 writes the data transferred into buffer 6 into main memory section 2 at the original address at which the data was stored.

Next, in step S14, host system apparatus 5 tests whether the address of the data read out from submemory section 3 is the last address. If it is (YES), then in step S15, host system apparatus 5 terminates the flow for the operation at the time of turning the power on to start normal operation, since all the data stored in submemory section 3 has been already copied into main memory section 2. If the data address is not the last address in step S14 (NO), then in step S16, host system apparatus 5 reads out data stored at the next address of submemory section 3 to return to step S12.

Incidentally, as a modification of the memory card in the first embodiment, a read-only memory consisting in SRAM may be installed in main memory section 2. In this case, a read-only memory consisting in flash memory may be installed in submemory section 3.

Figure 4:
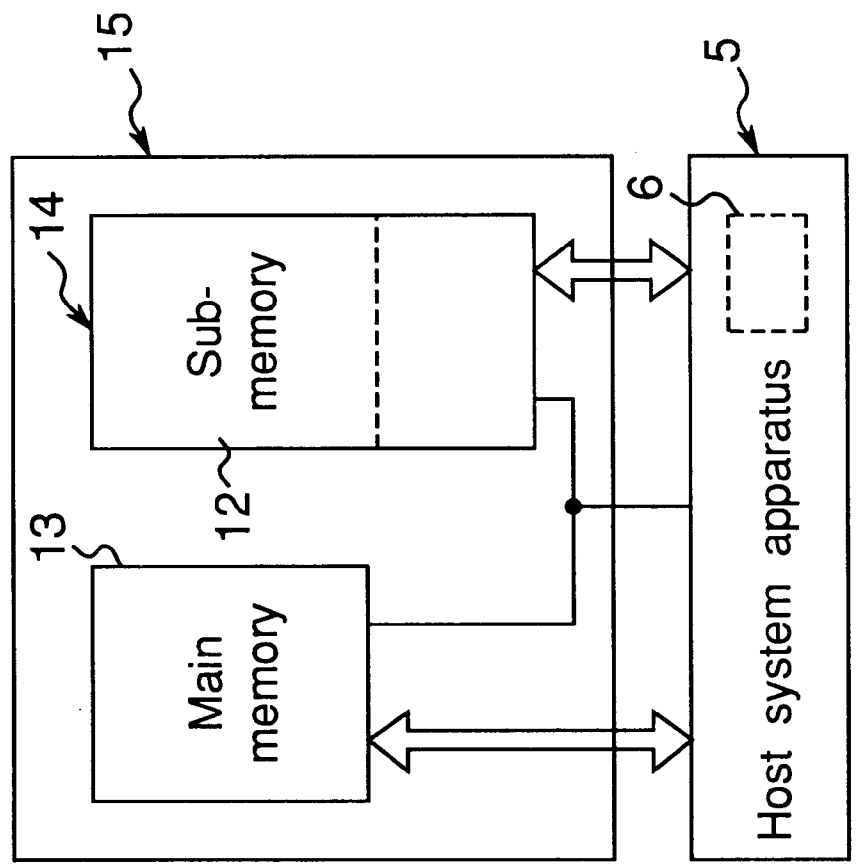
FIG. 4 is a block diagram illustrating an example of modified memory cards in the first embodiment of the present invention.

FIG. 4 is a block diagram illustrating an example of modified memory cards in the first embodiment of the present invention. In FIG. 4, the same components as in FIG. 1 are denoted by the same numerals, their descriptions are omitted from here, and only those different from FIG. 1 are described.

The memory card of FIG. 4 differs from that of FIG. 1 in that a read-only data-storage area 11 is installed in submemory section 3. Therefore, submemory section 3 has the read-only data-storage area 11 and an ordinary data-storage area 12 for both read and write operations. The main memory section 2 in FIG. 1 is now a main memory section 13, and the submemory section 3 in FIG. 1 is now a submemory section 14. The memory card 1 of FIG. 1 is now a memory card 15 with these changes.

Referring to FIG. 4, memory card 15 comprises a main memory 13 consisting in SRAM and a submemory section 14 consisting in flash memory. Submemory section 14 comprises a read-only data-storage area 11 and an ordinary data-storage area 12 for both read and write operations. Main memory section 13 and submemory section 14 are connected to a host system apparatus 5. The ordinary data-storage area 12 in submemory section 14 has a memory size larger than that of main memory section 13.

Host system apparatus 5 provides a power supply to main memory section 13 and submemory section 14. Host system apparatus 5 ordinarily accesses main memory section 13 and read-only data-storage area 11 of submemory section 14. Host system apparatus 5 reads and writes data from and into main memory section 13 and reads data from read-only data-storage area 11 of submemory section 14.

When the operator performs the operation of turning the power off, host system apparatus 5 automatically copies all the data stored in main memory section 13 into ordinary data-storage area 12 of submemory section 14 through buffer 6. After finishing the processing that copies all the data stored in main memory section 13 into ordinary data-storage area 12 of submemory section 14, host system apparatus 5 cuts off the power supply to memory card 15 and turns off the power of host system apparatus 5.

Next, when the power of host system apparatus 5 is turned on, host system apparatus 5 supplies power to memory card 15, reads out data stored in ordinary data-storage area 12 of submemory section 14 of memory card 15, and writes the data into main memory section 13 through buffer 6 to copy all the data stored in ordinary data-storage area of submemory section 14 into main memory section 13. After the completion of copying into main memory section 13, host system apparatus 5 uses memory card 15 as a conventional memory card for reading and writing data from and into main memory 13 and for reading data from read-only data-storage area 11 of submemory section 14.

As described above, in the memory card of present first embodiment, when the power of host system apparatus 5 is turned off with a predetermined action by the operator, data stored in the main memory section consisting in SRAM is copied for a backup into the submemory section consisting in flash memory. Therefore, a battery for making a backup of data stored in SRAM is not required. Also, changes in data occurring in volatile memory during a backup can be reduced, so that incidents of soft errors can be prevented.

Second Embodiment

In the above first embodiment, when power supplied to the host system apparatus 5 from the outside is accidentally cut off, a backup of data stored in the main memory section cannot be made. However, a secondary battery for a backup may be installed in the main memory section. A memory card constructed for this purpose is a second embodiment of the present invention.

Figure 5:
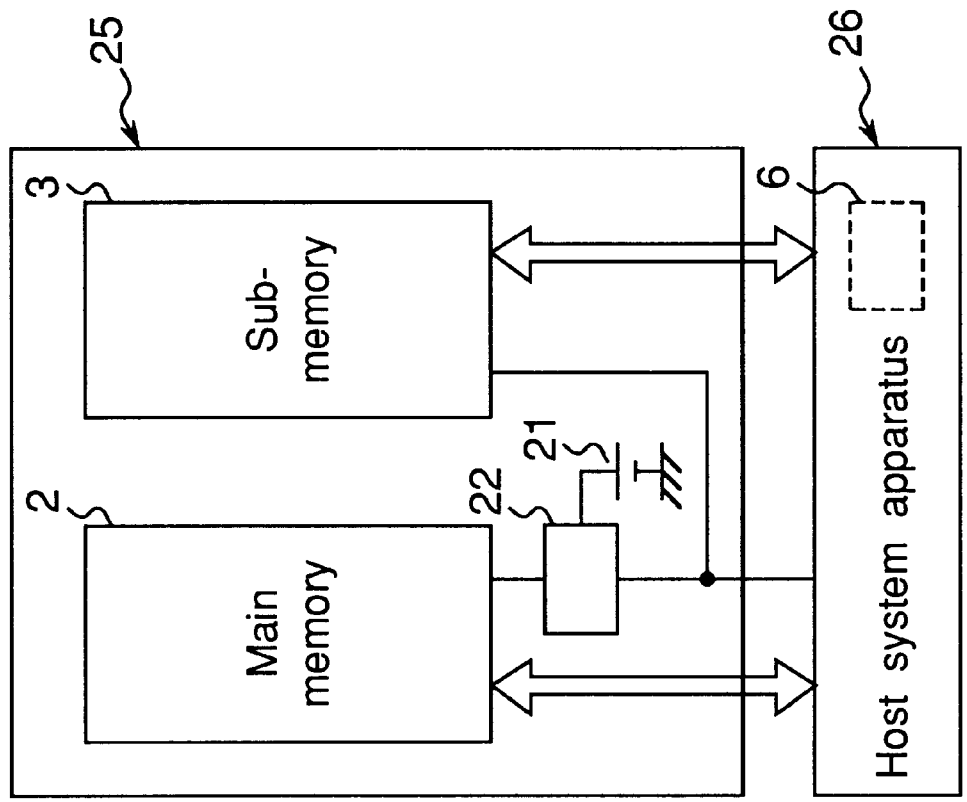
FIG. 5 is a block diagram illustrating an example of memory cards in a second embodiment of the present invention.

FIG. 5 is a block diagram illustrating an example of memory cards in the second embodiment of the present invention. In FIG. 5, the same components as in FIG. 1 are denoted by the same numerals, their descriptions are omitted from here, and only those different from FIG. 1 are described.

The memory card of FIG. 5 differs from that of FIG. 1 as follows. There are additionally installed in the memory card 1 of FIG. 1 a secondary battery 21 that supplies power for making a backup of data stored in main memory section 2 and a power switching section 22 that switches between the power supplies provided by host system apparatus 5 and the power provided by secondary battery 21 to supply power to main memory section 2. The memory card 1 of FIG. 1 is now a memory card 25 with these changes. Further, the host system 5 of FIG. 1 is now a host system apparatus 26, since it performs the control of a time stamp and differently operates at the time of turning the power on.

Referring to FIG. 5, memory card 25 comprises a main memory section 2, a submemory section 3, a secondary battery 21, and a power switching section 22. Main memory section 2 and submemory section 3 are connected to a host system apparatus 26. Power lines from host system apparatus 26 are connected to submemory section 3 and power switching section 22. Power switching section 22 is connected to main memory section 2 and to the positive terminal of secondary battery 21; the negative terminal of secondary battery 21 is grounded.

In the above construction, when power is provided by host system apparatus 26, power switching section 22 supplies the power provided by host system apparatus 26 to main memory section 2 and charges secondary battery 21. When the power provided by host system apparatus 26 is cut off, power switching section 22 uses secondary battery 21 to make a backup of data stored in main memory section 2.

Host system apparatus 26 supplies power to submemory section 3 and power switching section 22 and ordinarily accesses main memory section 2 to read and write data from and into main memory section 2. Also, when storing data in main memory section 2, host system apparatus 26 performs the control of a time stamp that is written into main memory section 2. Here, when the operator performs the action of turning the power off, host system apparatus 26 automatically copies data stored in main memory section 2 into submemory section 3 through built-in buffer 6. After finishing the processing of copying all the data stored in main memory section 2 into submemory section 33, host system apparatus 26 cuts off the power supply to memory card 25 and turns off the power of host system apparatus 26.

When power supplied to host system apparatus 26 from the outside is accidentally cut off, or when a power failure occurs, data stored in main memory section 2 is not sheltered. However, when power provided by host system apparatus 26 ceases with the accidental cut-off or power faire, power switching section 22 makes a backup of data stored in main memory section 2 using secondary battery 21, so that data stored in main memory section 2 is prevented from being lost. However, it is difficult for host system apparatus to judge whether power has been turned on by the operator, or power has be turned on with a recovery from the accidental cut-off or power failure.

Therefore, when power is turned on, host system apparatus 26 supplies power to memory card 25 and reads the latest time information stored in main memory section 2 and in submemory section 3 to show it to the operator. The operator makes a choice between using data stored in main memory section 2 and using data stored in submemory section 3, based on the time information. If the operator makes the choice of using data stored in main memory section 2, then host system apparatus 26 uses memory card 25 as a conventional memory card for reading and writing data from and into main memory section 2.

If the operator makes the choice of using data stored in submemory section 3, then host system apparatus 26 reads out data stored in submemory section 3 and writes it into main memory section 2 through buffer 6 to copy all the data stored in submemory section 3 into main memory section 2. After the completion of copying into main memory section 2, host system apparatus 26 uses memory card 25 as a conventional memory card for reading and writing data from and into main memory section 2.

Figure 25:
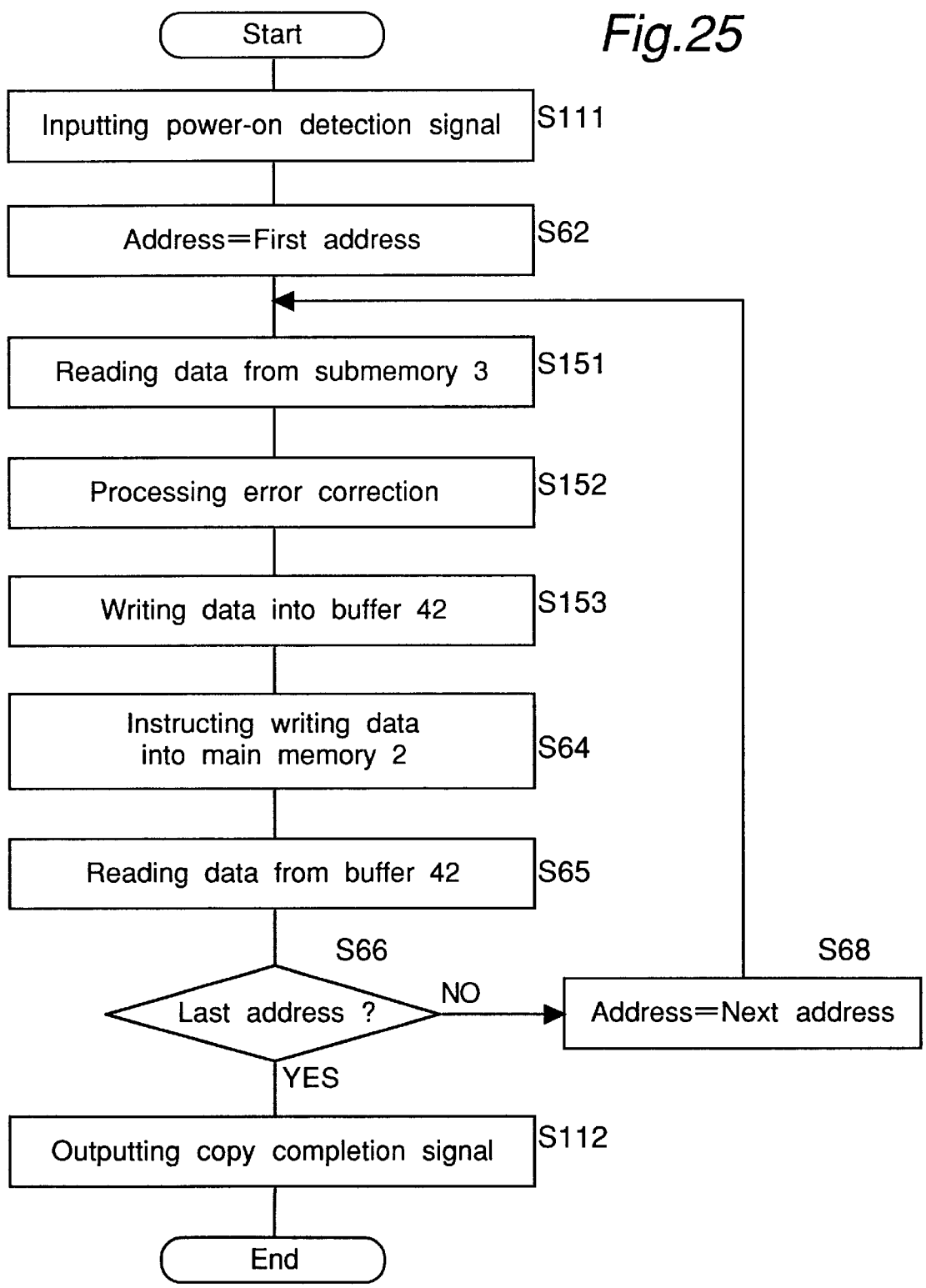

A flowchart illustrating an example of operation of the host system apparatus 26 for the memory card 25 shown in FIG. 25 at the time of turning the power off is the same as that for the host system apparatus 5, so that it is omitted from here.

Figure 6:
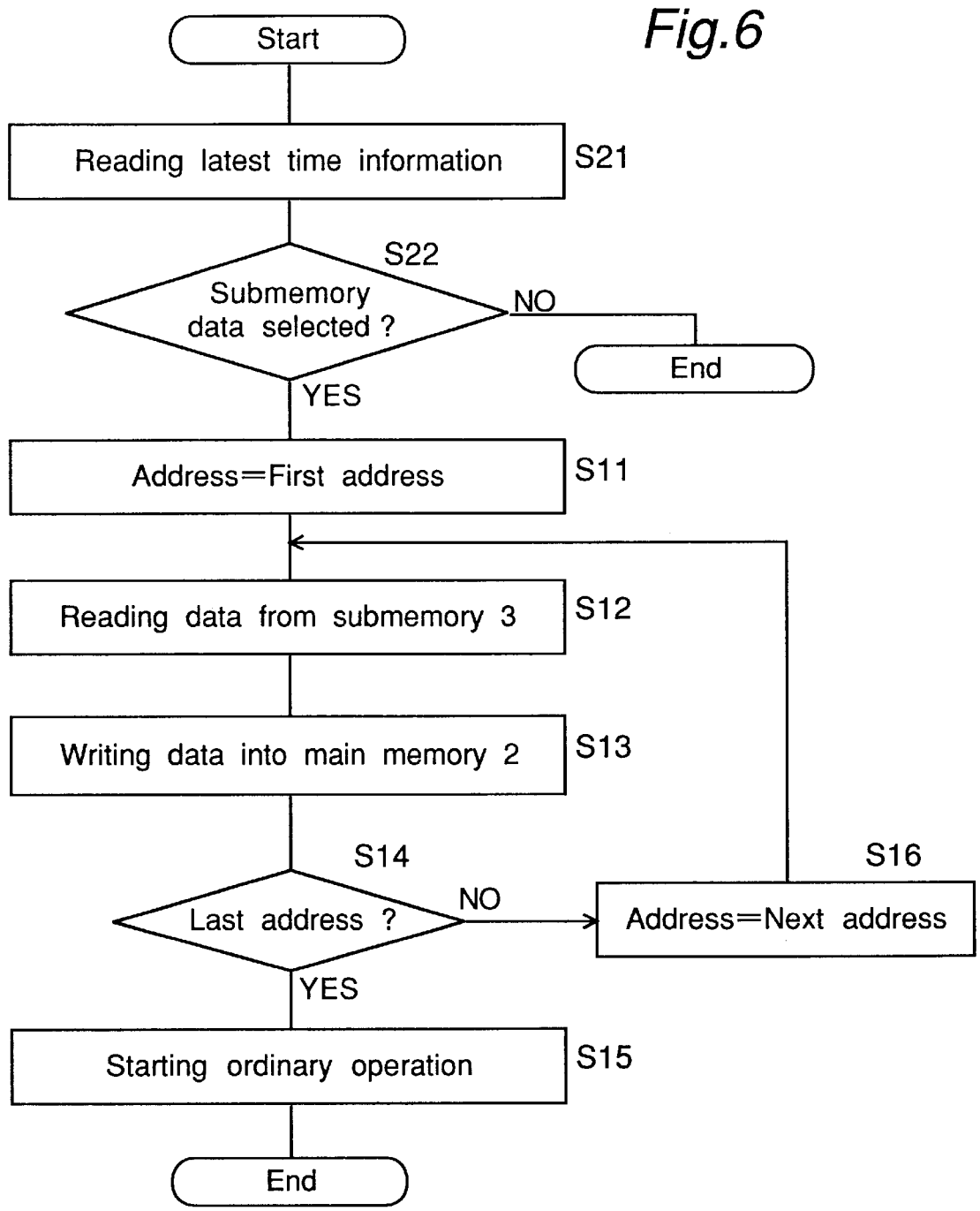

FIG. 6 is a flowchart illustrating an example of operation of the host system apparatus 26 for the memory card 25 of FIG. 5 at the time of turning the power on. In FIG. 6, all the processing in the flow is performed by host system apparatus 26, unless otherwise mentioned. Also, the same steps as in FIG. 3 except replacing the numeral of the host system is shown with the same numerals, and their descriptions are omitted from here.

Referring to FIG. 6, in step S21, when the power supply to host system apparatus 26 is turned on, host system apparatus 26 reads the latest time information from main memory section 2 and submemory section 3. In step S22, the host system apparatus 26 shows the time information to the operator, who makes a choice whether using data stored in main memory section 2 or not. If main memory section 2 is chosen (YES), then the present flow terminates, and host system apparatus 26 uses memory card 25 as a conventional memory card for reading and writing data from and into main memory section 2. If submemory section 3 is chosen in step S22 (NO), then the flow proceeds with step S11, and the processing from step S11 to S16 is performed.

As described above, in the memory card of present second embodiment, all the data stored in main memory section 2 consisting in SRAM is copied for a backup into submemory section 3 consisting in flash memory, at the time when the power of host system apparatus 26 is turned off with a predetermined action by the operator. Further, when power provided by host system apparatus 26 is accidentally cut off with an instantaneous power cut or a power failure, a backup of data stored in main memory section 2 is made by installed secondary battery 21. Therefore, changes in data that occur in volatile memory during a backup can be prevented. Further, when power provided by host system apparatus 26 is accidentally cut off, data stored in main memory section is not lost, so that continuous operation can be made possible with the latest data necessary to the operator.

Third Embodiment

In the memory cards of the above first and second embodiments, the operation of copying all the data stored in the main memory section into the submemory section and the operation of copying all the data stored in the submemory section into the main memory section are all performed by the host system apparatus. However, these operations can be performed by the memory cards. A memory card constructed for this purpose is a third embodiment of the present invention.

Figure 7:
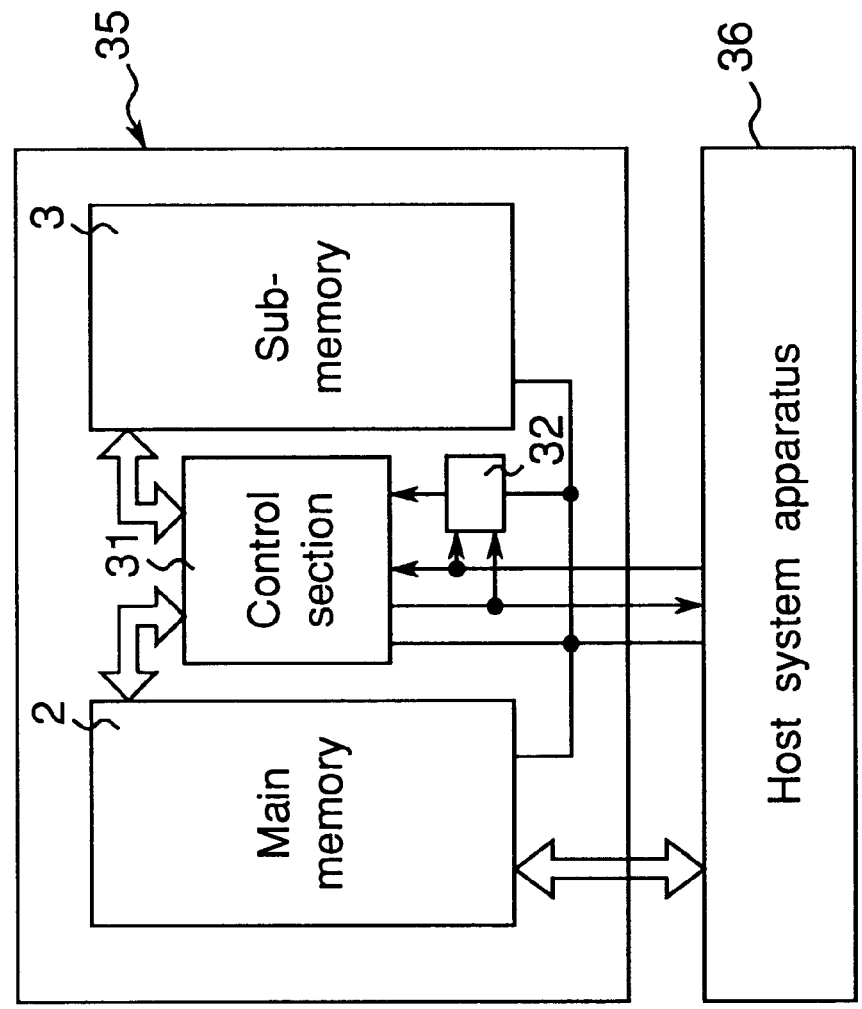
FIG. 7 is a block diagram illustrating an example of memory cards in a third embodiment of the present invention.

FIG. 7 is a block diagram illustrating an example of memory cards in a third embodiment of the present invention. In FIG. 7, the same components as in FIG. 1 or 2 are denoted by the same numerals, and their descriptions are omitted from here.

The memory card of FIG. 7 differs from that of FIG. 1 as follows. Added to the memory card 1 of FIG. 1 are a control section 31 that copies all the data stored in the main memory section into the submemory section and copies all the data stored in the submemory section into the main memory section and a clock generator 32 that provides a clock signal to control section 31. The memory card 1 has been changed into a memory card 35 with these changes. The host system apparatus 5 does not perform through buffer 6 the operation of copying all the data stored in the main memory section 2 into the submemory section 3 and the operation of copying all the data stored in the submemory section 3 into the main memory section 2. Therefore, the host system apparatus 5 of FIG. 1 has been changed into a host system apparatus 36.

Referring to FIG. 7, memory card 35 comprises a main memory section 2, a submemory section 3, a control section 31, and a clock generator 32. Main memory section 2 and submemory section 3 are connected to control section 31. Main memory section 2, control section 31, and clock generator 32 are connected to host system apparatus 36. Further, clock generator 32 is connected to control section 31.

In the above construction, host system apparatus 36 provides a power supply to memory card 35. Host system apparatus 36 ordinarily accesses main memory section 2 to read and write data from and into main memory section 2. When the operator performs an action of turning off the power, host system apparatus 36 outputs a predetermined power-off signal into control section 31 and clock generator 32. When receiving the power-off signal, clock generator 32 generates a clock signal to output into control section 31.

When receiving the power-off signal, control section 31 operates based on the clock signal input from clock generator 32 to copy all the data stored in main memory section 2 into submemory section 3, corresponding to addresses of main memory section 2. After finishing the processing that copies all the data stored in main memory section 2 into submemory section 3, control section 31 outputs a copy completion signal that indicates the completion of copying into host system apparatus 36. When receiving the copy completion signal, host system apparatus 36 cuts off the power supply to memory card 35 and turns off the power of host system apparatus 36.

Next, when the power of host system apparatus 36 is turned on, host system apparatus 36 supplies power to memory card 35, and outputs a predetermined power-on signal into control section 31 and clock generator 32. When receiving the power-on signal, clock generator 32 generates a clock signal to output into control section 31.

When receiving the power-on signal, control section 31 operates based on the clock signal output from clock generator 32 and reads data stored in submemory section 3 to write into main memory section 2. In this way, control section 31 copies all the data stored in submemory section 3 into main memory section 2. Further, after the completion of copying into main memory section 2, host system apparatus 36 outputs a copy completion signal into clock generator 32 and host system apparatus 36. When receiving the copy completion signal, clock generator 32 stops generating and outputting the clock signal. After receiving the copy completion signal, host system apparatus 36 uses memory card 35 as a conventional memory card for reading and writing data from and into main memory section 2.

Figure 8:
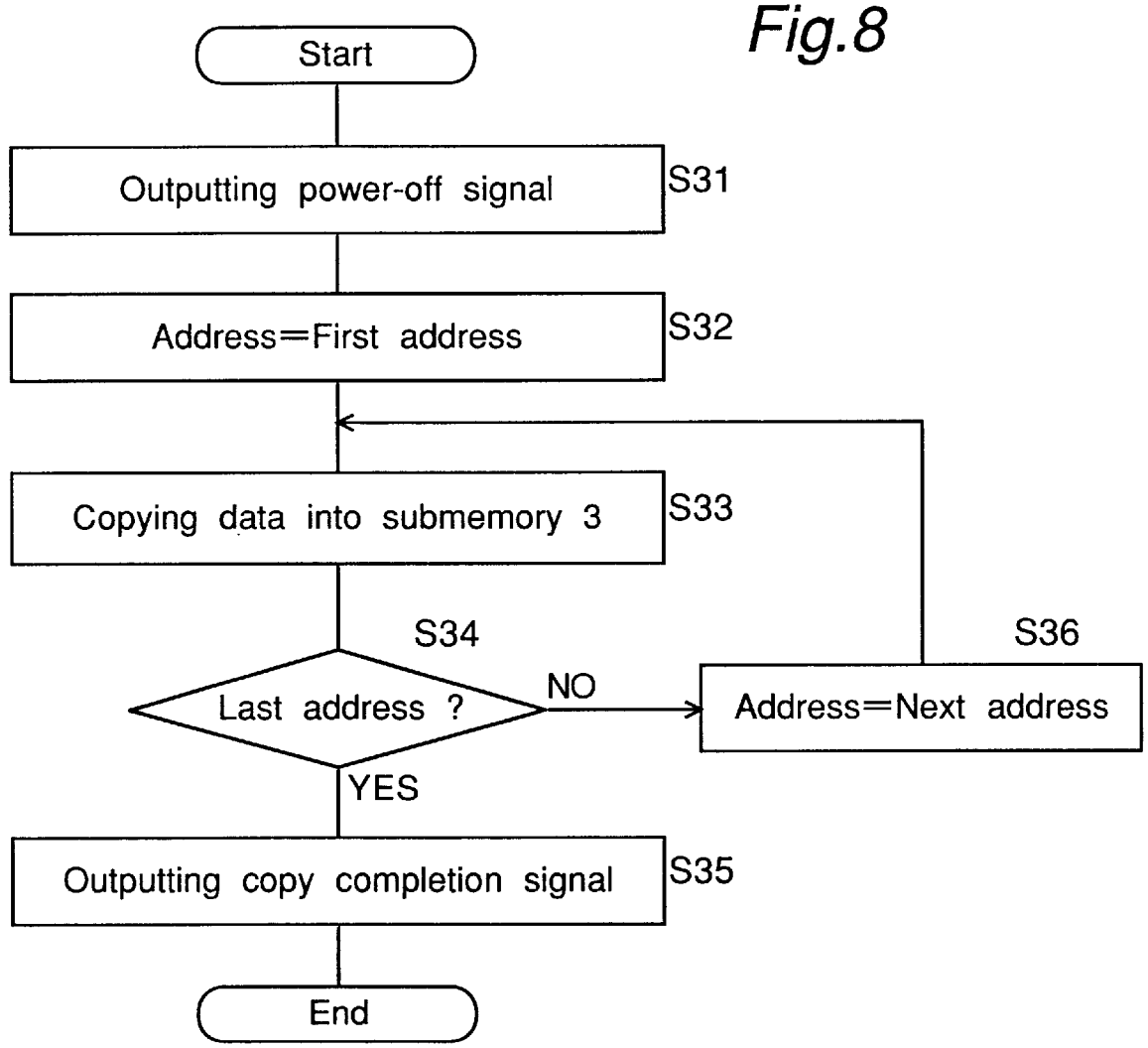
FIG. 8 is a flowchart illustrating an example of operation of the memory card 35 of FIG. 7 at the time when the power is turned off.

FIG. 8 is a flowchart illustrating an example of operation of the memory card 35 of FIG. 7 at the time when the power is turned off. Referring to FIG. 8, in step S31, when the operator performs an action of turning off the power of host system apparatus 36, host system apparatus 36 outputs a predetermined power-off signal into control section 31 and clock generator 32 of memory card 35. Next, in step S32, control section 31 operates based on the clock signal output from clock generator 32. Also, when receiving the power-off signal, control section 31 reads out a predetermined initial address, for example, the first address of main memory section 2, from which data is read out.

Next, in step S33, control section 31 reads out data from the assigned address of main memory section 2 to write into submemory section 3, corresponding to the address of main memory section 2 at which the data has been stored. Next, in step S34, control section 31 tests whether the address of the data read out from main memory section 2 is the last address. If it is (YES), then the flow proceeds with step S35.

In step S35, control section 31 outputs a copy completion signal into host system apparatus 36. When receiving the copy completion signal, host system apparatus 36 cuts off the supply of power to memory card 35 and turns off the power of host system apparatus 36 to terminate the present flow. If the data address is not the last address in step S34 (NO), then in step S36, control section 31 reads out data stored at the next address of main memory section 2 to return to step S33.

Figure 9:
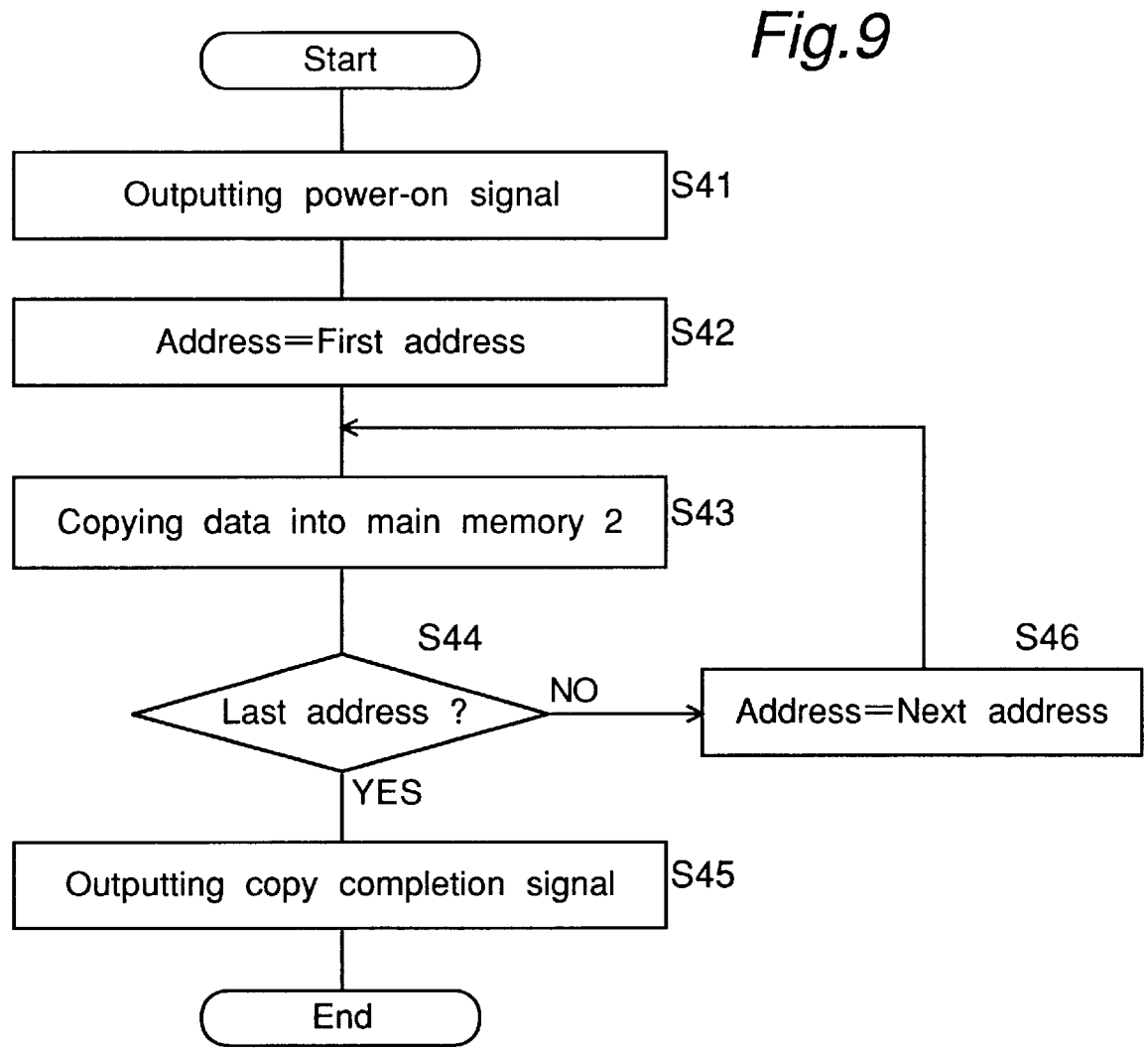

FIG. 9 is a flowchart illustrating an example of operation by the memory card 35 of FIG. 7 at the time when the power is turned on. Referring to FIG. 9, in step S41, when the power is turned on, host system apparatus 36 supplies power to memory card 35 and outputs a predetermined power-on signal into control section 31 and clock generator 32.

Next, in step S42, when receiving the power-on signal, control section 31 reads out a predetermined initial address, for example, the first address of submemory section 3 from which data is read out. In step S43, control section 31 reads out data from the assigned address of submemory section 3 to write into main memory section 2 at the original address at which the data was stored. In step S44, control section 31 tests whether the address of the data read out from submemory section 3 is the last address. If it is (YES), then the flow proceeds with step S45.

In step S45, control section 31 outputs a copy completion signal into clock generator 32 and host system apparatus 36. When receiving the copy completion signal, clock generator 32 stops generating and outputting the clock signal. After receiving the copy completion signal, host system apparatus 36 uses memory card 35 as a conventional memory card for reading and writing data from and into main memory section 2. In this way the flow terminates. If the data address is not the last address in step S44 (NO), then in step S46, control section 31 reads out data stored at the next address of submemory section 3 to return to step S43.

Figure 10:
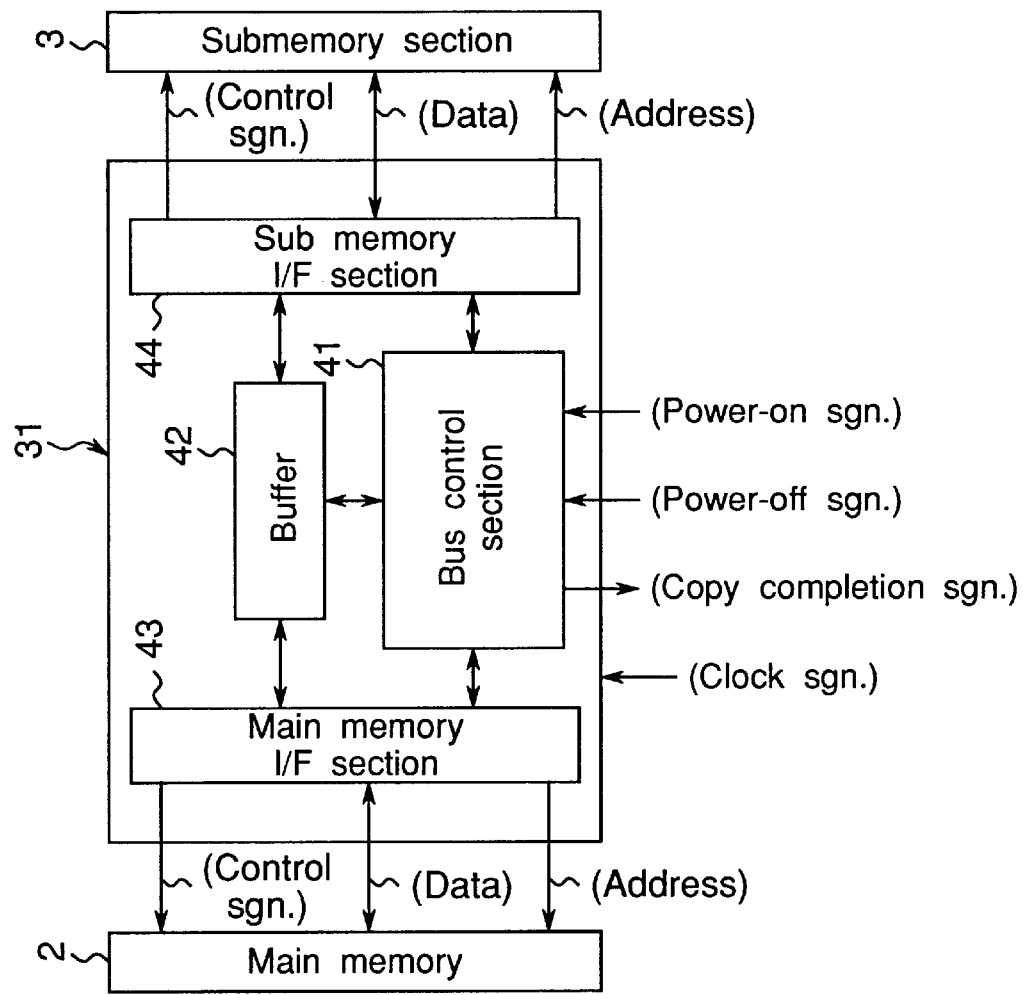
FIG. 10 is a block diagram illustrating an example of the control section 31 in FIG. 7.

FIG. 10 is a block diagram illustrating an example of control section 31. In FIG. 10, control section 31 comprises a bus controller 41, a buffer 42, a main memory interface 43 (called main memory I/F hereafter), and submemory interface (called submemory I/F hereafter) 44. Bus controller 41 is connected to buffer 42, main memory I/F 43, and submemory I/F 44. Buffer 42 is connected to main memory I/F 43 and submemory I/F 44.

Bus controller 41 controls buffer 42, main memory I/F 43, and submemory I/F 44, based on signals from host system apparatus 36. Based on a control signal of bus controller 41, main memory I/F 43 reads out data stored in main memory section 2 to write into buffer 42, or reads out data stored in buffer 42 to write into main memory section 2. Based on a control signal of bus controller 41, submemory I/F 44 reads out data stored in submemory section 3 to write into buffer 42, or reads out data stored in buffer 42 to write into submemory section 3.

Figure 11:
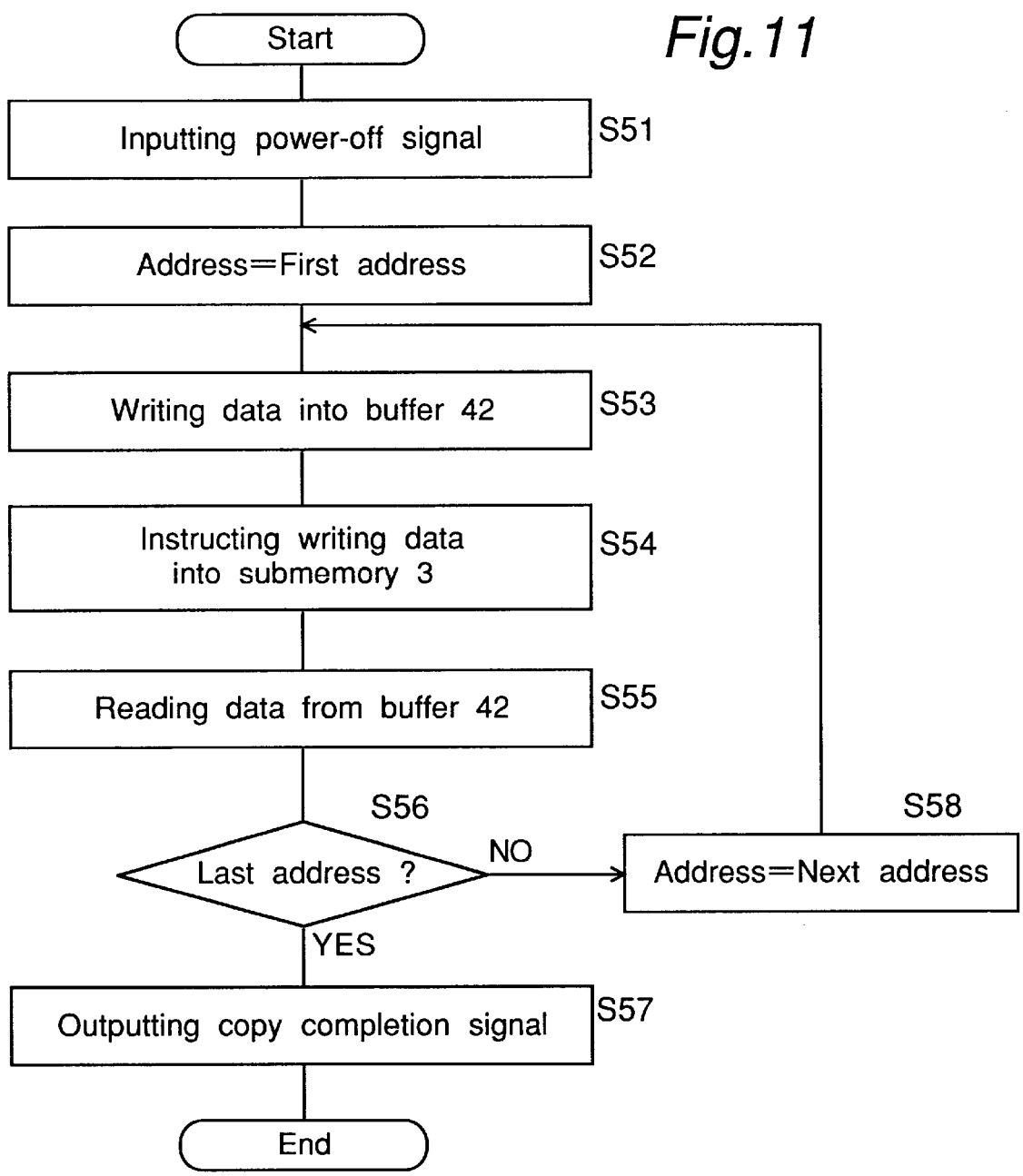
FIG. 11 is a flowchart illustrating an example of operation of the control section 31 of FIG. 10 at the time when the power is turned off.

FIG. 11 is a flowchart illustrating an example of operation of the control section 31 of FIG. 10 at the time when the power is turned off. Referring to FIG. 11, in step S51, control section 31 receives a predetermined power-off signal output from host system apparatus 36. In step S52, bus controller 41 instructs buffer 42 and main memory I/F 43 to read out data stored at a predetermined initial address, for example, the first address of main memory section 2, from which data is read out, and to write into buffer 42.

Next, in step S53, following the instruction from bus controller 41, main memory I/F 43 reads out data stored at the address of main memory section 2 assigned by bus controller 41 to write into buffer 42. Next, in step S54, bus controller 41 instructs buffer 42 and submemory I/F 44 to read out data written in buffer 42 to write into submemory section 3, corresponding to the address of main memory section 2 at which the data was stored. Next in step S55, submemory I/F 44 reads out data written in buffer 42 to write into submemory section 3, corresponding to the address of main memory section 2.

Next, in step S56, bus controller 41 tests whether the address of the data read out from main memory section 2 is the last address. If it is (YES), then the flow proceeds with step S57. In step S57, bus controller 41 outputs a copy completion signal into host system apparatus 36. When receiving the copy completion signal, host system apparatus 36 cuts off the supply of power to memory card 35 and turns off the power of host system apparatus 36 to terminate the present flow. If the data address is not the last address in step S56 (NO), then in step S58, bus controller 41 instructs buffer 42 and main memory I/F 43 to read data stored at the next address of main memory section 2 to write into buffer 42. The flow then returns to step S53.

Figure 12:
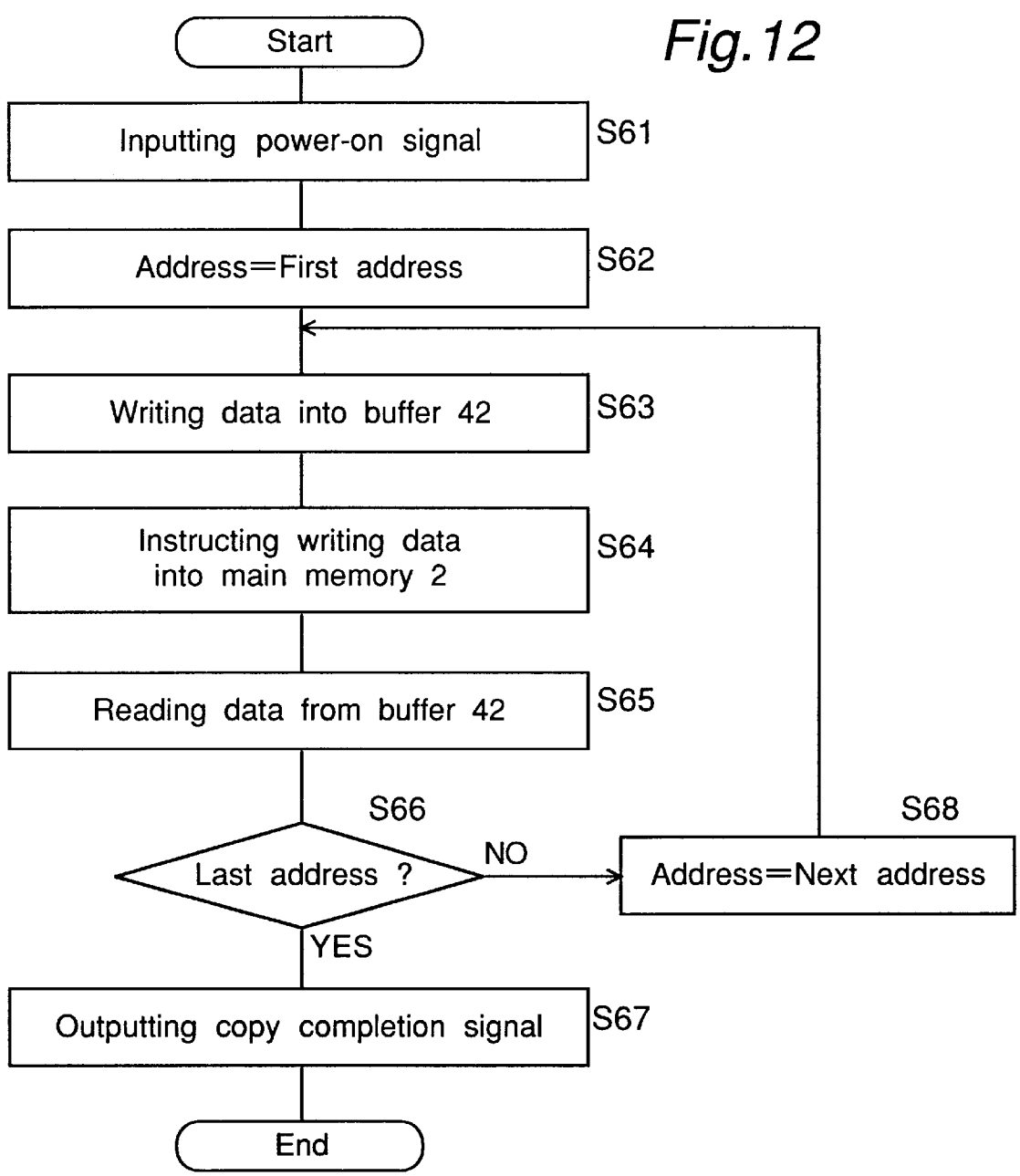

FIG. 12 is a flowchart illustrating an example of operation of the control section 31 of FIG. 10 at the time when the power is turned on. Referring to FIG. 12, in step S61, control section 31 receives a predetermined power-on signal output from host system apparatus 36. In step S62, bus controller 41 instructs buffer 42 and submemory I/F 44 to read out data at a predetermined initial address, for example, the first address of submemory section 2, from which data is read out, and to write into buffer 42.

Next, in step S63, following the instruction from bus controller 41, submemory I/F 44 reads out data at the address of submemory section 3 assigned by bus controller 41 to write into buffer 42. Next, in step S64, bus controller 41 instructs buffer 42 and main memory I/F 43 to read out data written in buffer 42 to write into main memory section 2 at the original address of main memory section 2 at which the data was stored. Next in step S65, main memory I/F 43 reads out data written in buffer 42 to write into main memory section 2 at the original address.

Next, in step S66, bus controller 41 tests whether the address of the data read out from submemory section 3 is the last address. If it is (YES), then the flow proceeds with step S67. In step S67, bus controller 41 outputs a copy completion signal into clock generator 32 and host system apparatus 36. When receiving the copy completion signal, clock generator 32 stops generating and outputting the clock signal. After receiving the copy completion signal, host system apparatus 36 uses memory card 35 as a conventional memory card for reading and writing data from and into main memory section 2. In this way the flow terminates.

If the data address is not the last address in step S66 (NO), then in step S68, bus controller 41 instructs buffer 42 and submemory I/F 44 to read data stored at the next address of submemory section 3 to write into buffer 42. The flow then returns to step S63.

As described above, in the memory card of the present third embodiment, when the power of host system apparatus 36 is turned off by a predetermined action of the operator, control section 31 copies for a backup all the data stored in the main memory section consisting in SRAM into the submemory section consisting in flash memory. Consequently, a battery in not required for a backup of data in the SRAM. Also, changes in data that occur in volatile memory during a backup can be reduced, so that incidents of soft errors can be prevented.

Fourth Embodiment

In the above first to third embodiments of the present invention, when the power of the host system apparatus is turned off, all the data in the main memory section is sheltered into the submemory section. However, whenever data is written into the main memory section by the host system apparatus, the data in the main memory section may be copied into the submemory section, corresponding to addresses in the main memory section. A memory card of a fourth embodiment of the present invention is constructed in this way.

Figure 13:
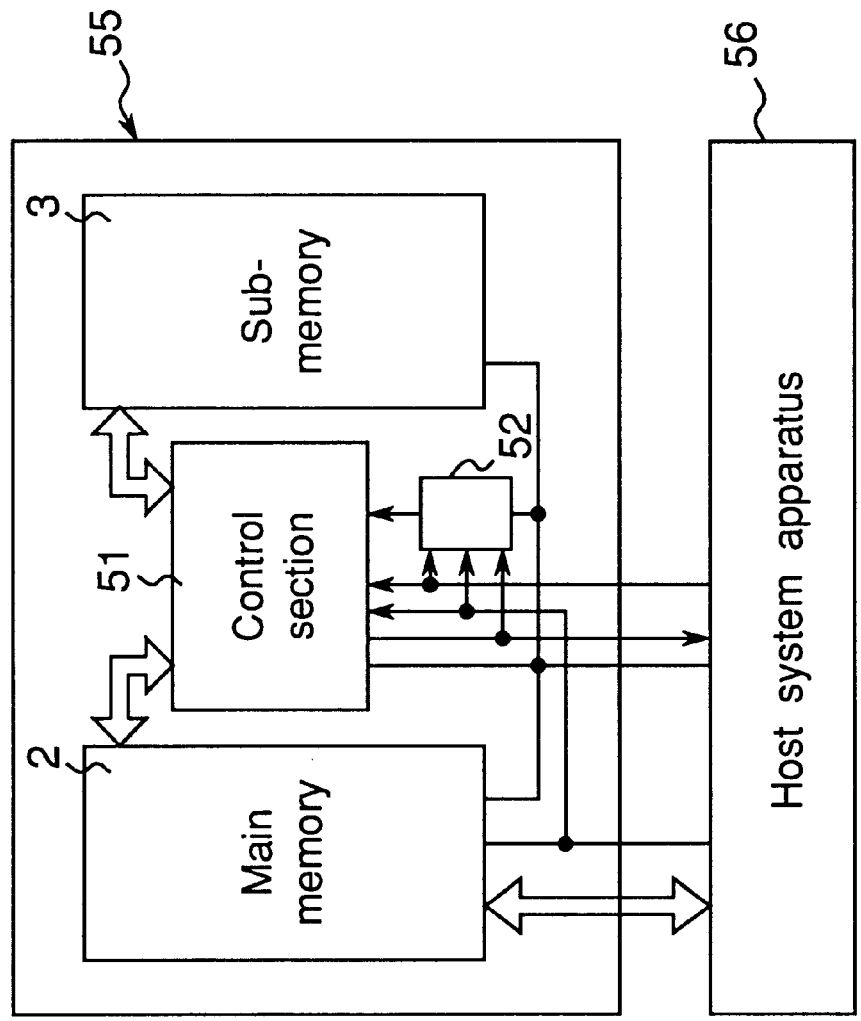
FIG. 13 is a block diagram illustrating an example of memory cards in a fourth embodiment of the present invention.

FIG. 13 is a block diagram illustrating an example of memory cards in a fourth embodiment of the present invention. In FIG. 13, the same components as in FIG. 7 are denoted by the same numerals, and their descriptions are omitted from here.

FIG. 13 differs from FIG. 7 as follows. The host system apparatus outputs a write-enable signal /WE into the control section. When receiving the write-enable signal /WE, the control section copies data stored in the main memory section into the submemory section. Therefore, the control section in FIG. 7 is now the control section 51. Also, when receiving the write-enable signal /WE, the clock generator generates and outputs a clock signal. Therefore, the clock generator is now a clock generator 52. The memory card 35 in FIG. 7 is now a memory card 55 with these changes. The host system apparatus does not output a predetermined power-off signal, so that the host system apparatus 36 in FIG. 7 is now a host system apparatus 56.

Referring to FIG. 13, memory card 55 comprises a main memory section 2, a submemory section 3, a control section 51, and a clock generator 52. Main memory section 2 and submemory section 3 are connected to control section 51. Main memory section 2, control section 51, and clock generator 52 are connected to host system apparatus 56. Further, clock generator 52 is connected to control section 51.

In the above construction, host system apparatus 56 supplies power to memory card 55. Host system apparatus 56 ordinarily accesses main memory section 2 to read and write data from and into main memory section 2. When writing into main memory section 2, host system apparatus 56 outputs a write-enable signal /WE into memory section 2 and control section 51. When receiving the write-enable signal /WE from host system apparatus 56, control section 51 copies into submemory section 3 the data that is written into main memory section 2 at that time by host system apparatus 56, corresponding to addresses of main memory section 2.

As described above, whenever data is written into main memory section 2 by host system apparatus 56, the data written into main memory section 2 is copied into submemory section 3. Therefore, when the power of host system apparatus is turned off, it is not necessary to copy data stored in main memory section 2 into submemory section 3. Next, when the power of host system apparatus 56 is turned on after the power was turned off, host system apparatus 56 supplies power to memory card 55 and outputs a predetermined power-on signal into control section 51 and clock generator 52. When receiving the power-on signal, clock generator 52 generates a clock signal to output into control section 51.

When receiving the power-on signal, control section 51 operates based on the clock signal output from clock generator 52 and reads data stored in submemory section 3 to write into main memory section 2. In this way, control section 31 copies all the data stored in submemory section 3 into main memory section 2. Further, after the completion of copying into main memory section 2, control section 51 outputs a copy completion signal into clock generator 52 and host system apparatus 56. When receiving the copy completion signal, clock generator 52 stops generating and outputting the clock signal. After receiving the copy completion signal, host system apparatus 56 uses memory card 55 as a conventional memory card for reading and writing data from and into main memory section 2.

A block diagram illustrating an example of control section 51 is the same as FIG. 10 except the bus controller 41 being replaced with a bus controller 61 and the power-off signal being replaced with the write-enable signal /WE. The operation of control section 51 is described in the following in conjunction with FIG. 10.

Figure 14:
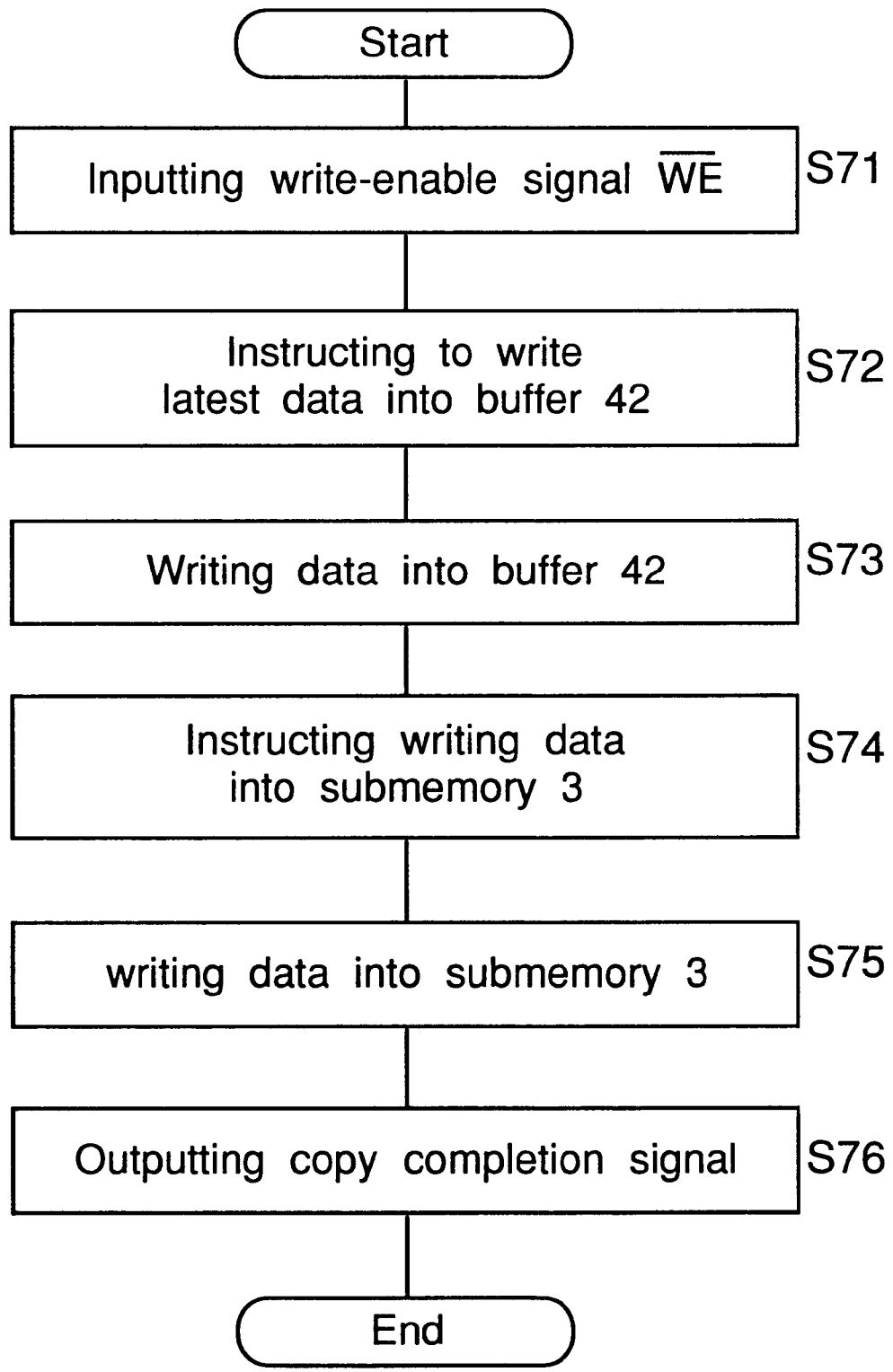
FIG. 14 is a flowchart of illustrating an example of operation that copies data from the main memory section 2 into the submemory section 3 in the memory card 55 of FIG. 13.

FIG. 14 is a flowchart of illustrating an example of operation that copies data from main memory section 2 into submemory section 3 in the memory card 55 of FIG. 13. Referring to FIG. 14, in step S71, control section 51 receives the write-enable signal /WE from host system apparatus 56. In step S72, bus controller 61 instructs buffer 42 and main memory I/F 43 to read out the data that has been last written into main memory section 2 to write into buffer 42. In step S73, following the instruction from bus controller 61, main memory I/F 43 reads out data from main memory section 2 at an address assigned by bus controller 61 to write into buffer 42.

Next, in step S74, bus controller 61 instructs buffer 42 and submemory I/F 44 to read out data stored in buffer 42 to write into submemory section 3, corresponding to the address of main memory section 2 at which the data has been stored. Next, in step S75, submemory I/F 44 reads out data written in buffer 42 and writes into submemory section 3, corresponding to the address at which the data has been stored. Next, in step S76, bus controller 61 outputs a copy completion signal into clock generator 52. In this way the present flow terminates.

A flowchart illustrating an example of the operation of control section 51 shown in FIG. 13 at the time of turning the power on is the same as that of FIG. 12 except the host system 36 being replaced with host system apparatus 56, the control section 31 being replaced with control section 51, and bus controller 41 being replaced with bus controller 61. Therefore, the flowchart is omitted from here.

As described above, in the memory card of the present fourth embodiment, whenever data is written into main memory section 2 by host system apparatus 56, the data written into main memory section 2 is copied into submemory section 3, corresponding to addresses of main memory section 2. Consequently, a battery in not required for a backup of data in SRAM. Also, changes in data that occur in volatile memory during a backup can be reduced, so that incidents of soft errors can be prevented. Further, the operation of copying data between the main memory section and the submemory section is performed in the memory card, so that an increase in the load on the host system apparatus can be prevented. Further, at the time of turning the power of the host system apparatus off, it is not necessary to copy data stored in the main memory section into the submemory section, so that time required for turning the power off can be shortened.

Fifth Embodiment

In the above third embodiment, when the power of the host system apparatus is turned off, and data stored in the main memory section is copied into the submemory section by the memory card, the memory card operates by the power provided by the host system apparatus. However, a memory card can be made to operate by a secondary battery installed in the memory card. A memory card constructed for this purpose is a fifth embodiment of the present invention.

Figure 15:
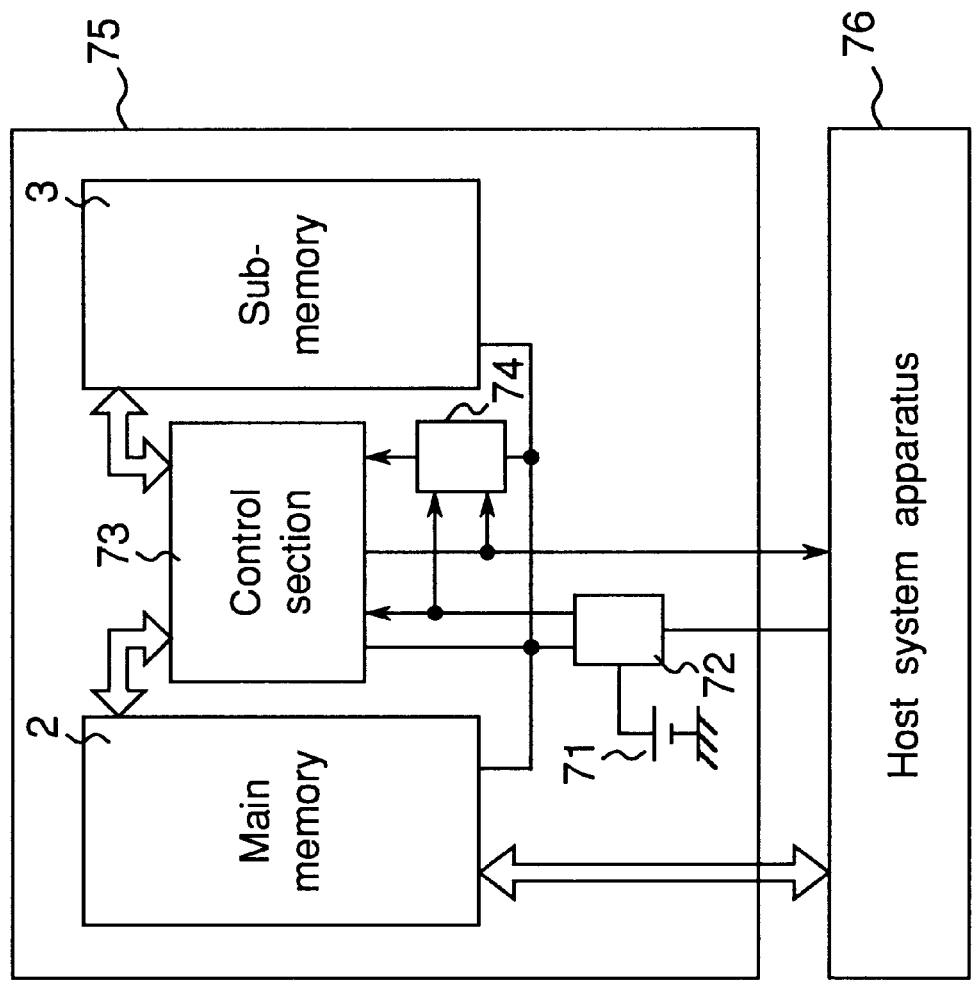
FIG. 15 is a block diagram illustrating an example of memory cards in a fifth embodiment of the present invention.

FIG. 15 is a block diagram illustrating an example of memory cards in the fifth embodiment of the present invention. In FIG. 15, the same components as in FIG. 7 are denoted by the same numerals; their descriptions are omitted from here; and only those different from FIG. 1 are described.

Figure 32:
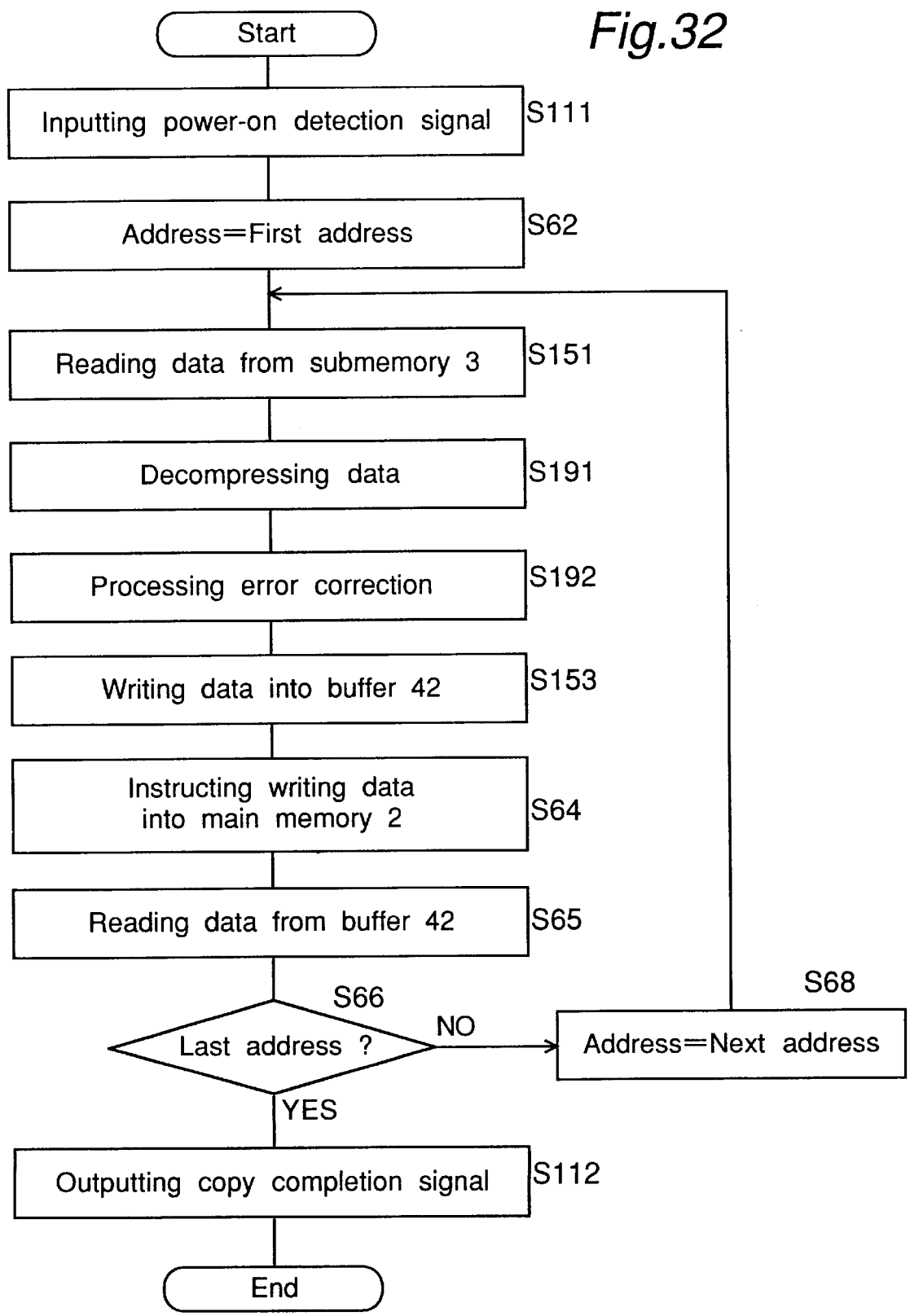

The memory card of FIG. 15 differs from that of FIG. 7 as follows. There are added to the memory card 35 of FIG. 7 a secondary battery 71 that supplies power to each section of memory card 35 when the power is cut off and a power switching section 72 that monitors the source voltage provided by the host system apparatus and switches between the power supplies provided by the host system apparatus and provided by secondary battery 71, based on the value of the source voltage, to supply power to each section of the memory card. Further, the control section and the clock generator operate depending on a power-off detection signal and a power-on detection signal that are input from power switching section 72. The power-off signal indicates that power switching section 72 has detected that the power of the host system apparatus has been turned off. The power-on detection signal indicates that power witching section 72 has detected that the power of the host system apparatus has been turned on. Consequently, the control section 31 of FIG. 7 is now a control section 73, and the clock generator 32 of FIG. 7 is now a clock generator 74. With these changes, the memory card 35 of FIG. 32 is now a memory card 75, and the host system 36 of FIG. 7 is now a host system apparatus 76.

In FIG. 15, memory card 75 comprises a main memory section 2, a submemory section 3, a secondary battery 71, and a power switching section 72, a control section 73, and a clock generator 74. Main memory section 2 and submemory section 3 are connected to a control section 73. Main memory section 2 and control section 73 are connected to host system apparatus 76. Clock generator 74 is connected to control section 73. Power switching section 72 is connected to main memory section 2, submemory section 3, control section 73, and clock generator 74 to supply power thereto. Further, power switching section 72 is connected to host system apparatus 76. Secondary battery 71 is connected to power switching section 72 and the ground.

In the above construction, power switching section 72 monitors the source voltage provided by host system apparatus 76 to detect power-off and power-on conditions in host system apparatus 76. When detecting a power-off condition in host system apparatus 76, power switching section 72 operates by secondary battery 71 as the power source and supplies power to main memory section 2, submemory section 3, control section 73, and clock generator 74, using secondary battery 71. At the same time, power switching section 72 outputs a predetermined power-off detection signal into control section 73 and clock generator 74.

When receiving the power-off detection signal, clock generator 74 generates a clock signal to output into control section 73. When receiving the power-off detection signal, control section 73 operates based on the clock signal input from clock generator 74 and copies all the data stored in main memory section 2 into submemory section 3, corresponding to addresses of main memory section 2.

Also, when detecting a power-on condition in host system apparatus 76, power switching section 72 operates by the power provided by host system apparatus 76, supplies the power provided by host system apparatus 76 to main memory section 2, submemory section 3, control section 73, and clock generator 74, and charges secondary battery 71. At the same time, power switching section 72 outputs a predetermined power-on detection signal into control section 73 and clock generator 74.

When receiving the power-on detection signal, clock generator 74 generates a clock signal to output into control section 73. When receiving the power-on detection signal, control section 73 operates based on the clock signal input from clock generator 74 and copies all the data stored in submemory section 3 into main memory section 2, corresponding to addresses of submemory section 3. Further, when finishing copying into main memory section 2, control section 73 outputs a copy completion signal into clock generator 74 and host system apparatus 76. When receiving the copy completion signal, clock generator 74 stops generating and outputting the clock signal. After receiving the copy completion signal, host system apparatus 76 uses memory card 75 as a conventional memory card for reading and writing data from and into main memory section 2.

Figure 16:
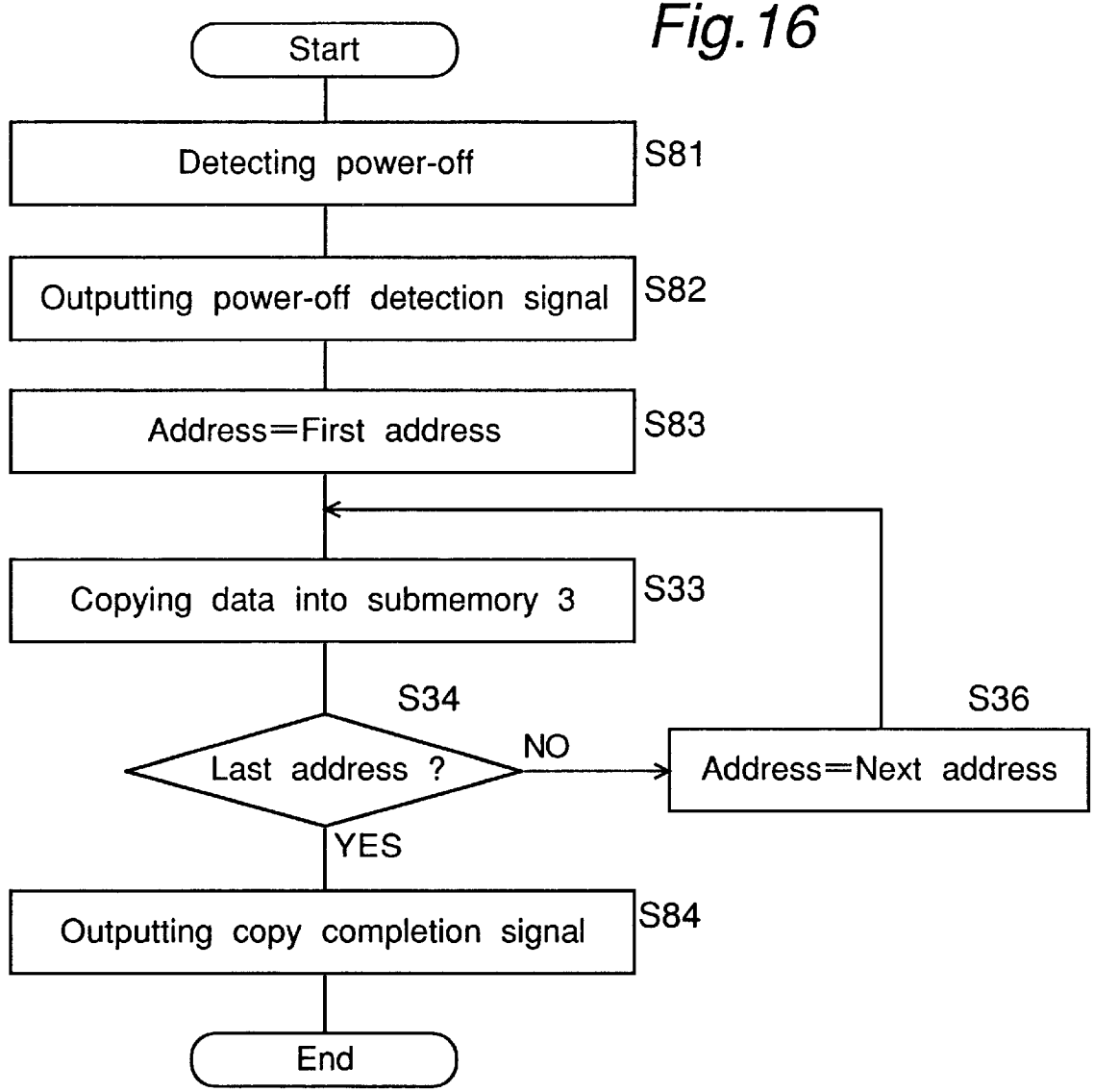
FIG. 16 is a flowchart illustrating an example of operation of the memory card 75 in FIG. 15 at the time when the power is turned off.

FIG. 16 is a flowchart illustrating an example of operation of the memory card 75 in FIG. 15 at the time when the power is turned off. In FIG. 16, the same steps as in FIG. 8 except replacing the numerals of the control section, clock generator, and host system apparatus are shown with the same numerals, and their descriptions are omitted from here.

Referring to FIG. 16, in step S81, when the power of host system apparatus 76 is turned off, power switching section 72 detects a power-off condition of host system apparatus 76, operates by secondary battery 71 as its power source, and supplies power to main memory section 2, submemory section 3, control section 73, and clock generator 74, using secondary battery 71.

Next in step S82, power switching section 72 outputs a predetermined power-off detection signal into control section 73 and clock generator 74. In step S83, control section 73 operates based on the clock signal output from clock generator 74. Also, when receiving the power-off detection signal, control section 73 reads out a predetermined initial address, for example, the first address of main memory section 2, from which data is read out. After that, control section 73 performs the processing of steps S33 and S34 of FIG. 8. In step S34, if the address of the data read out from main memory section 2 is the last address (YES), then the flow proceeds with step S84. In step S84, control section 73 outputs a copy completion signal into clock generator 74. When receiving the copy completion signal, clock generator 74 stops generating and outputting the clock signal. The present flow then terminates. If the data address is not the last address in step S34 (NO), then control section 73 performs the processing of step S36 to return to step S33.

Figure 17:
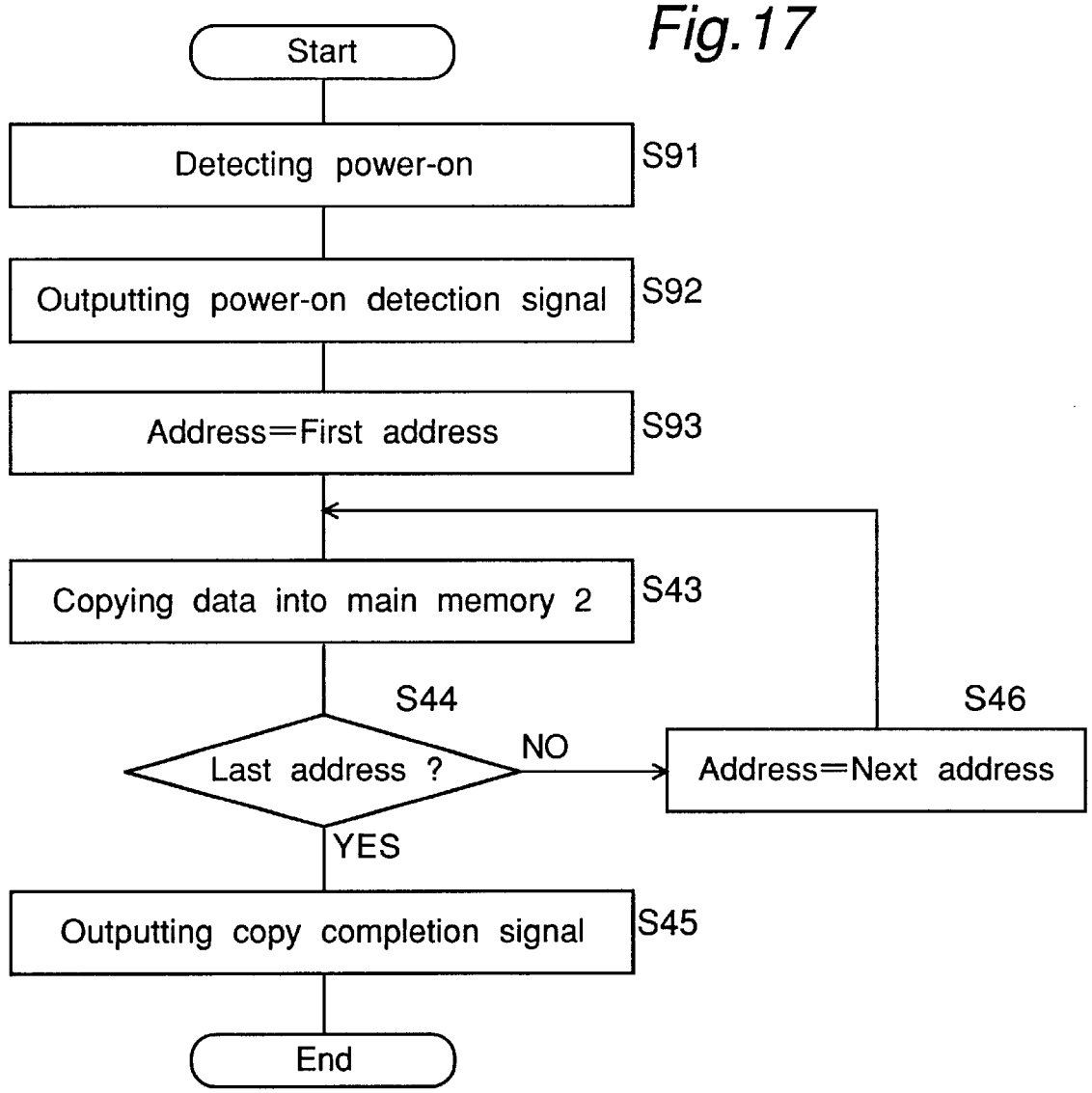

FIG. 17 is a flowchart illustrating an example of operation of the memory card 75 in FIG. 15 at the time when the power is turned on. Referring to FIG. 17, the same steps as in FIG. 9 except replacing the numerals of the control section, clock generator, and host system apparatus are shown with the same numerals, and their descriptions are omitted from here.

Referring to FIG. 17, in step S91, when the power of host system apparatus 76 is turned on, power switching section 72 detects a power-on condition in host system apparatus 76, operates by power provided by host system apparatus 76, and supplies power provided by host system apparatus 76 to main memory section 2, submemory section 3, control section 73, and clock generator 74.

Next, in step S92, power switching section 72 outputs a predetermined power-on detection signal into control section 73 and clock generator 74. In step S93, control section 73 operates based on the clock signal output from clock generator 74. When receiving the power-on detection signal, control section 73 reads out a predetermined initial address, for example, the first address of submemory section 3 from which data is read out. Then control section 73 performs the processing of steps S43 to S46 shown in FIG. 9.

Figure 18:
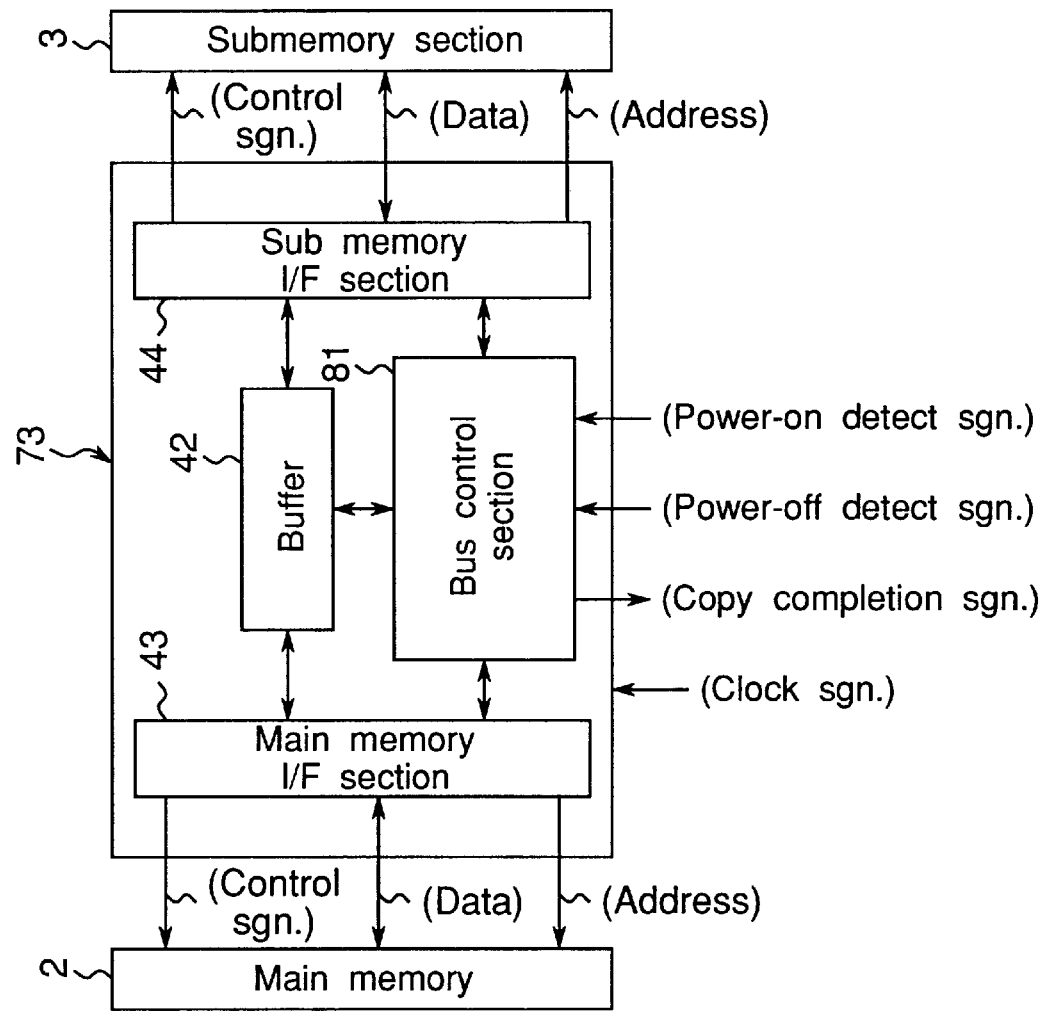
FIG. 18 is a block diagram illustrating an example of the control section 73 in FIG. 15.

FIG. 18 is a block diagram illustrating an example of the control section 73 in FIG. 15. The same components as in FIG. 10 are denoted by the same numerals, and their descriptions are omitted from here. Only the components different from those in FIG. 10 are described here.

FIG. 18 differs from FIG. 10 as follows. The control section 31 of FIG. 10 is now a control section 73 The bus controller 41 of FIG. 10 is now a bus controller 81. The power-off detection signal and power-on detection signal are respectively input to bus controller 81 in place of the power-off signal and power-on signal.

Referring to FIG. 18, control section 73 comprises a bus controller 81, a buffer 42, a main memory I/F 43, and a submemory I/F 44. Bus controller 81 is connected to buffer 42, main memory I/F 43, and submemory I/F 44. Buffer 42 is connected to main memory I/F 43 and submemory I/F 44.

Bus controller 81 controls buffer 42, main memory I/F 43, and submemory I/F 44, depending on the power-off and power-on detection signals from power switching section 72. Based on a control signal of bus controller 81, main memory I/F 43 reads out data stored in main memory section 2 to write into buffer 42, or reads out data stored in buffer 42 to write into main memory section 2. Based on a control signal of bus controller 81, submemory I/F 44 reads out data stored in submemory section 3 to write into buffer 42, or reads out data stored in buffer 42 to write into submemory section 3.

Figure 19:
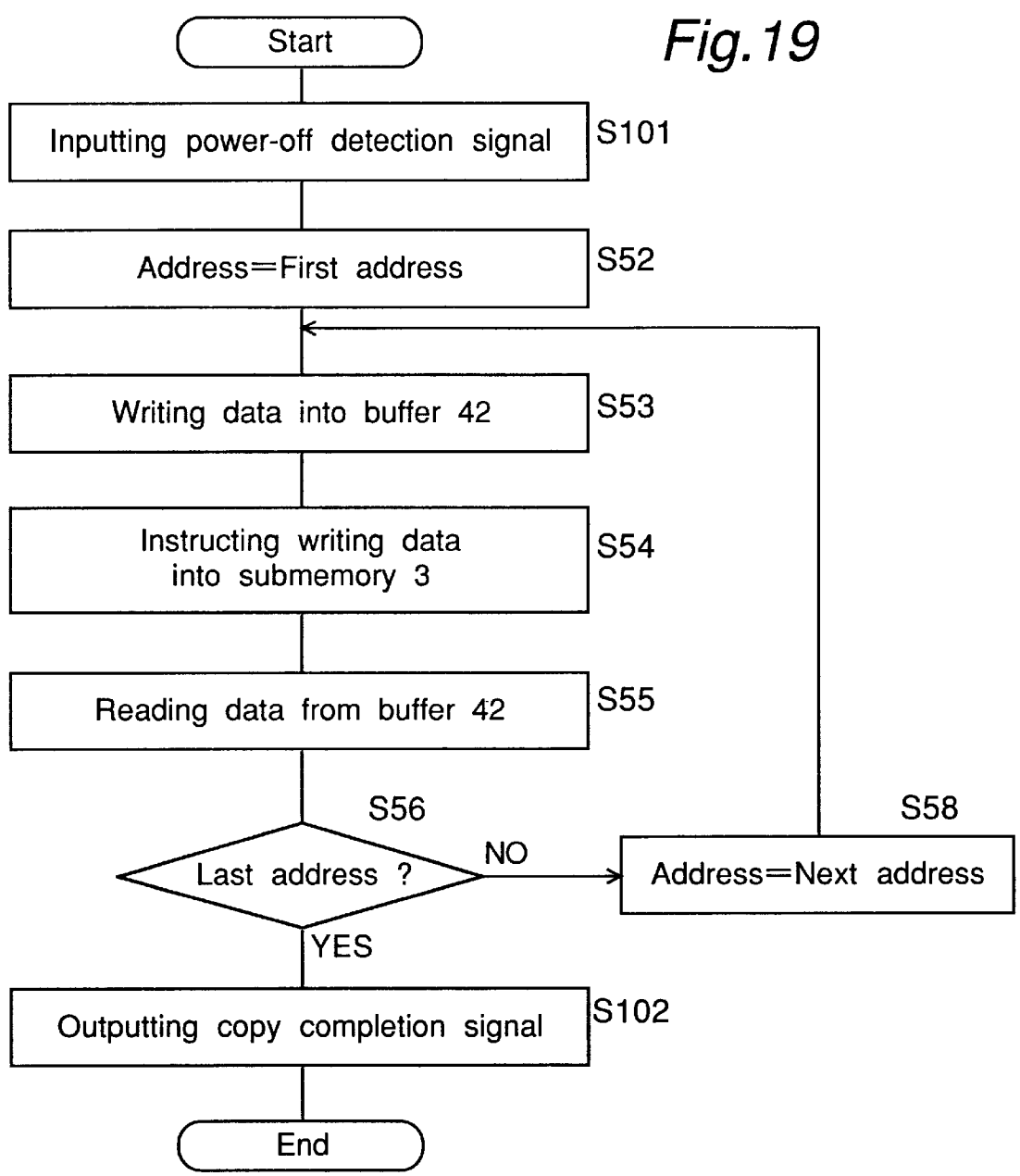
FIG. 19 is a flowchart illustrating an example of operation of the control section 73 in FIG. 15 at the time when the power is turned off.

FIG. 19 is a flowchart illustrating an example of operation of the control section 73 in FIG. 15 at the time when the power is turned off. In FIG. 19, the same steps as in FIG. 11 except replacing the numerals of the control section, bus controller, and host system apparatus are shown with the same numerals, and their descriptions are omitted from here.

Referring to FIG. 19, in step S101, after receiving a predetermined power-off detection signal output from power-switching section 72, bus controller 81 performs the processing of steps S52 to S55. If the data address is the last address (YES) in step S56, then the flow proceeds with step S102. In step S102, bus controller 81 outputs a copy completion signal into clock generator 74, and the present flow terminates. If the data address is not the last address in step S56 (NO), then bus controller 81 performs the processing of step S58. Then the flow returns to step S53.

Figure 20:
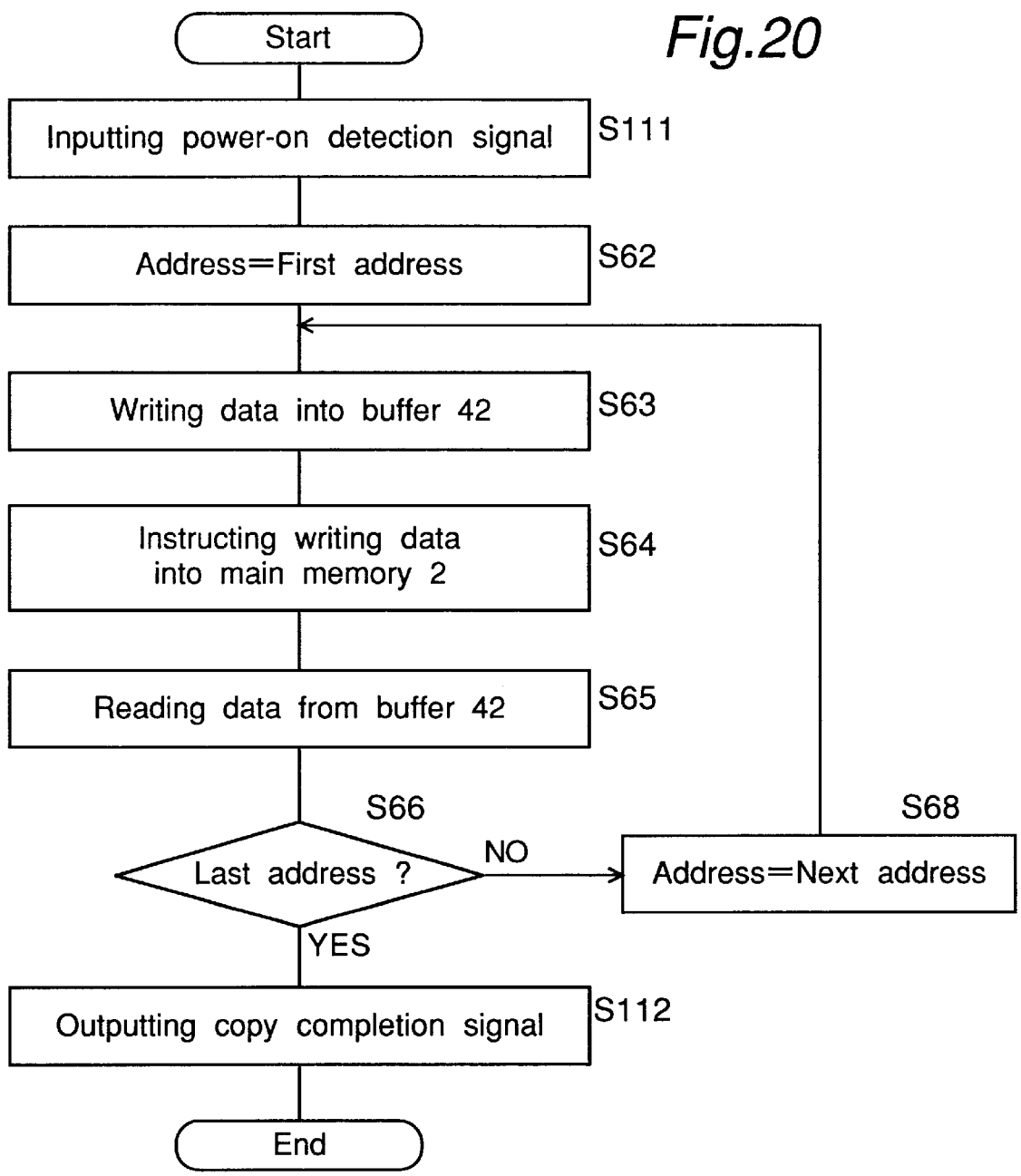

FIG. 20 is a flowchart illustrating an example of operation of the control section 73 in FIG. 15 at the time when the power is turned on. In FIG. 19, the same steps as in FIG. 11 except replacing the numerals of the control section, bus controller, and host system apparatus are shown with the same numerals, and their descriptions are omitted from here.

Referring to FIG. 20, in step S111, control section 73 receives a predetermined power-on signal output from power switching section 72. Then control section 73 performs the processing of steps S62 to S65. In step S66, if the data address is the last address (YES), then the flow proceeds with step S112. In step S112, bus controller 81 outputs a copy completion signal into clock generator 74 and host system apparatus 76. Then the present flow terminates. If the data address is not the last address in step S66 (NO), then bus controller 81 performs the processing of step S68. The flow then returns to step S63.

As described above, in the memory card of the present fifth embodiment, when the power of the host system apparatus is turned off and when data stored in the main memory section is copied into the submemory section by the memory card, the memory card operates by a secondary battery installed in the memory card. Therefore, changes in data that occur in volatile memory during a backup can be reduced, so that incidents of soft errors can be prevented. Further, the operation of copying data between the main memory section and the submemory section is performed in the memory card, so that an increase in the load on the host system apparatus can be prevented. Further, time required for turning of the power of the host system apparatus can be shortened.

Sixth Embodiment

In the above first to fifth embodiments, when data stored in the main memory section is copied into the submemory section, only the data is copied. However, when data in the main memory section is copied into the submemory section, an error-correcting code, called ECC hereafter, may be added. In this case, when data stored in the submemory section is copied into the main memory section, an error correction procedure may be performed based on the ECC. A memory card constructed for this purpose is a sixth embodiment of the present invention. In this sixth embodiment, the above fifth embodiment is taken for the modification.

A block diagram illustrating an example of memory cards in the sixth embodiment is the same as FIG. 15 except the control section 73 being replaced with a control section 91 and the memory card 75 being replaced with a memory card 95. Therefore, the construction of the present embodiment is described in conjunction with FIG. 15.

Memory card 95 comprises a main memory section 2, a submemory section 3, a secondary battery 71, and a power switching section 72, a control section 91, and a clock generator 74. Main memory section 2 and submemory section 3 are connected to a control section 91. Main memory section 2 and control section 91 are connected to host system apparatus 76.

Clock generator 74 is connected to control section 91. Power switching section 72 is connected to main memory section 2, submemory section 3, control section 91, and clock generator 74 to supply power thereto. Further, power switching section 72 is connected to host system apparatus 76. Secondary battery 71 is connected to power switching section 72 and the ground.

In the above construction, when detecting a power-off condition in host system apparatus 76, power switching section 72 operates by secondary battery 71 as the power source and supplies power to main memory section 2, submemory section 3, control section 91, and clock generator 74, using secondary battery 71. At the same time, power switching section 72 outputs a predetermined power-off detection signal into control section 91 and clock generator 74.

When receiving the power-off detection signal, clock generator 74 generates a clock signal to output into control section 91. When receiving the power-off detection signal, control section 91 operates based on the clock signal input from clock generator 74 and copies all the data stored in main memory section 2 into submemory section 3, corresponding to addresses of main memory section 2.

At that time, control section 91 generates an ECC and adds it to the data read out from main memory section 2 in units of bytes to write the ECC-added data into submemory section 3. After finishing the processing that copies all the data stored in main memory section 2 into submemory section 3, control section 91 outputs a copy completion signal that indicates the completion of copying into clock generator 74. When receiving the copy completion signal, clock generator 74 stops generating and outputting the clock signal.

Also, when detecting a power-on condition in host system apparatus 76, power switching section 72 operates by the power provided by host system apparatus 76, supplies power provided by host system apparatus 76 to main memory section 2, submemory section 3, control section 91, and clock generator 74, and charges secondary battery 71. At the same time, power switching section 72 outputs a predetermined power-on detection signal into control section 91 and clock generator 74.

When receiving the power-on detection signal, clock generator 74 generates a clock signal to output into control section 91. When receiving the power-on detection signal, control section 91 operates based on the clock signal input from clock generator 74 and reads out the data and added ECC stored in submemory section 3. Then control section 91 verifies whether the data is correct or not using the read ECC. If there are some errors in the data, control section 91 performs error correction processing for correcting the errors.

Control section 91 writes the data that has undergone the above error correction processing into main memory section 2 to perform error correction for all the data stored in submemory section 3 and to copy into main memory section 2. Further, when finishing copying into main memory section 2, control section 91 outputs a copy completion signal into clock generator 74 and host system apparatus 76. When receiving the copy completion signal, clock generator 74 stops generating and outputting the clock signal. After receiving the copy completion signal, host system apparatus 76 uses memory card 95 as a conventional memory card for reading and writing data from and into main memory section 2.

Now, the ECC generated by control section 91 is described in the following. Control section 91 generates the ECC by a publicly-known method to detect error bits using the generated ECC. Here, the method of using a Hamming code to generate an ECC in units of bytes and detect error bits is described For example, a 4-bit ECC word consisting of e3 to e0 is given for an 8-bit data byte consisting of d7 to d0 as in the following equations (1) to (4).

$$e0=d0+d1+d3+d4+d6, \quad (1)$$

$$e1=d0+d2+d3+d5+d6, \quad (1)$$

$$e2=d1+d2+d3+d7, \quad (1)$$

$$e3=d4+d5+d6+d7. \quad (1)$$

Here, the addition is defined as 1+1=0+0=0, 0+1=1, that is, the exclusive OR.

Let the data byte be denoted by d[7:0] and the ECC word of d[7:0] be denoted by e[3:0]. Let a corresponding data byte containing an error in a singe bit be denoted by dx[7:0] and its ECC word be denoted by ex[3:0]. Then we compare e[3:0] with ex[3:0]. If the exclusive OR of e[3:0] and ex[3:0] is 3 in the decimal expression, then the bit d0 is incorrect. If the exclusive OR is 5, then the bit d1 is incorrect. If the exclusive OR is 6, then the bit d2 is incorrect. If the exclusive OR is 7, then the bit d3 is incorrect. If the exclusive OR is 9, then the bit d4 is incorrect. If the exclusive OR is 10, then bit d5 is incorrect. If the exclusive OR is 11, then the bit d6 is incorrect. If the exclusive OR is 12, then the bit d7 is incorrect.

For example, if d[7:0]=11010101, then e[3:0]=1011. If the bit d3 of d[7:0] is incorrect, then dx[7:0]=11011101 and ex[3:0]=1100. The exclusive OR of e[3:0] and ex[3:0] is 0111, which is 7 in the decimal expression. Therefore, by the above rule, it is seen that d3 is the error bit. In this way, by means of an ECC using a Hamming code in units of bytes, an error in a single bit per byte can be corrected. Submemory section 3 requires a memory size of 1.5 times the memory size of main memory section 2, since a 4-bit ECC word is added to each 8-bit data byte.

Figure 21:
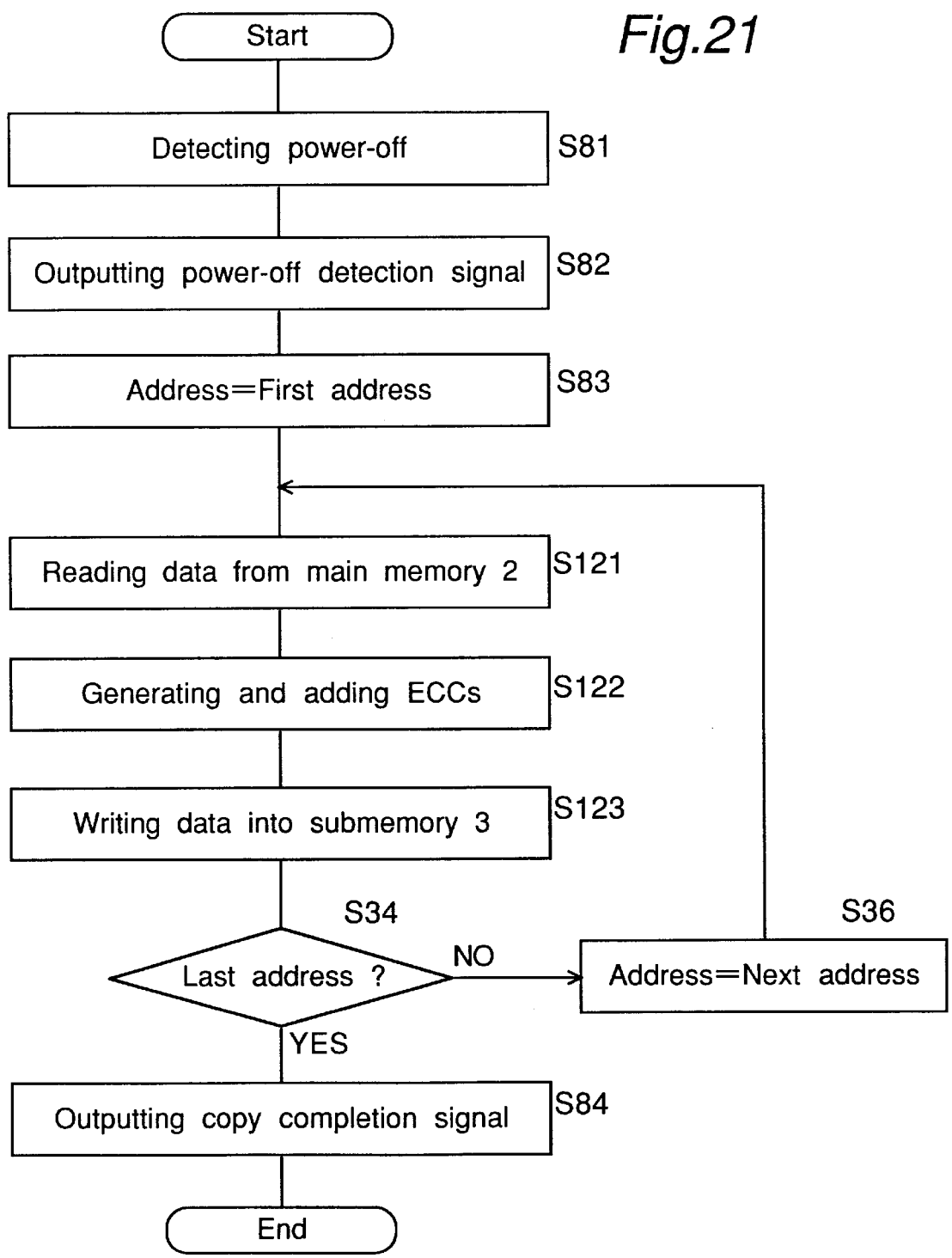
FIG. 21 is a flowchart illustrating an example of operation of memory cards in a sixth embodiment of the present invention at the time when the power is turned off.

FIG. 21 is a flowchart illustrating an example of operation of memory cards in a sixth embodiment of the present invention at the time when the power is turned off. In FIG. 21, the same steps as in FIG. 16 except replacing the numeral of the control section are shown with the same numerals, and their descriptions are omitted from here.

Referring to FIG. 21, after the processing of steps S81 to S83 is performed, in step S121, control section 91 reads out data stored at the assigned address of main memory section 2. In step S122, control section generates an ECC word for the read data and adds it to the read data. In step S123, control section 91 writes the ECC-added data into submemory section 3, corresponding to the address of main memory section 2 at which the data has been stored. Then control section 91 performs the processing of steps S34, S36, and step S84.

Figure 22:
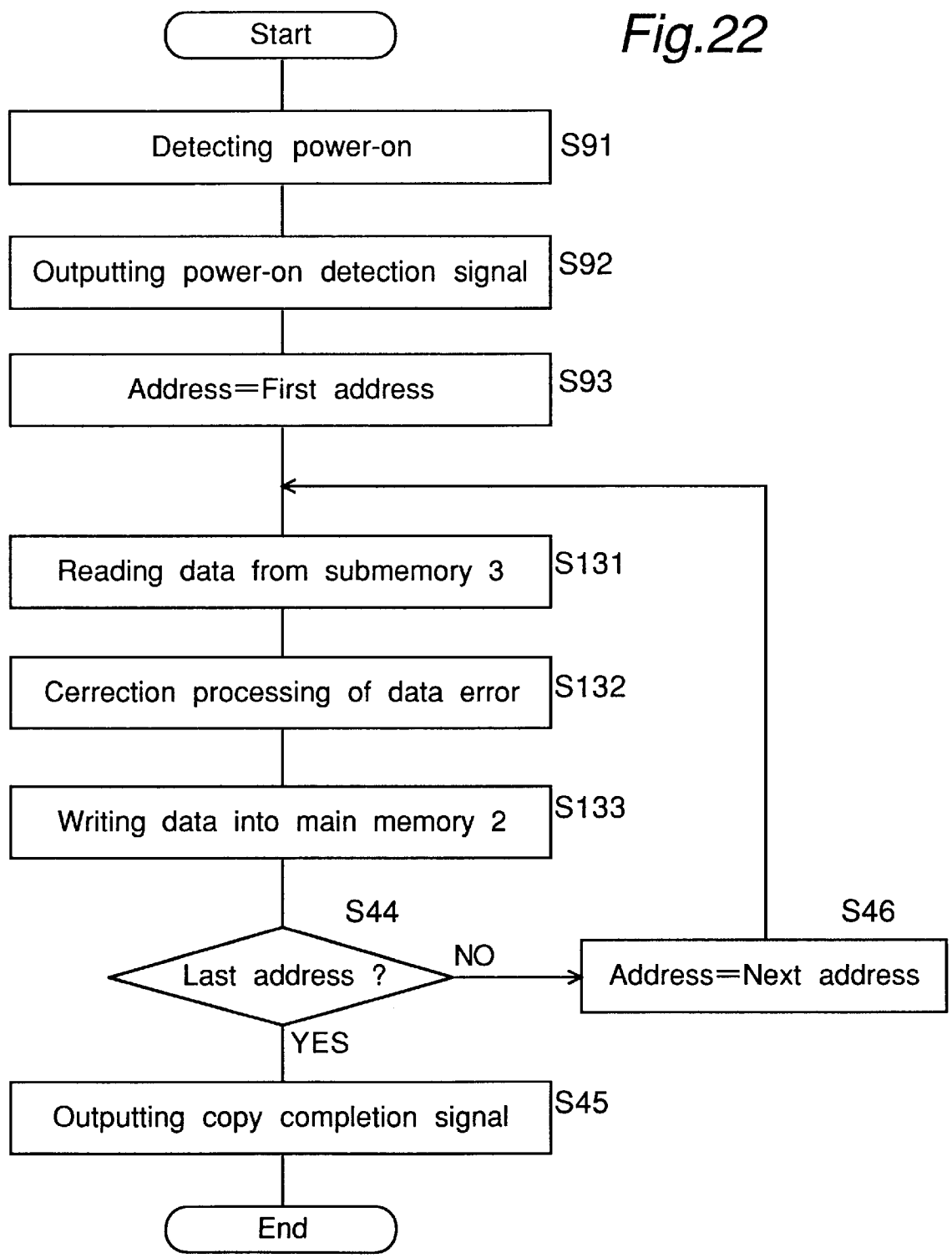

FIG. 22 is a flowchart illustrating an example of operation of memory cards in the sixth embodiment at the time when the power is turned on. In FIG. 22, the same steps as in FIG. 16 except replacing the numeral of the control section are shown with the same numerals, and their descriptions are omitted from here.

Referring to FIG. 22, after the processing of steps S91 to S93 is performed, in step S131, control section 91 reads out data and the added ECC word stored at the assigned address of submemory section 3. In step S132, control section 91 performs error correction processing for the read data using an ECC. In step S133, control section 91 writes the data that has undergone the error correction processing into main memory section 2 at the original address at which the data was stored. Control section 91 then performs the processing of steps S44 to S46.

Figure 23:
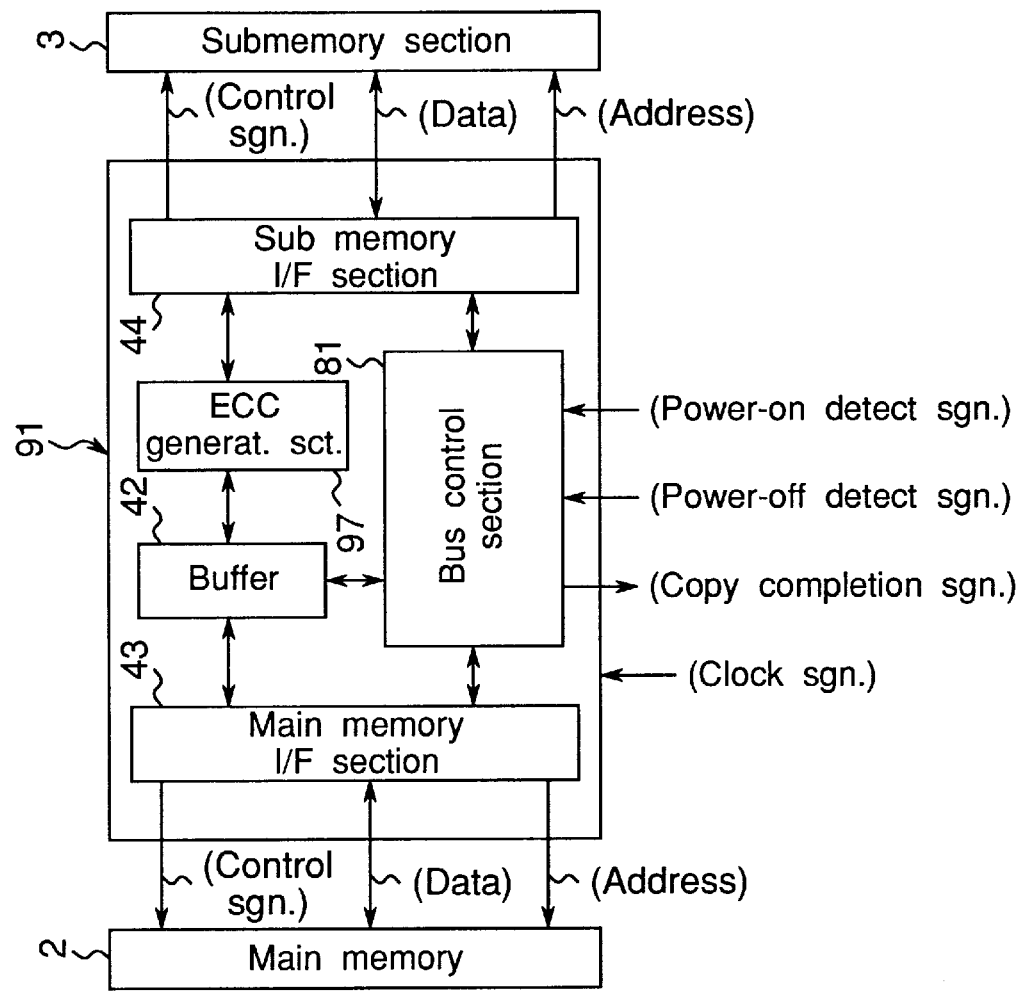
FIG. 23 is a block diagram illustrating an example of the control section in memory cards of the sixth embodiment.

FIG. 23 is a block diagram illustrating an example of control section 91 in memory cards of the sixth embodiment. The same components as in FIG. 18 are denoted by the same numerals, and their descriptions are omitted from here. Only the components different from those in FIG. 18 are described here.

FIG. 23 differs from FIG. 18 as follows. An ECC generator 97 is installed between the buffer 42 and submemory I/F 44 in FIG. 18. The control section 73 in FIG. 18 is now a control section 91.

Referring to FIG. 23, buffer 42 is connected to submemory I/F 44 through ECC generator 97.

ECC generator 97 generates an ECC to the data input from buffer 42 by a predetermined method to output into submemory I/F 44. ECC generator 97 also performs error correction processing for the data input from submemory I/F using the ECC added to the data to output the processed data into buffer 42. In this way, when the data output from buffer 42 into submemory I/F 44 passes through ECC generator 97, a predetermined ECC is added. Submemory I/F 44 writes the ECC-added data into submemory section 3, corresponding to the address of main memory section 2 at which the data has been stored. When the data read out from submemory section 3 and output from submemory I/F 44 passes through ECC generator 97, error correction processing is performed using the added ECC. The processed data is written into buffer 42.

Figure 24:
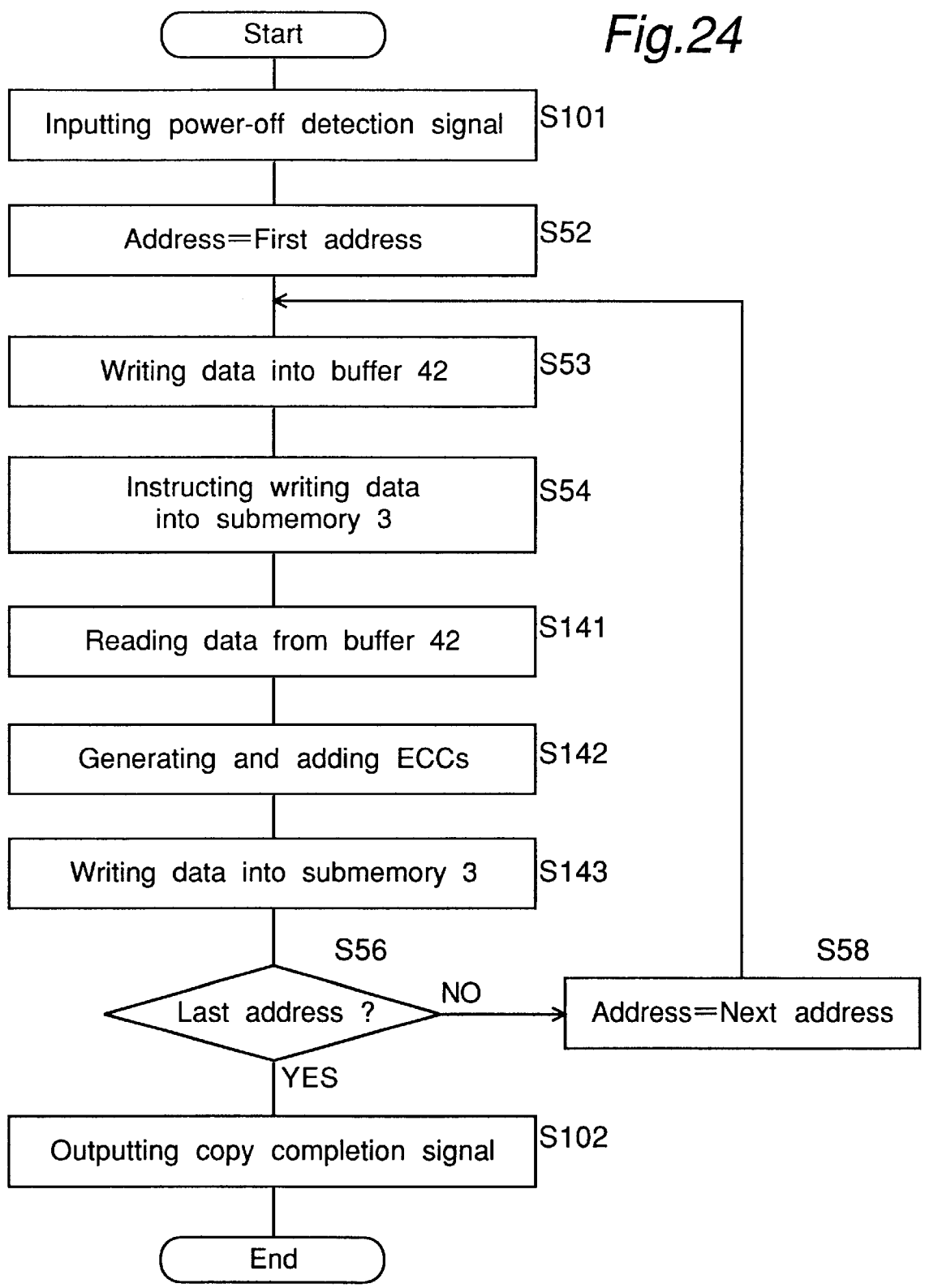
FIG. 24 is a flowchart illustrating an example of operation of the control section 91 in FIG. 23 at the time when the power is turned off.

FIG. 24 is a flowchart illustrating an example of operation of the control section 91 in FIG. 23 at the time when the power is turned off. In FIG. 24, steps as in FIG. 19 except replacing the numeral of the control section are shown with the same numerals, and their descriptions are omitted from here.

Referring to FIG. 24, after the processing of step S101 and steps S52 to S54 is performed, in step S141, submemory I/F 44 reads out data stored in buffer 42. In step S142, ECC generator 97 generates an ECC for the data input from buffer 42 by a predetermined method. In step S143, submemory I/F 44 writes the data to which the ECC has been added by ECC generator 97 into submemory section 3, corresponding to address of main memory section 2. Then the processing of steps S56, S58, and S102 is performed.

FIG. 25 is a flowchart illustrating an example of operation of the control section 91 in FIG. 23 at the time when the power is turned on. In FIG. 25, steps as in FIG. 20 except replacing the numeral of the control section are shown with the same numerals, and their descriptions are omitted from here.

Referring to FIG. 25, after the processing of steps S111 and S62 is performed, in step S151, submemory I/F 44 reads out the data from submemory section 3 at the assigned address assigned by bus controller 81. In step S152, ECC generator 97 performs error correction for the data input from submemory I/F 44 using the ECC added to the data. Then in step S153, the data that has undergone the error correction processing is written into buffer 42. Then the processing of steps S64 to S66, S68, and S112 is performed. After the processing of step S98, the flow returns to step S151.

Here, in the above description of the fifth embodiment, an ECC is added to data in units of bytes. An ECC may be added to data in units of blocks. In this case, copying data stored in main memory section 2 into submemory section 3 and copying data stored in submemory section 3 into main memory section 2 are performed in units of blocks. More specifically, in the case of the control section 91 in FIG. 23, after a block of data read out from main memory section 2 is written into buffer 42, the block of data is input to submemory I/F 44 through ECC generator 97.

ECC generator 97 adds an ECC record to a block of data input from buffer 42 by a predetermined method to output into submemory I/F 44. Submemory I/F 44 writes the ECC-added block of data into submemory section 3, corresponding to the addresses of main memory section 2 at which the data has been stored. Also, a block of data read out from submemory section 3 is processed by ECC generator 97 for error correction using the added ECC record. Then the data is written into main memory section 2 by main memory I/F 43.

When generating an ECC for blocks, for example, using an Hamming code, to detect an error bit, ECC generator 97 generates an ECC record for a block of data consisting of N bits. The bit length k of the ECC record is determined as a k satisfying the following inequality (5).

$$2^k - 1 \geq N \times 8 + k \tag{5}$$

Here, (5) is for correcting an error of a single bit.

In this way, the size of submemory section 3 can be made smaller by adding an ECC to data in units of blocks than by adding an ECC to data in units of bytes. Therefore, costs can be reduced.

The above sixth embodiment has been described in the case of modifying the fifth embodiment. Modifications to the third and fourth embodiments for the error correction are similar, so that their descriptions are omitted from here. In the case of modifying the first and second embodiments for error correction, when the host system apparatus copies data stored in the main memory section into the submemory section at the power-off time, the host system apparatus generates and adds an ECC for the data read out from the main memory section. Also, when the host system apparatus copies data stored in the submemory section into the main memory section, the host system apparatus performs error correction processing for the data read out from the submemory section.

As described above, when copying data stored in the main memory section into the submemory section in the present first to fifth embodiments, the memory card of the present sixth embodiment adds an ECC to the data to write the ECC-added data into the submemory section. Also, when writing data stored in the submemory section into the main memory section, the memory card of the present sixth embodiment performs error correction processing for the data. These means allow the memory card to improve the reliability of data stored in the main memory section memory, in addition to each advantage of the first to fifth embodiments.

Seventh Embodiment

The above sixth embodiment uses an ECC, for example, a Hamming code, for the error correction of data. However, the error correction can be made from a copy of the data read out from main memory section 2 and a checksum. A memory card constructed for that purpose is a seventh embodiment of the present invention. In this seventh embodiment, the above fifth embodiment is taken for the modification.

A block diagram illustrating an example of memory cards in the seventh embodiment is the same as FIG. 15 except the control section 73 being replaced with a control section 101 and the memory card 75 being replaced with a memory card 105. Therefore, the block diagram of memory card 105 of the present embodiment is omitted from here.

Figures 26, 27:
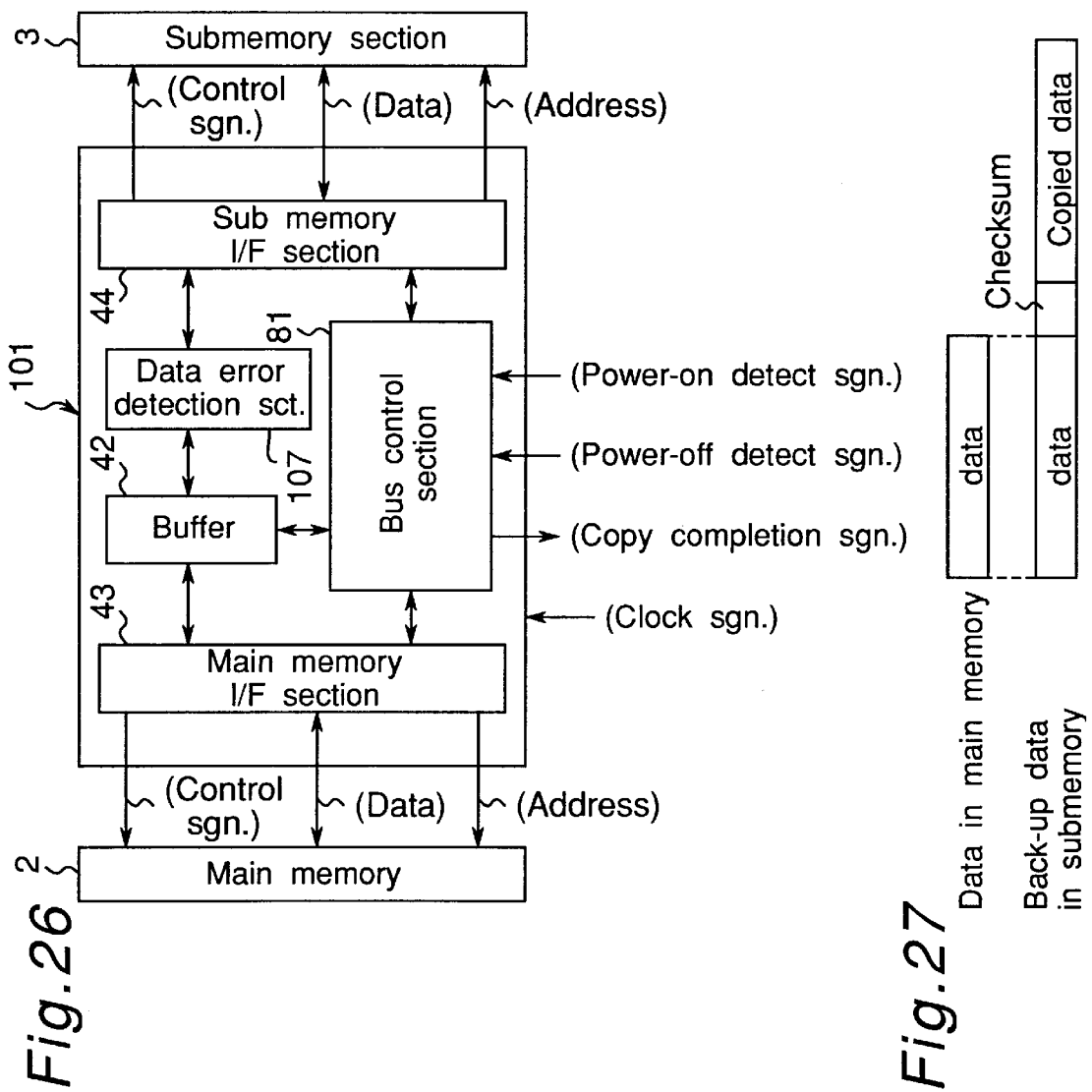
FIG. 26 is a block diagram illustrating an example of the control section in memory cards of a seventh embodiment.
FIG. 27 is an illustration showing data to which a copy of the data and a checksum is added.

FIG. 26 is a block diagram illustrating an example of control section 101 in memory cards of the seventh embodiment. The same components as in FIG. 23 are denoted by the same numerals, and their descriptions are omitted from here. Only the components different from those in FIG. 23 are described here.

FIG. 26 differs from FIG. 23 in that the ECC generator 97 in FIG. 23 is replaced with a data-error detector 107.

Referring to FIG. 26, buffer 42 is connected submemory I/F 44 through data-error detector 107.

Data-error detector 107 generates a copy of data and a checksum for the data input from buffer 42 in units of bytes or blocks, as described in FIG. 27, to output into submemory I/F 44 together with the data. Also, data-error detector 107 performs error correction processing for the data input from submemory I/F 44 using the copy and checksum added to the data to output the processed data into buffer 42.

Now, a method of error correction performed by data-detector 107 is described in the following. For example, if a copy of the data byte 11011100 added to the data byte by data-error detector 107 is 11111100, then data-error detector 107 uses the added checksum to determine which of the original 11011100 and the copy 11111100 is correct. If the checksum is 1, then data-error detector 107 judges the original is correct; if the checksum is 0, then data-error detector 107 judges the copy is correct. If the original and the copy of the data stored in submemory section 3 agree with each other, then data-error detector does not perform the error correction by the checksum.

In this way, when the data output from buffer 42 into submemory I/F 44 passes through data-error detector 107, a copy of the data and a checksum is added. Submemory I/F 44 writes the copy and checksum data into submemory section 3 together with the data, corresponding to addresses of main memory section 2 at which the data has been stored. When the data read out from submemory section 3 and output from submemory I/F 44 passes through data-error detector 107, error correction processing is performed using the added copy and checksum. The processed data is written into buffer 42.

Figure 28:
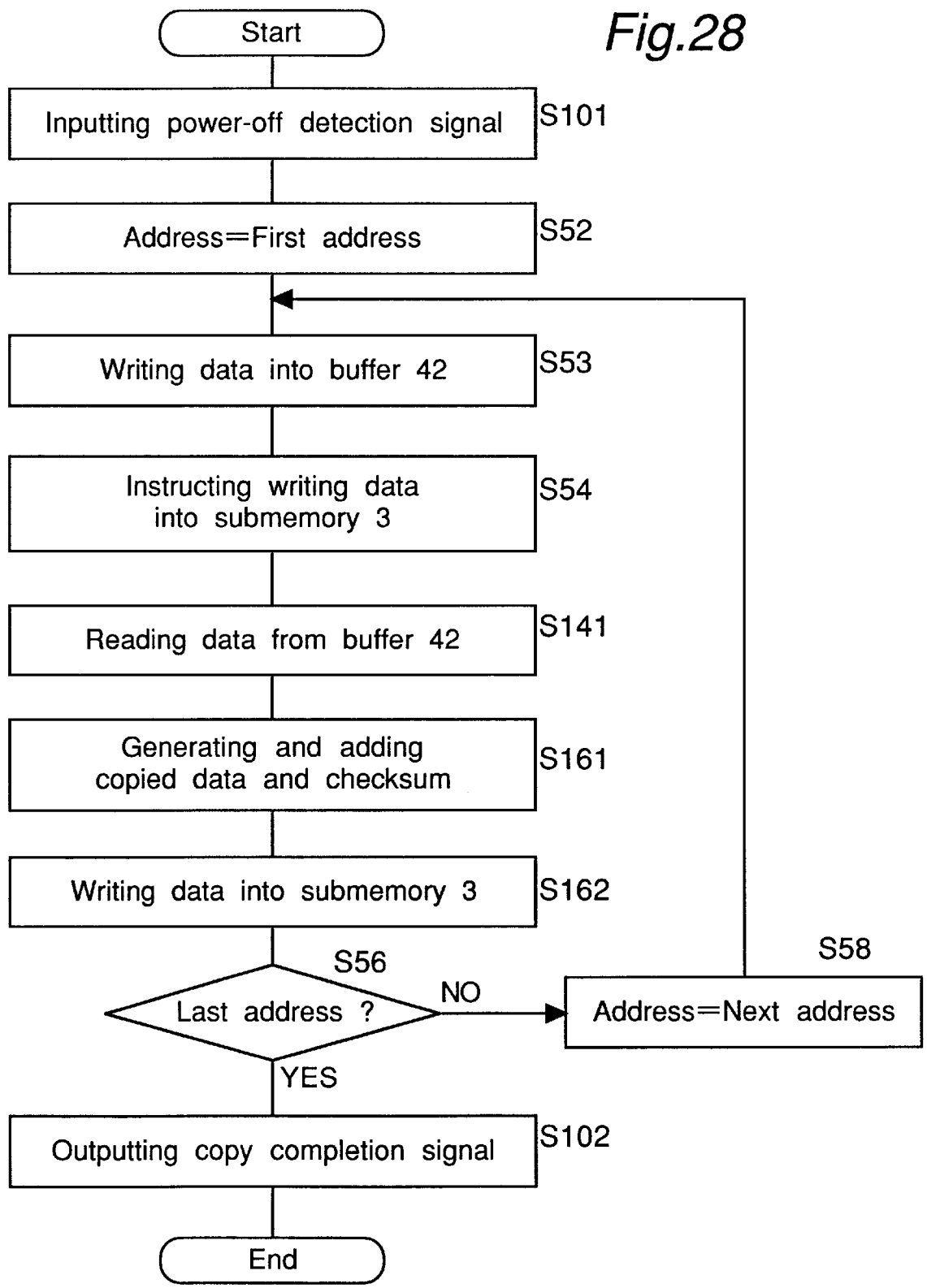
FIG. 28 is a flowchart illustrating an example of operation of the control section 101 in FIG. 26 at the time when the power is turned off.

FIG. 28 is a flowchart illustrating an example of operation of the control section 101 in FIG. 26 at the time when the power is turned off. In FIG. 28, steps as in FIG. 24 except replacing the numeral of the control section are shown with the same numerals, and their descriptions are omitted from here.

Referring to FIG. 28, after the processing of steps S52 to S54 and step S141 is performed, in step S161, data-error detector 107 generates a copy of the data input from buffer 42 and a checksum to add to the data. In step S162, submemory I/F 44 writes the data to which the copy and the checksum have been added by data-error detector 107 into submemory section 3, corresponding to address of main memory section 2. Then the processing of steps S56, S58, and S102 is performed.

Figure 29:
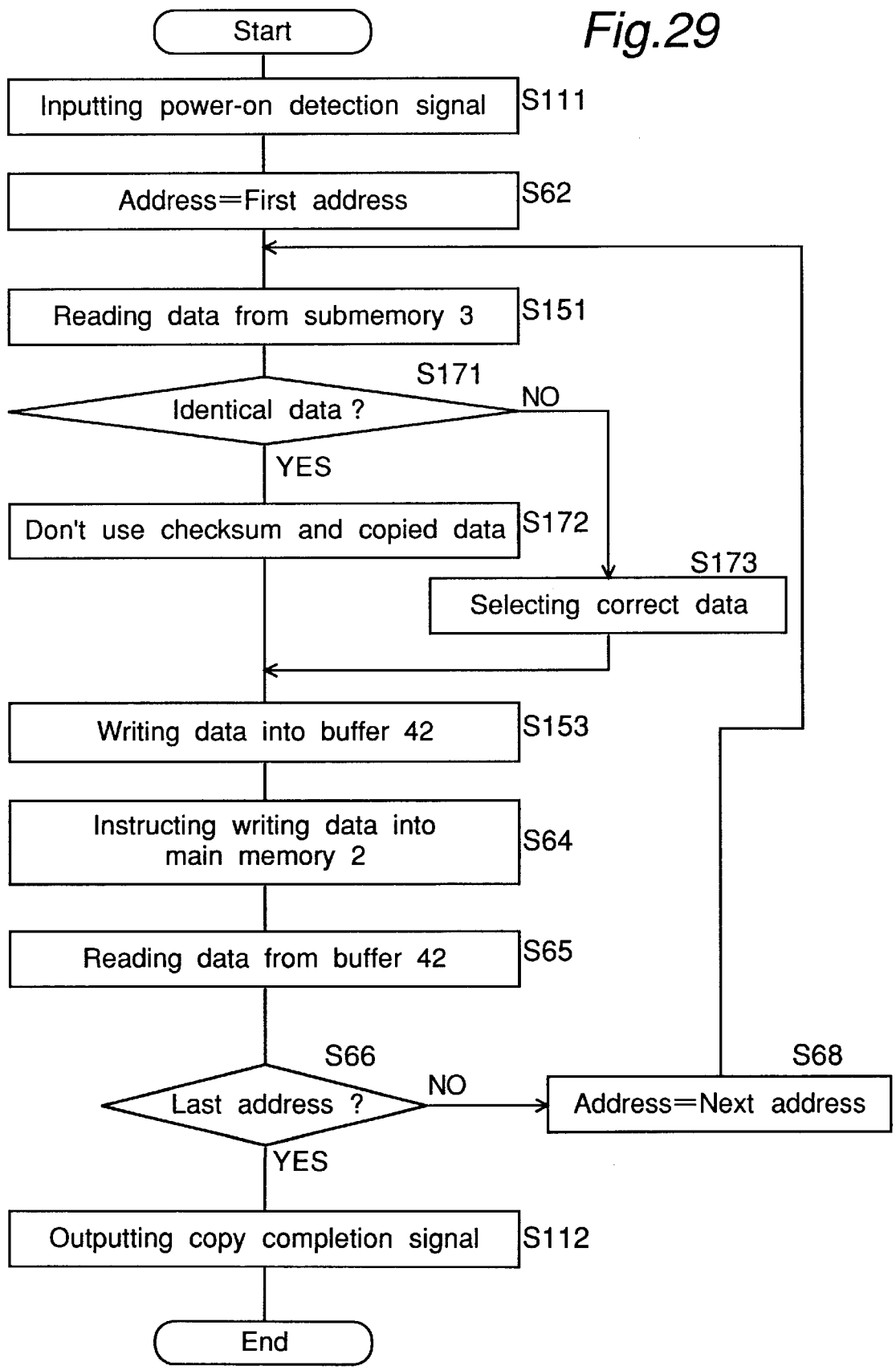

FIG. 29 is a flowchart illustrating an example of operation of the control section 101 in FIG. 26 at the time when the power is turned on. In FIG. 29, steps as in FIG. 25 except replacing the numeral of the control section are shown with the same numerals, and their descriptions are omitted from here.

Referring to FIG. 29, after the processing of steps S111, S62, and S151 is performed, in step S171, data-error detector 107 compares the data input from submemory I/F 44 with the copy added to the data to test whether they are the same. If they are the same (YES), then in step S172, data-error detector 107 outputs the data input from submemory I/F into buffer 42 as it is. After that, the processing of steps S64 to S66 and steps S68 and S112 is performed. Then the flow returns to step S155.

If the data are not the same in step S171 (NO), then in step S173, data-error detector 107 judges which of the original data or the copied data added to the original are correct, using the checksum. Then data-error detector 107 output the correct data into buffer 42. The flow then proceeds with step S153.

The above seventh embodiment has been described in the case of modifying the fifth embodiment. Modifications to the third and fourth embodiments for the error correction are similar, so that their descriptions are omitted from here. In the case of modifying the first and second embodiments for error correction, when the host system apparatus copies data stored in the main memory section into the submemory section at the power-off time, the host system apparatus generates and adds a copy and checksum of the data read out from the main memory section. Also, when the host system apparatus copies data stored in the submemory section into the main memory section, the host system apparatus performs the error correction processing for the data read out from the submemory section, using the copy and checksum of the data.

As described above, when copying data stored in the main memory section into the submemory section in the present first to fifth embodiment, the memory card of the present seventh embodiment adds a copy and checksum of the data to write into the submemory section. Also, when writing data stored in the submemory section into the main memory section, the memory card of the present seventh embodiment performs error correction processing for the data, using the copy and the checksum. These means allow the memory card to detect an error in a single bit. However, in the reliability of semiconductors, even an error in a single bit of several megabytes rarely occurs. Therefore, the memory card of the present embodiment improves the reliability of data stored in the main memory section, in addition to each advantage of the first to fifth embodiments. Further, the construction of the memory card can be made simpler than the one using a Hamming codes, so that the processing speed of performing error correction of data can be made faster.

Eighth Embodiment

The above first to seventh embodiments copy data stored in the main memory section into the submemory section without data compression. However, the copying can be made with data compression. A memory card constructed for this purpose is an eighth embodiment of the present invention. In this eighth embodiment, the above sixth embodiment is taken for the modification.

A block diagram illustrating an example of memory cards in the eight embodiment is the same as FIG. 15 except the control section 73 being replaced with a control section 111 and the memory card 75 being replaced with a memory card 115. Therefore, the block diagram of memory card 115 of the present embodiment is omitted from here, and the construction of the present embodiment is described in conjunction with FIG. 15.

Memory card 115 comprises a main memory section 2, a submemory section 3, a secondary battery 71, and a power switching section 72, a control section 111, and a clock generator 74. Main memory section 2 and submemory section 3 are connected to a control section 111. Main memory section 2 and control section 111 are connected to host system apparatus 76. Clock generator 74 is connected to control section 111. Power switching section 72 is connected to main memory section 2, submemory section 3, control section 111, and clock generator 74 to supply power thereto. Further, power switching section 72 is connected to host system apparatus 76. Secondary battery 71 is connected to power switching section 72 and the ground.

In the above construction, when detecting a power-off condition in host system apparatus 76, power switching section 72 operates by secondary battery 71 as the power source and supplies power to main memory section 2, submemory section 3, control section 111, and clock generator 74, using secondary battery 71. At the same time, power switching section 72 outputs a predetermined power-off detection signal into control section 111 and clock generator 74.

When receiving the power-off detection signal, clock generator 74 generates a clock signal to output into control section 111. When receiving the power-off detection signal, control section 111 operates based on the clock signal input from clock generator 74 and copies all the data stored in main memory section 2 into submemory section 3, corresponding to addresses of main memory section 2.

At that time, control section 111 generates an ECC and adds it to the data read out from main memory section 2 and further compresses the ECC-added data to write into submemory section 3. After finishing the processing that copies all the data stored in main memory section 2 into submemory section 3, control section 111 outputs a copy completion signal that indicates the completion of copying into clock generator 74. When receiving the copy completion signal, clock generator 74 stops generating and outputting the clock signal.

Also, when detecting a power-on condition in host system apparatus 76, power switching section 72 operates by the power provided by host system apparatus 76, supplies power provided by host system apparatus 76 to main memory section 2, submemory section 3, control section 111, and clock generator 74, and charges secondary battery 71. At the same time, power switching section 72 outputs a predetermined power-on detection signal into control section 111 and clock generator 74.

When receiving the power-on detection signal, clock generator 74 generates a clock signal to output into control section 111. When receiving the power-on detection signal, control section 111 operates based on the clock signal input from clock generator 74 and reads out the data and added ECC stored in submemory section 3. Further, control section 111 decompresses the data and the added ECC. Then control section 111 verifies whether the data is correct or not using the read ECC. If there are some errors in the data, control section 111 performs error correction processing for correcting the errors.

Control section 111 writes the data that has undergone the above decompression and error correction processing into main memory section 2 to perform decompression and error correction for all the data stored in submemory section 3 and to copy into main memory section 2. Further, when finishing copying into main memory section 2, control section ill outputs a copy completion signal into clock generator 74 and host system apparatus 76. When receiving the copy completion signal, clock generator 74 stops generating and outputting the clock signal. After receiving the copy completion signal, host system apparatus 76 uses memory card 115 as a conventional memory card for reading and writing data from and into main memory section 2.

Figure 30:
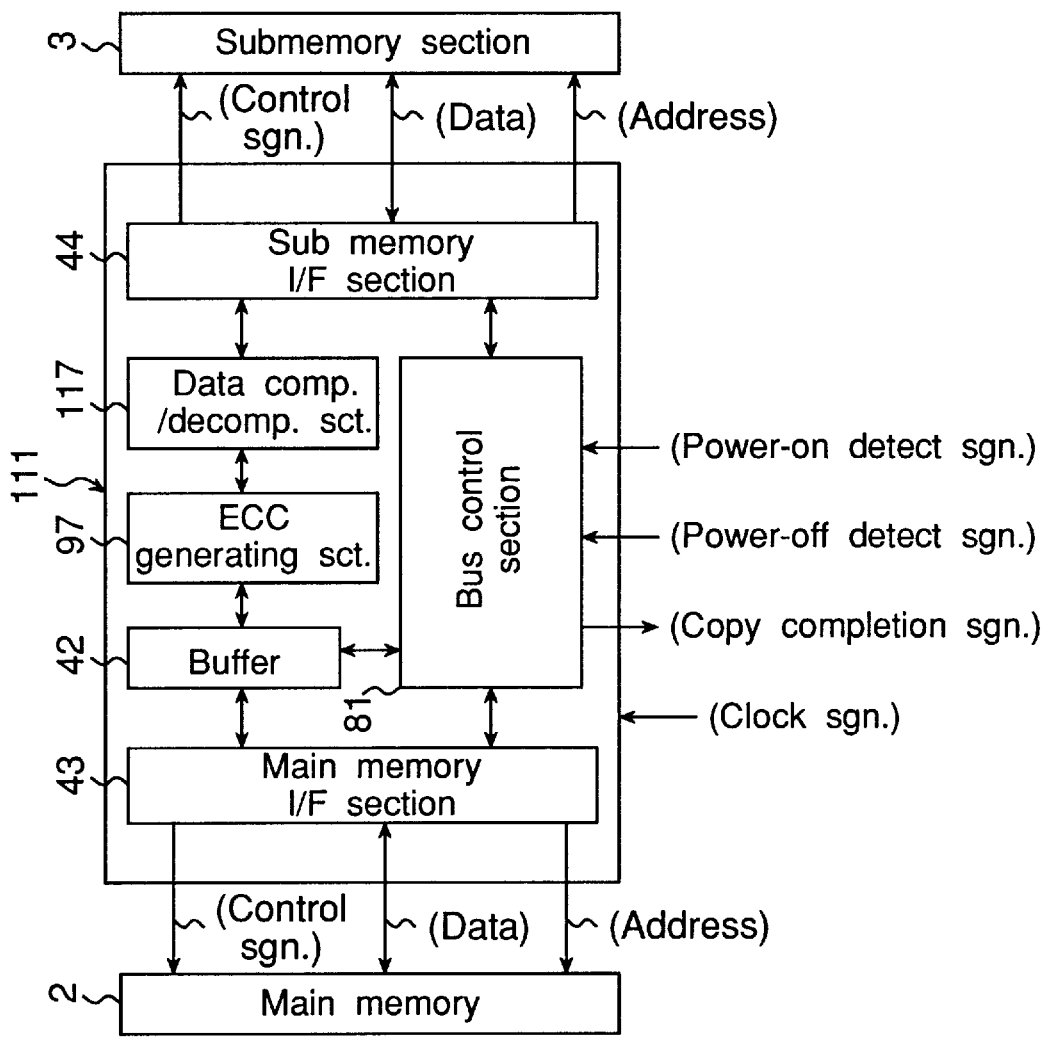
FIG. 30 is a block diagram illustrating an example of the control section in memory cards of an eighth embodiment.

FIG. 30 is a block diagram illustrating an example of the control section 111. The same components as in FIG. 23 are denoted by the same numerals, and their descriptions are omitted from here. Only the components different from those in FIG. 23 are described here.

FIG. 30 differs from FIG. 23 as follows. A data compression/decompression section 117 is installed between the ECC generator 97 and the submemory I/F 44 in FIG. 23. The control section 91 in FIG. 23 is now the control section 111. In FIG. 30, ECC generator 97 is connected to submemory I/F 44 through data compression/decompression section 117.

Data compression/decompression section 117 compresses the ECC-added data output from ECC generator 97 by a predetermined method to output into submemory I/F 44. Also, data compression/decompression section 117 decompresses the ECC-added data output from submemory I/F 44 by a predetermined method to output into ECC generator 97. Methods of compressing and decompressing data are publicly known, so that their descriptions are omitted from here.

An ECC is added to the data output into submemory I/F 44 from buffer 42, when the data passes through ECC generator 97. The ECC-added data is compressed by a predetermined method, when the data passes through data compression/decompression section 117. Submemory I/F 44 writes the compressed data into submemory section 3, corresponding to the addresses at which the data has been stored. Also, when the data read out from submemory section 3 and output from submemory I/F 44 passes through data compression/decompression section 117, the data undergoes the decompression processing. Then, when the data passes through ECC generator 97, the data undergoes the error correction processing. Then the data is written into buffer 42.

Figure 31:
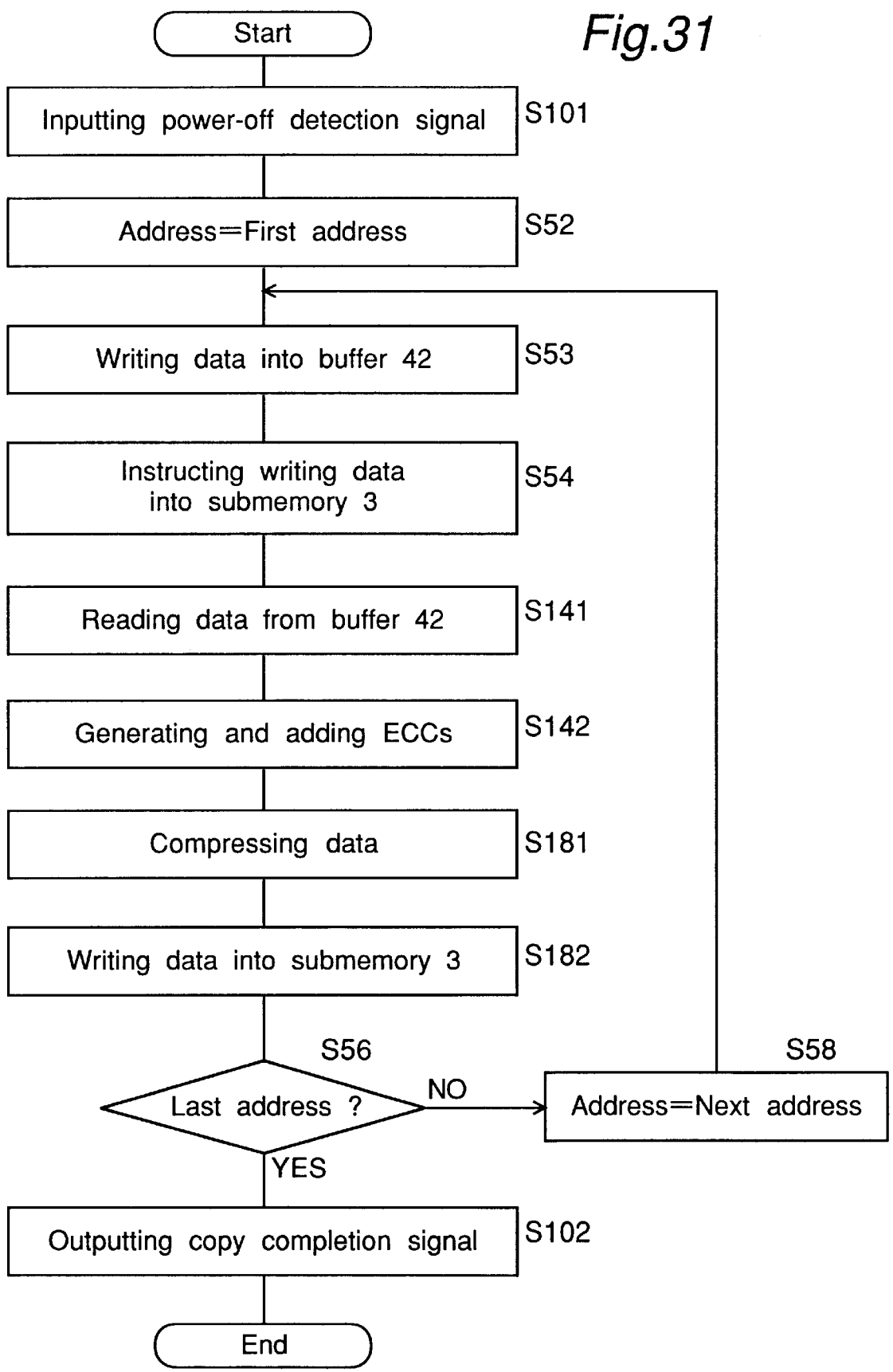
FIG. 31 is a flowchart illustrating an example of operation of the control section 111 in FIG. 30 at the time when the power is turned off.

FIG. 31 is a flowchart illustrating an example of operation of the control section 111 in FIG. 30 at the time when the power is turned off. In FIG. 31, the same steps as in FIG. 24 except replacing the numeral of the control section are shown with the same numerals, and their descriptions are omitted from here.

Referring to FIG. 31, after the processing of step S101, steps S52 to S54, and steps S141 and S142 is performed, in step S181, data compression/decompression section 117 compresses the data output from buffer 42. In step S182, submemory I/F 44 writes the data compressed by data compression/decompression section 117 into submemory section 3, corresponding to address of main memory section 2. Then the processing of steps S56, S58, and S102 is performed.

FIG. 32 is a flowchart illustrating an example of operation of the control section 111 in FIG. 30 at the time when the power is turned on. In FIG. 32, the same steps as in FIG. 25 except replacing the numeral of the control section are shown with the same numerals, and their descriptions are omitted from here.

Referring to FIG. 32, after the processing of steps S111, S62, and S151 is performed, in step S191, data compression/decompression section 117 decompresses the data output from submemory I/F 44 by a predetermined method. Then, in step S192, ECC generator 97 performs error correction for the data decompressed by data compression/decompression section 117, using the ECC added to the data. Next, the processing of step S153, steps S64 to S66, and steps S68 and S112 is performed. After the processing of step S68, the flow returns to step S151.

The above eighth embodiment has been described in the case of modifying the sixth embodiment. In the case of modifying the first and second embodiments for data compression and decompression, when the host system apparatus copies data stored in the main memory section into the submemory section at the power-off time, the host system apparatus compresses the data read out from the main memory section. Also, when the host system apparatus copies data stored in the submemory section into the main memory section, the host system apparatus decompresses the data read out from the submemory section.

On the other hand, in the case of modifying the third to fifth embodiments for data compression and decompression, buffer 42 is connected to submemory I/F 44 through data compression/decompression section 117. When data stored in the main memory section is copied into the submemory section, data compression/decompression section 117 compresses the data output from buffer 42 to output the compressed data into submemory I/F 44. Also, when data stored in the submemory section is copied into the main memory section, data compression/decompression section 117 decompresses the data output from submemory I/F 44 to output the decompressed data into buffer 42.

Further, in the case of modifying the seventh embodiment for data compression and decompression, data-error detector 107 is connected to submemory I/F 44 through data compression/decompression section 117. When data stored in the main memory section is copied into the submemory section, data compression/decompression section 117 compresses the extended data having the data copy and checksum added by data-error detector 107 to output the compressed data into submemory I/F 44. Also, when data stored in the submemory section is copied into the main memory section, data compression/decompression section 117 decompresses the data output from submemory I/F 44 to output the decompressed data into data-error detector 107.

As described above, when copying data stored in the main memory section into the submemory section in the present first to seventh embodiment, the memory card of the present eighth embodiment compresses the data to write into the submemory section. Also, when writing data stored in the submemory section into the main memory section, the memory card of the present eighth embodiment performs decompression processing for the data. These means can make the memory size of the submemory section smaller than that of the main memory section, in addition to each advantage of the first to seventh embodiments. Therefore, costs can be reduced.

Ninth Embodiment

The above first to eighth embodiments copy data stored in the main memory section into the submemory section without data encipherment. However, the copying can be made with data encipherment. A memory card constructed for that purpose is a ninth embodiment of the present invention. In this ninth embodiment, the above eighth embodiment is taken for the modification. A block diagram illustrating an example of memory cards in the ninth embodiment is the same as FIG. 15 except the control section 73 being replaced with a control section 121 and the memory card 75 being replaced with a memory card 125. Therefore, the block diagram of memory card 125 of the present embodiment is omitted from here, and the construction of the present embodiment is described in conjunction with FIG. 15.

Memory card 125 comprises a main memory section 2, a submemory section 3, a secondary battery 71, and a power switching section 72, a control section 121, and a clock generator 74. Main memory section 2 and submemory section 3 are connected to a control section 121. Main memory section 2 and control section 121 are connected to host system apparatus 76. Clock generator 74 is connected to control section 121. Power switching section 72 is connected to main memory section 2, submemory section 3, control section 121, and clock generator 74 to supply power thereto. Further, power switching section 72 is connected to host system apparatus 76. Secondary battery 71 is connected to power switching section 72 and the ground.

In the above construction, when detecting a power-off condition in host system apparatus 76, power switching section 72 operates by secondary battery 71 as the power source and supplies power to main memory section 2, submemory section 3, control section 121, and clock generator 74, using secondary battery 71. At the same time, power switching section 72 outputs a predetermined power-off detection signal into control section 121 and clock generator 74.

When receiving the power-off detection signal, clock generator 74 generates a clock signal to output into control section 121. When receiving the power-off detection signal, control section 121 operates based on the clock signal input from clock generator 74 and copies all the data stored in main memory section 2 into submemory section 3, corresponding to addresses of main memory section 2.

At that time, control section 121 enciphers the data read out from main memory section 2, generates an ECC and adds it to the enciphered data, and further compresses the ECC-added data to write into submemory section 3. After finishing the above processing that copies all the data stored in main memory section 2 into submemory section 3, control section 121 outputs a copy completion signal that indicates the completion of copying into clock generator 74. When receiving the copy completion signal, clock generator 74 stops generating and outputting the clock signal.

Also, when detecting a power-on condition in host system apparatus 76, power switching section 72 operates by the power provided by host system apparatus 76, supplies power provided by host system apparatus 76 to main memory section 2, submemory section 3, control section 121, and clock generator 74, and charges secondary battery 71. At the same time, power switching section 72 outputs a predetermined power-on detection signal into control section 121 and clock generator 74. After that, host system apparatus 76 outputs a password into main memory section 2 at a predetermined address.

When receiving the power-on detection signal, clock generator 74 generates a clock signal to output into control section 121. When receiving the power-on detection signal, control section 121 operates based on the clock signal input from clock generator 74 and tests whether the password input to the predetermined address of main memory section 2 agrees with a password set in control section 121. If the two passwords do not agree with each other, then control section 121 does not read out data stored in submemory section 3.

If the two passwords agree with each other, then control section 121 reads out the data and added ECC stored in submemory section 3. Further, control section 121 decompresses the data and the added ECC. Then control section 121 verifies whether the data is correct or not using the read ECC. If there are some errors in the data, control section 121 performs error correction processing for correcting the errors. Next, control section 121 deciphers the data that has undergone the decompression and error-correction processing to write the deciphered data into main memory section 2. In this way, control section 121 performs the decompression, error-correction, and decipherment processing for all the data that has been stored in submemory section 3 to copy into main memory section 2. At that time, the password written into main memory section 2 by host system apparatus 76 is deleted, since the data read out from submemory section 3 is overwritten.

When finishing copying into main memory section 2, control section 121 outputs a copy completion signal into clock generator 74 and host system apparatus 76. When receiving the copy completion signal, clock generator 74 stops generating and outputting the clock signal. After receiving the copy completion signal, host system apparatus 76 uses memory card 125 as a conventional memory card for reading and writing data from and into main memory section 2.

Figure 33:
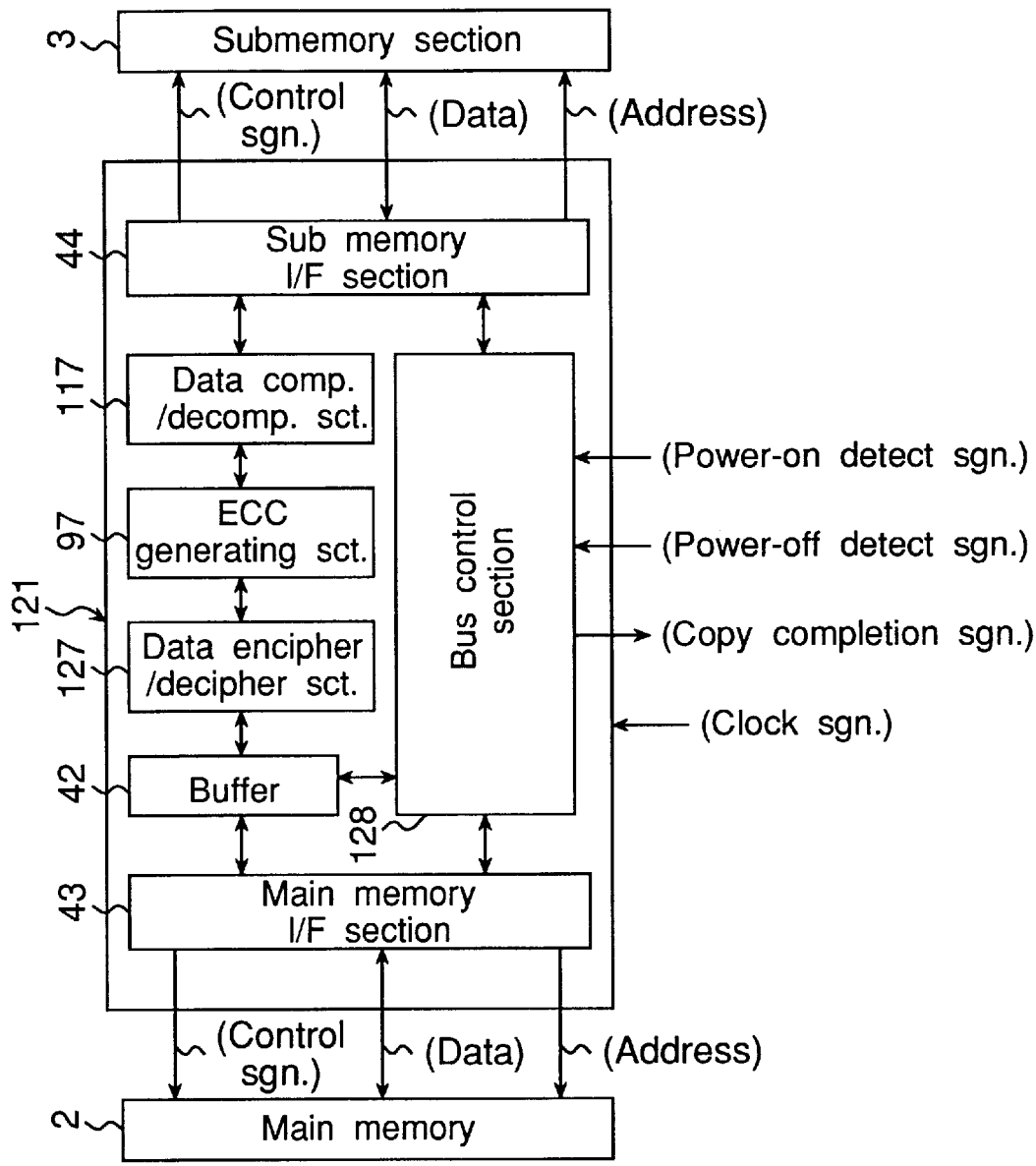
FIG. 33 is a block diagram illustrating an example of the control section in memory cards of a ninth embodiment.

FIG. 33 is a block diagram illustrating an example of the control section 121. The same components as in FIG. 30 are denoted by the same numerals, and their descriptions are omitted from here. Only the components different from those in FIG. 30 are described here.

FIG. 33 differs from FIG. 30 as follows. A data encipherment/decipherment section 127 is installed between the buffer 42 and the ECC generator 97 in FIG. 30. The bus controller 81 in FIG. 30 is now a bus controller 128. The control section 111 in FIG. 30 is now the control section 121.

Referring to FIG. 33, control section 121 comprises buffer 42, main memory I/F 43, submemory I/F 44, ECC generator 97, data compression/decompression section 117, data encipherment/decipherment section 127, and bus controller 128. Bus controller 128 is connected to buffer 42, main memory I/F 43, and submemory I/F 44. Buffer 42 is connected to ECC generator 97 through data encipherment/decipherment section 127.

Bus controller 128 controls buffer 42, main memory I/F 43, and submemory I/F 44 based on the power-off detection signal and power-on detection signal output from power switching section 72 and depending on whether the password input from host system apparatus 76 to the predetermined address of main memory section 2 at the power-on time agrees with a preset password. Main memory I/F 43 reads out data stored in main memory section 2 to write into buffer 42, depending on a control signal output from bus controller 128. Also, main memory I/F 43 reads out data stored in buffer 42 to write into main memory section 2.

Submemory I/F 44 reads out data stored in submemory section 3 to write into buffer 42 through data compression/decompression section 117, ECC generator 97, and data encipherment/decipherment section 127, depending on a control signal output from bus controller 128. Also, submemory I/F 43 reads out data stored in buffer 42 to write into submemory section 3 through data encipherment/decipherment section 127, ECC generator 97, and data compression/decompression section 117.

Data encipherment/decipherment section 127 enciphers the data output from buffer 42 by a predetermined method to output the enciphered data into ECC generator 97. Also, data encipherment/decipherment section 127 deciphers the data output from ECC generator 97 by a predetermined method to output the deciphered data into buffer 42. Methods of data encipherment and decipherment are publicly known, so that their descriptions are omitted from here.

In this way, the data output into submemory I/F 44 from buffer 42 is enciphered, when the data passes through data encipherment/decipherment section 127. Then an ECC is added to the data, when the data passes through ECC generator 97. The ECC-added data is compressed by a predetermined method, when the data passes through data compression/decompression section 117. Submemory I/F 44 writes the compressed data into submemory section 3, corresponding to the addresses at which the data has been stored. Also, when the passwords agree with each other, and data read out from submemory section 3 and output from submemory I/F 44 passes through data compression/decompression section 117, the data undergoes the decompression processing. Then when the data passes through ECC generator 97, the data undergoes the error correction processing. Then, when the data passes through data encipherment/decipherment section 127, the data is deciphered to be written into buffer 42.

Figure 34:
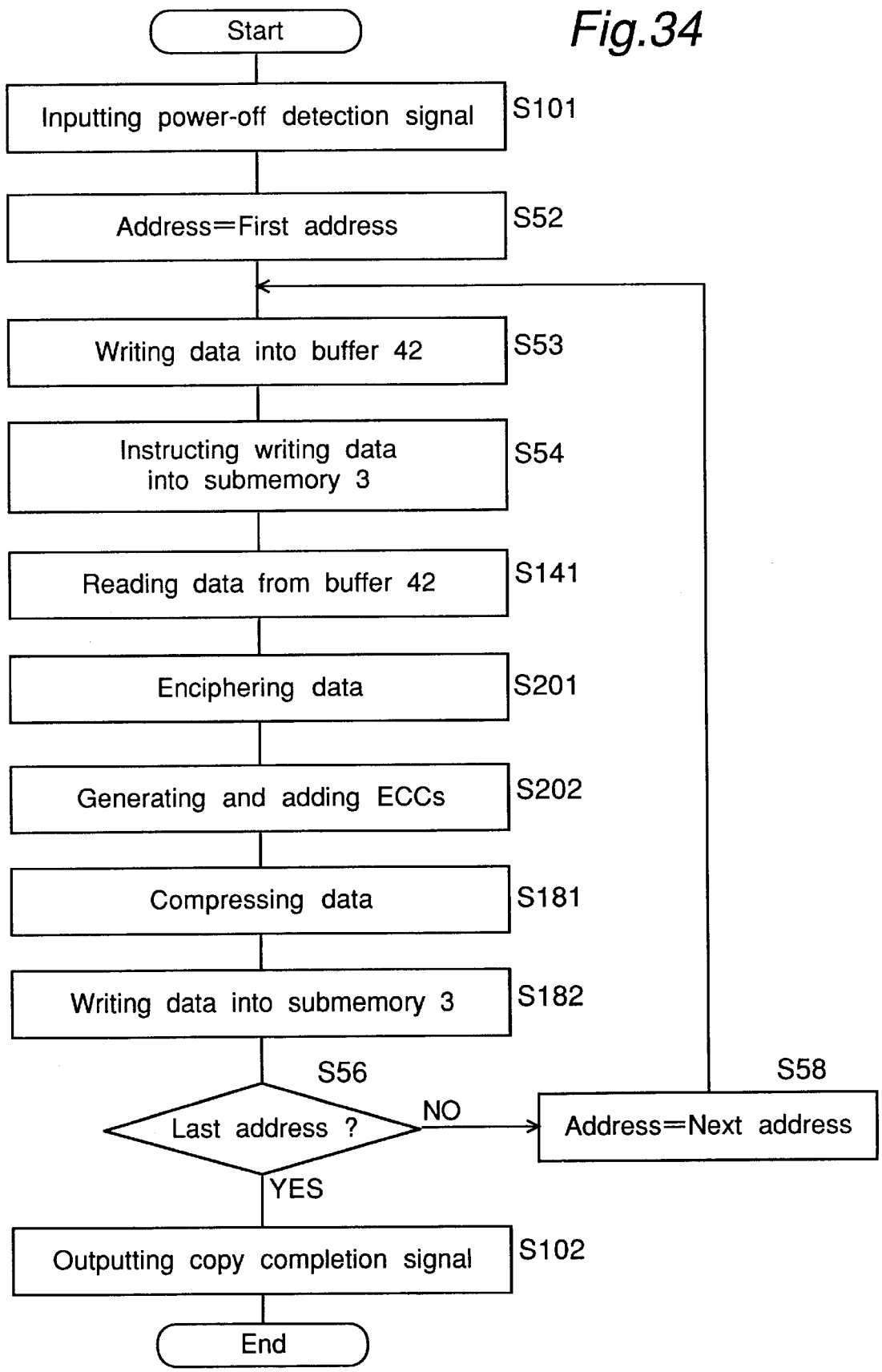
FIG. 34 is a flowchart illustrating an example of operation of the control section 121 in FIG. 33 at the time when the power is turned off.

FIG. 34 is a flowchart illustrating an example of operation of the control section 121 in FIG. 33 at the time when the power is turned off. In FIG. 34, the same steps as in FIG. 31 except replacing the numerals of the control section and the bus controller are shown with the same numerals, and their descriptions are omitted from here.

Referring to FIG. 34, after the processing of step S101, steps S52 to S54, and step S141 is performed, in step S201, data encipherment/decipherment section 127 enciphers the data output from buffer 42. In step S202, ECC generator 97 generates and adds an ECC for the data output from data encipherment/decipherment section 127. Next, the processing of steps S181, S182, S56, S58, and S102 is performed.

Figure 35:
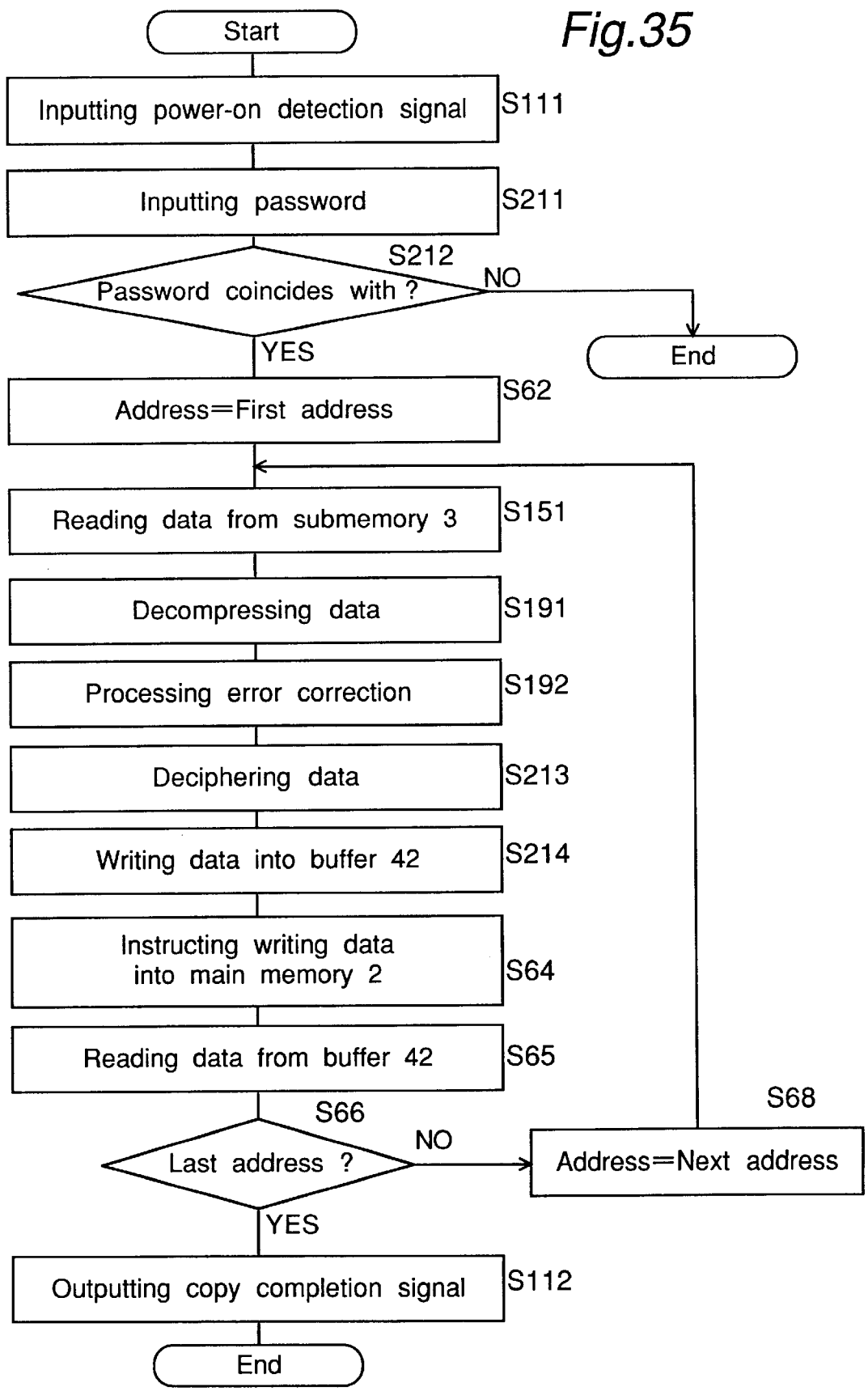

FIG. 35 is a flowchart illustrating an example of operation of the control section 121 in FIG. 33 at the time when the power is turned on. In FIG. 35, the same steps as in FIG. 32 except replacing the numerals of the control section and the bus controller are shown with the same numerals, and their descriptions are omitted from here.

Referring to FIG. 35, after the processing of step S111, in step S211, host system apparatus 76 writes a password at a predetermined address. In step S212, bus controller 128 tests whether the password written into the predetermined address of main memory section 2 agrees with a password set in bus controller 128. If the two passwords do not agree with each other (NO), then the present flow terminates.

If, in step S212, the passwords agree with each other (YES), then the processing of steps S62, S151, S191, and S192 is successively performed. In step S213, data encipherment/decipherment section 127 deciphers the data that has undergone error correction in ECC generator 97. In step S214, the deciphered data is written into buffer 42. After that, the processing of steps S64 to S66 and steps S68 and S112 is performed. After the processing of step S68, the flow returns to step S151.

The above ninth embodiment has been described in the case of modifying the eighth embodiment. In the case of modifying the first and second embodiments for data encipherment and decipherment, when the host system apparatus copies data stored in the main memory section into the submemory section at the power-off time, the host system apparatus enciphers the data read out from the main memory section. Also, when the host system apparatus verifies the password and copies data stored in the submemory section into the main memory section, the host system apparatus deciphers the data read out from the submemory section.

On the other hand, in the case of modifying the third to fifth embodiments for data encipherment and decipherment, buffer 42 is connected to submemory I/F 44 through data encipherment/decipherment section 127. When data stored in the main memory section is copied into the submemory section, data encipherment/decipherment 127 enciphers the data output from buffer 42 to output the enciphered data into submemory I/F 44. Also, when the passwords agree with each other at the power-on time, and when data stored in the submemory section is copied into the main memory section, data encipherment/decipherment section 117 deciphers the data output from submemory I/F 44 to output the deciphered data into buffer 42.

Further, in the case of modifying the sixth embodiment for data encipherment and decipherment, buffer 42 is connected to ECC generator 97 through data encipherment/decipherment section 127. When data stored in the main memory section is copied into the submemory section, data encipherment/decipherment section 127 enciphers the data output from buffer 42. ECC generator adds an ECC to the enciphered data. The ECC added data is written into the submemory section through submemory I/F 44. Also, when the passwords agree with each other, and when data stored in the submemory section is copied into the main memory section, data encipherment/decipherment section 127 deciphers the data that has undergone error correction in ECC generator 97 to output the deciphered data into buffer 42. The modification of the seventh embodiment is the same as the modification of the sixth embodiment except ECC generator 97 is replaced with data-error detector 107.

As described above, when copying data stored in the main memory section into the submemory section in the present first to eighth embodiment, the memory card of the present ninth embodiment enciphers the data to write into the submemory section. Also, when writing data stored in the submemory section into the main memory section, the memory card of the present ninth embodiment verifies the password. If the password is verified, the memory card reads out data from the submemory section and deciphers the data. These means can secure data written in the memory card, in addition to each advantage of the first to eighth embodiments. Therefore, costs can be reduced.

Tenth Embodiment

A memory card may memorize the addresses of the main memory section at which data is written during the time after the power is turned on and before the power is turned off. Then at the power-off time, the memory card can write only the data stored at the memorized addresses into the submemory section, corresponding to addresses of the main memory section at which the data has been stored. A memory card constructed for this purpose is a tenth embodiment of the present embodiment. In this tenth embodiment, the above fifth embodiment is taken for the modification.

Figure 36:
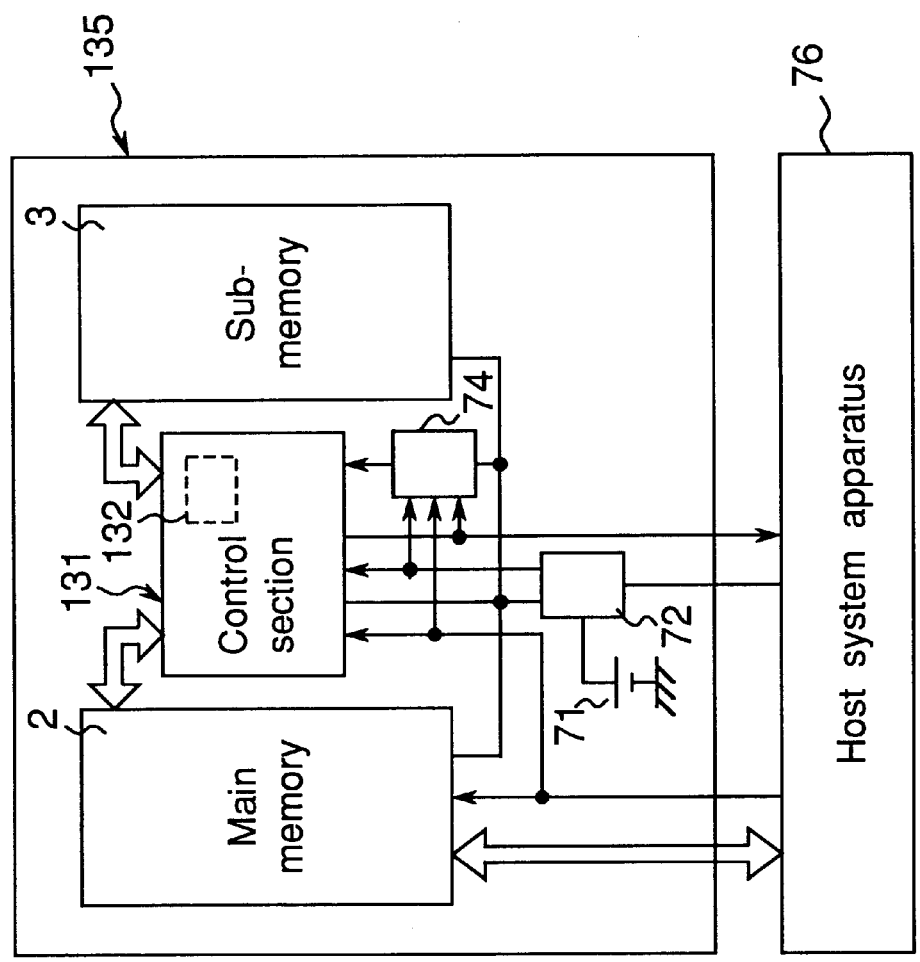
FIG. 36 is a block diagram illustrating an example of memory cards of a tenth embodiment.

FIG. 36 is a block diagram illustrating an example of memory cards of the tenth embodiment. The same components as in FIG. 15 are denoted by the same numerals, and their descriptions are omitted from here. Only the components different from those in FIG. 15 are described here.

FIG. 36 differs from FIG. 15 as follows. A volatile memory 132, called RAM hereafter, is installed in the control section 73 of FIG. 15. The control section 73 in FIG. 15 is now a control section 131. Host system apparatus 76 outputs a write-enable signal /WE into control section 131, when data is written into main memory section 2. The memory card of FIG. 15 is now a memory card 135 with these changes.

Figure 37:
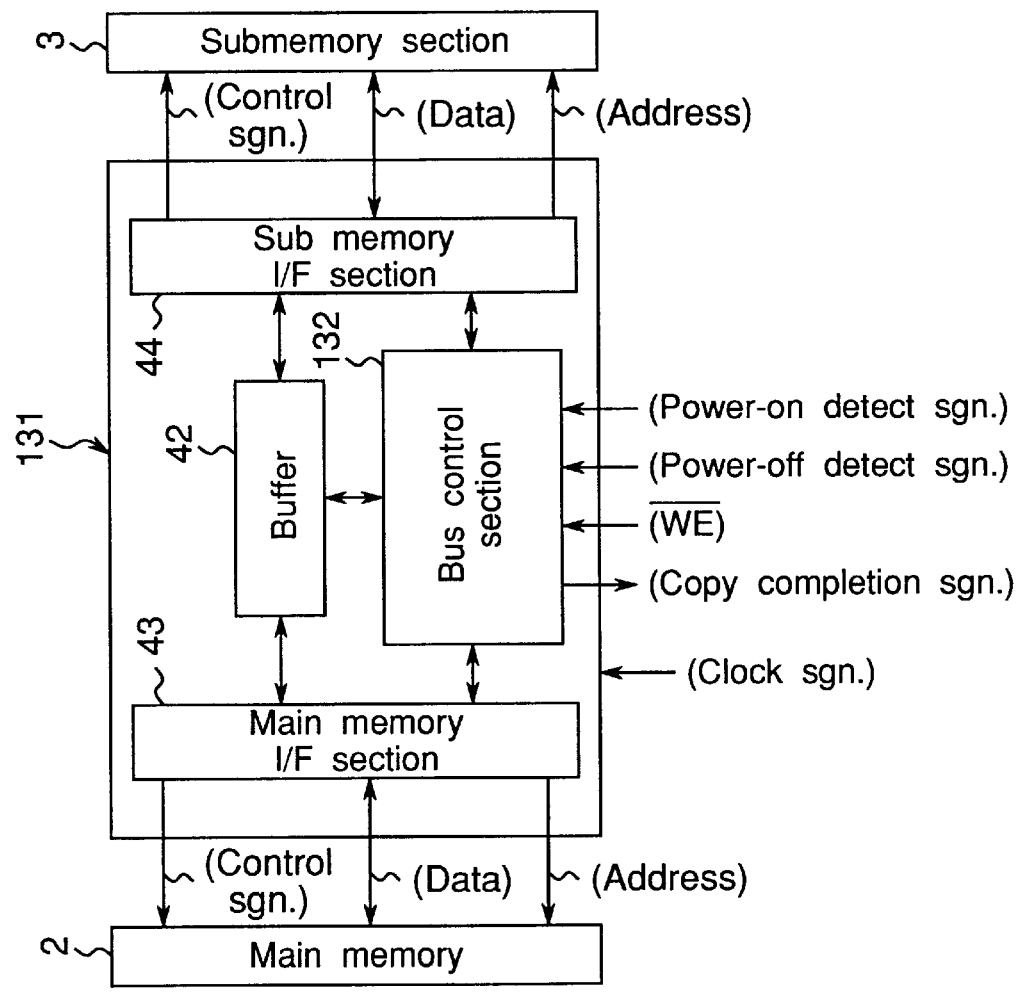
FIG. 37 is a block diagram illustrating an example of the control section in FIG. 36.

FIG. 37 is a block diagram illustrating an example of control section 131 in FIG. 36. The same components as in FIG. 18 are denoted by the same numerals, and their descriptions are omitted from here. Only the components different from those in FIG. 18 are described here.

FIG. 37 differs from FIG. 18 as follows. The control section 73 in FIG. 18 is now a control section 131. The bus controller in FIG. 18 is now a bus controller 137. Bus controller 137 has a RAM 132. A write-enable signal WE/ is input from host system apparatus 76 to bus controller 137.

Referring to FIG. 37, control section 131 comprises bus controller 137, buffer 42, main memory I/F 43, and submemory I/F 44. Bus controller 137 is connected to buffer 42, main memory I/F 43, and submemory I/F 44. Buffer 42 is connected to main memory I/F 43 and submemory I/F 44.

Bus controller 137 controls buffer 42, main memory I/F 43, and submemory I/F 44 based on the power-off detection signal and power-on detection signal output from power switching section 72. Main memory I/F 43 reads out data stored in main memory section 2 to write into buffer 42, depending on a control signal output from bus controller 137. Also, main memory I/F 43 reads out data stored in buffer 42 to write into main memory section 2. Submemory I/F 44 reads out data stored in submemory section 3 to write into buffer 42, depending on a control signal output from bus controller 127. Also, submemory I/F 44 reads out data stored in buffer 42 to write into submemory section 3.

When writing data into main memory section 2, host system apparatus 76 outputs a write-enable signal WE/ into bus controller 137. When receiving the write-enable signal output from host system apparatus 76, bus controller 137 detects the addresses at which host system apparatus 76 has written data, and writes the addresses into built-in RAM 132. When receiving the power-off detection signal output from power switching section 72, bus controller 137 reads the address data from RAM 132 to write only the data that is stored at the addresses into submemory section 3, corresponding to addresses of main memory section 2. When receiving the power-on detection signal, bus controller 137 performs the same operation of the bus controller 81 in FIG. 18.

Figure 38:
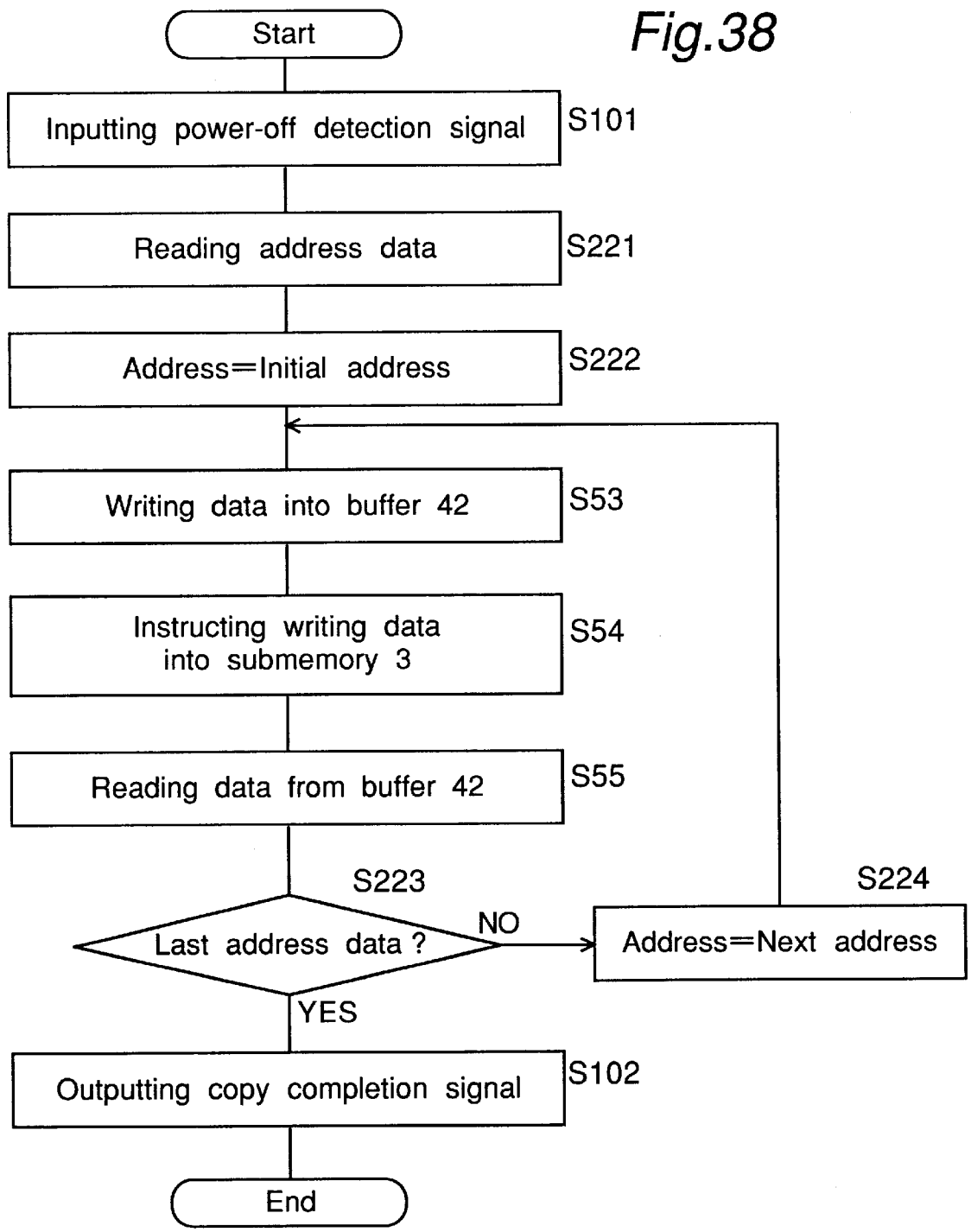
FIG. 38 is a flowchart illustrating an example of operation of the control section 131 in FIG. 37 at the time when the power is turned off.

FIG. 38 is a flowchart illustrating an example of operation of the control section 131 in FIG. 37 at the time when the power is turned off. In FIG. 38, the same steps as in FIG. 19 except replacing the numerals of the control section and the bus controller are shown with the same numerals, and their descriptions are omitted from here.

Referring to FIG. 38, after the processing of step S101 is performed, in step S221, bus controller 137 read out address data from RAM 132. In step S222, bus controller 137 selects from the address data the first address of main memory section 2 from which the data is to be read out and instructs buffer 42 and main memory I/F to read out data stored at the selected address of main memory section 2 to write into buffer 42.

Next, after the processing steps S53 to S55, in step S223, bus controller 137 tests whether the address selected from the address data read out from RAM 132 is the last address stored in RAM 132. If it is (YES), then the processing of step S102 is performed, and the flow terminates. If, in step S223, the read address is not the last address (NO), that is, there are addresses left in the address data, then the flow proceeds with step S224. In step S224, bus controller 137 selects from the address data the next address of main memory section 2 from which data is to be read out and instructs buffer 42 and main memory I/F to read out data stored at the selected address of main memory section 2 to write into buffer 42. The flow then returns to step S53.

A flowchart illustrating an example of operation of the control section 131 at the time when the power is turned on is the same as FIG. 20 except the numerals of the control section and the bus controller being replaced. Therefore, the flowchart is omitted from here.

The above tenth embodiment has been described in the case of modifying the fifth embodiment. Modifications of the third embodiment and the sixth to ninth embodiments are similar, so that their descriptions are omitted from here. In the case of modifying the first and second embodiments, the RAM 132 is installed in the host system apparatus. Then the operation of control section 131 using the RAM 132 is performed by the host system apparatus.

As described above, in the present first to third embodiments and the fifth to ninth embodiments, the host system apparatus memorizes the addresses of the main memory section at which the host system writes data from the time when the power is turned on until the time when the power is turned off. Then, at the time when the power is turned off, data stored at the memorized addresses is written into the submemory section, corresponding to addresses of the main memory. These means can reduce the time for making a backup of data by copying data stored in the main memory section, in addition to each advantage of the first to third embodiments and the fifth to ninth embodiments. Further the number of times for rewriting into the submemory section can be reduced.

Eleventh Embodiment

Each time when the host system apparatus writes data into the main memory section, the written data may be copied into the submemory section. The host system apparatus may read out data from the submemory section. A memory card constructed for this purpose is an eleventh embodiment of the present invention.

Figure 39:
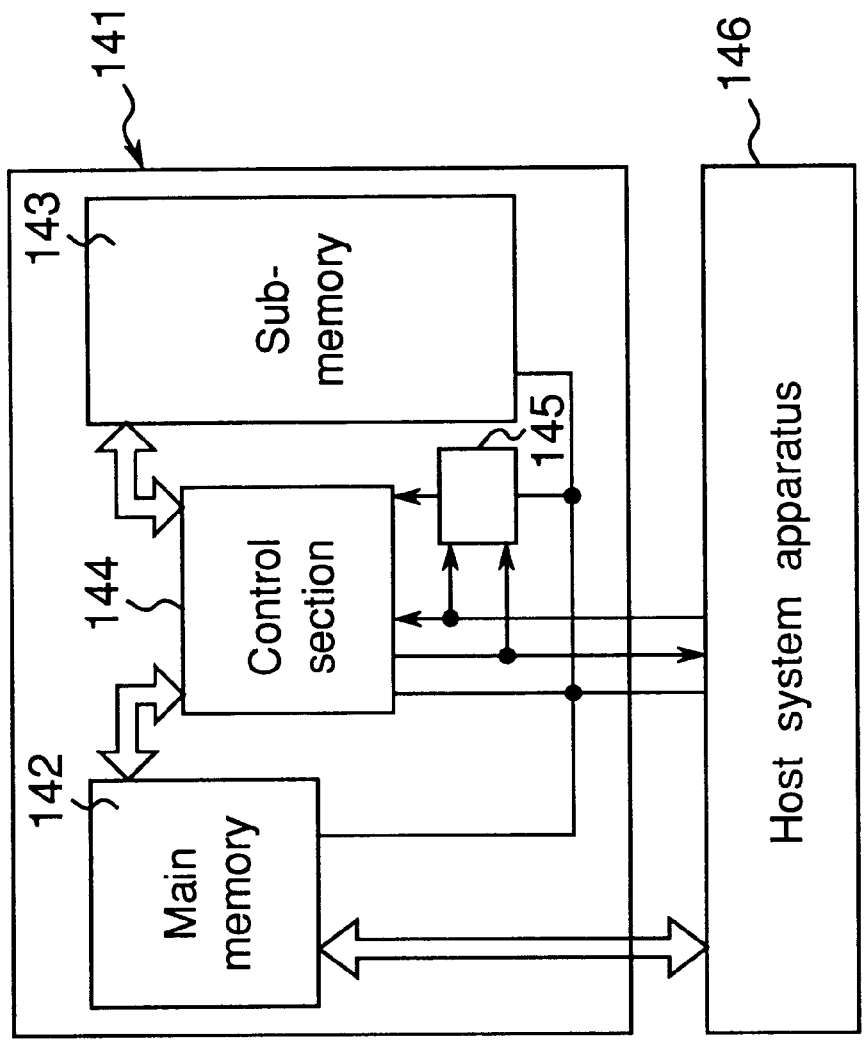
FIG. 39 is a block diagram illustrating an example of memory cards of an eleventh embodiment.

FIG. 39 is a block diagram illustrating an example of memory cards of the eleventh embodiment. Referring to FIG. 39, a memory card 141 comprises a main memory section 142 consisting in SRAM, a submemory section 143 consisting in flash memory, a control section 144 that writes data stored in main memory section 142 into submemory section 143, and a clock generator 145 that generates a clock signal to output into control section 144. Main memory section 142 and submemory section 143 are connected to control section 144. Main memory section 142, submemory section 143, control section 144, and clock generator 145 are connected to host system apparatus 146. Further, clock generator 145 is connected to control section 144.

In the above construction, host system apparatus 146 provides a power supply to memory card 141. Clock generator 145 generates a clock signal to output into control section 144. Control section 144 operates based on the clock signal output from clock generator 145. When storing data in memory card 141, host system apparatus 146 outputs a write-enable signal /WE into main memory section 142, control section 144, and clock generator 145, and stores the data and address data in main memory section 142.

When receiving the write-enable signal /WE, clock generator 145 generates the clock signal to output into control section 144. When receiving the write-enable signal WE/, control section 144 operates based on the clock signal output from clock generator 145 and reads out the data and address data stored in main memory section 141 to write the data into submemory section 143 at an address assigned by host system apparatus 146.

After finishing writing all the data stored in main memory section 142 into submemory section 143, control section 144 outputs a copy completion signal into clock generator 145. When receiving the copy completion signal output from control section 144, clock generator 145 stops generating and outputting the clock signal. Further, when reading out data from memory card 145, host system apparatus 146 reads out the data from submemory section 143.

Figure 40:
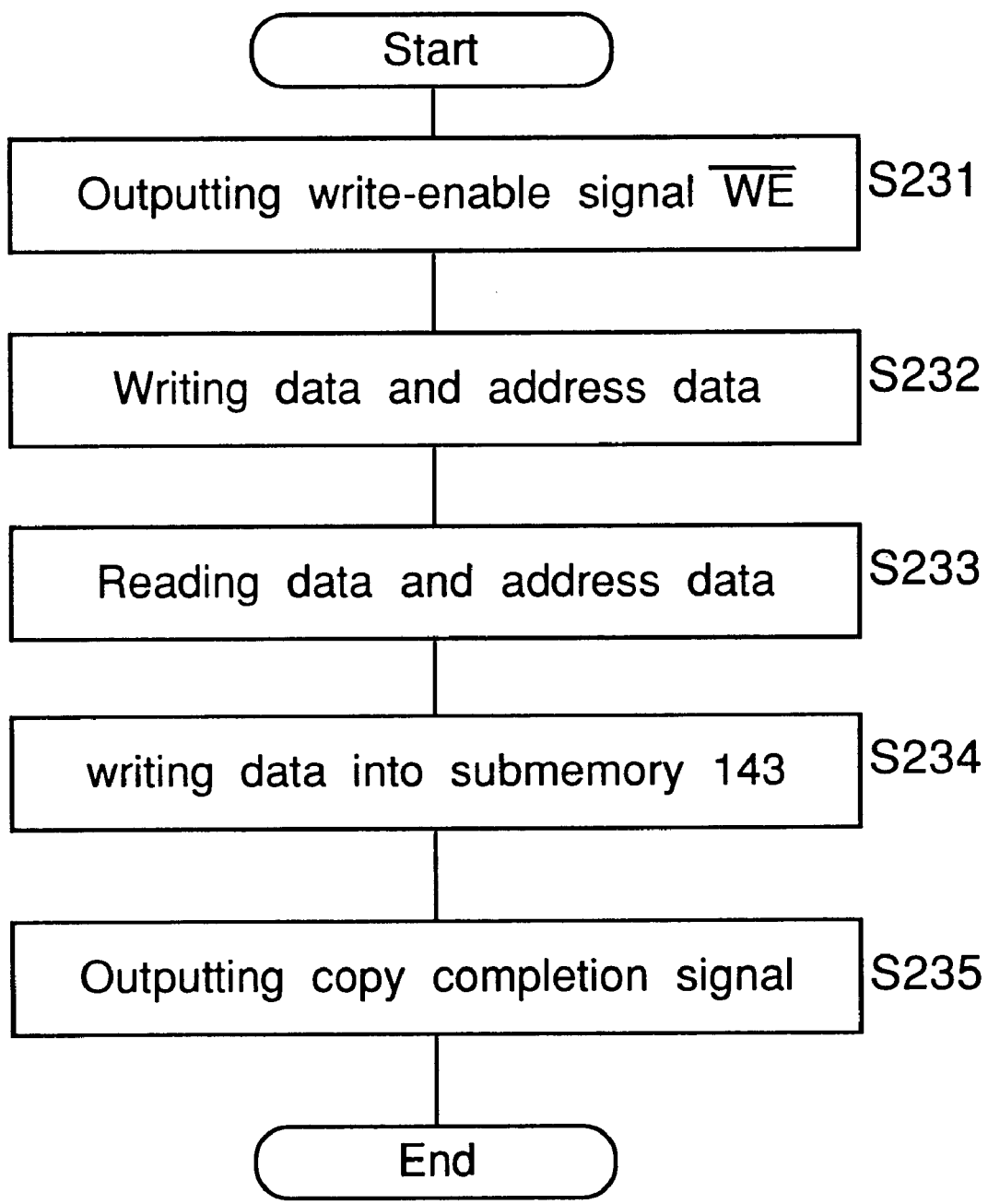
FIG. 40 is a flowchart illustrating an example of operation of the memory card 145 in FIG. 39.
Figure 41:
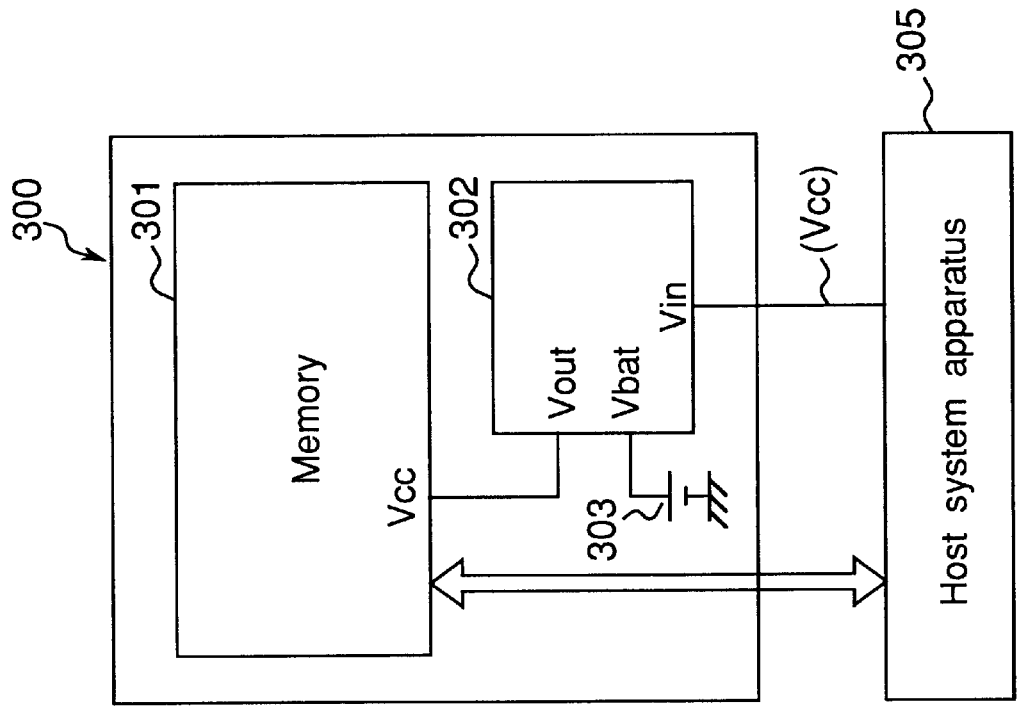
FIG. 41 is a block diagram illustrating an example of prior memory cards.

FIG. 40 is a flowchart illustrating an example of operation of the memory card 145 at the time when host system apparatus 146 reads data out. Referring to FIG. 40, in step S231, host system apparatus 146 outputs the write-enable signal WE/ into main memory section 142, control section 144, and clock generator 145. In step S232, host system apparatus 146 writes the data to be stored in memory card 145 and the address data into main memory section 142. In step S233, control section 144 operates based on the clock signal output from clock generator 145. When receiving the write-enable signal WE/ control section 144 reads out the data and address data stored in main memory section 142.

Next, in step S234, control section 144 writes data stored in main memory section 142 into submemory section 143 at an address indicated by the address data read out from main memory section 142. In step S235, after finishing writing into submemory section 143, control section 144 outputs a copy completion signal into clock generator 145. The flow then terminates.

As described above, in a memory card of the present eleventh embodiment, when data is written by host system apparatus 56, the data is written into main memory section 142. Control section 144 then copies the data written in main memory section 142 into submemory section 143. Also, when data is read out by host system apparatus 146, the data is read out from submemory section 143.

Consequently, a battery for making a backup of data in SRAM is unnecessary. Changes in data that occur in volatile memory during a backup can be reduced, so that incidents of soft errors can be prevented. Further, the operation of copying data between the main memory section and the submemory section is performed in the memory card, so that an increase in the load on the host system apparatus can be prevented. Further, the memory size of the main memory section can be reduced, so that costs can be reduced. A memory card having the performance of memory cards using SRAM can be obtained without requiring a battery for a backup.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A computer system, comprising:

a host system apparatus; and a memory card coupled to said host system apparatus and operated by power supplied from said host system apparatus, said memory card having a main memory including volatile memory and a submemory including flash memory, wherein said host system apparatus is configured to:

when the power is turned off, copy data stored in the main memory into said submemory at addresses corresponding to addresses of said main memory; and when the power is turned on, write data stored in said submemory into said main memory at the original addresses.

2. The computer system defined in claim 1, in which said host system apparatus is further configured to:

record the addresses of said main memory at which data have been stored, during the time after the power is turned on and before the power is turned off;

copy data stored in said main memory at the recorded addresses into said submemory, corresponding to original addresses of said main memory, when the power is turned off; and write data stored in said submemory into said main memory at the original addresses.

3. The computer system defined in claim 1, further comprising:

a battery configured as a backup power supply for said main memory; and a power switching section configured to switch between power sources provided by said host system apparatus and by said battery to supply power to said main memory, wherein said power switching section is configured to supply power to said main memory using said battery, when the power provided by said host system apparatus is cut off.

4. The computer system defined in claim 3, said host system is further configured to:

upon writing data in said main memory, write information about time spent for writing the data, and when the power is turned on, read out latest time information stored in said main memory and said submemory to determine which of the data stored in said main memory and the data stored in said submemory to use.

5. The computer system defined in claim 1, wherein said host system apparatus is further configured to:

add an error-correcting code to each data stored in said main memory to write into said submemory, and write data stored in said submemory into said main memory section after performing an error correction procedure using the added error-correcting codes.

6. The computer system defined in claim 1, wherein said host system apparatus is further configured to:

add a copy of the data and a checksum for the data stored in said main memory to write into said submemory, and write data stored in said submemory into said main memory after performing an error correction procedure using the added copy and checksum.

7. The computer system defined in claim 1, wherein said host system apparatus is further configured to:

compress data stored in said main memory to write into said submemory using a predetermined compression method, and decompress data stored in said submemory using a predetermined decompression method to write into said main memory section.

8. The computer system defined in claim 1, wherein said host system apparatus is configured to:

encrypt data stored in said main memory using a predetermined encryption method to write into said submemory, read out data stored in said submemory only if a password input from said host system apparatus agrees with a preset password, and decrypt the read data following a predetermined decryption method to write into said main memory.

9. A memory card for use when coupled to a host system apparatus and operated by power supplied from said host system apparatus, said memory card comprising:

a main memory including volatile memory, a submemory including flash memory, a clock generator configured to generate and output a clock signal, and a control section configured to operate based on said clock signal output from said clock generator and controls to copy data between said main memory and said submemory.

10. The memory card defined in claim 9, wherein said control section is further configured to:

in response to a predetermined power-off signal output from said host system apparatus at a power-off, write all the data stored in said main memory into said submemory at addresses corresponding to original addresses of said main memory; and in response to a predetermined power-on signal output from said host system apparatus at a power-on, write all the data stored in said submemory into said main memory at the original addresses.

11. The memory card defined in claim 9, wherein said control section is further configured to:

in response to a write-enable signal output from said host system apparatus during the writing of data into said main memory, write data stored in said main memory into said submemory at addresses corresponding to original addresses of said main memory; and in response to a predetermined power-on signal output from said host system apparatus at a power-on, write all the data stored in said submemory into said main memory at the original addresses.

12. The memory card defined in claim 9, wherein said control section is further configured to:

in response to a write-enable signal output from said host system apparatus during the writing of data into said main memory, record the addresses of said main memory at which the data are written;

in response to a predetermined power-off signal output from said host system apparatus at a power-off, write data stored at the memorized addresses of said main memory into said submemory section, corresponding to original addresses of said main memory; and in response to a predetermined power-on signal output from said host system apparatus at the power-on, write all the data stored in said submemory into said main memory at the original addresses.

13. The memory card defined in claim 9, further comprising:

a battery for supplying power to said memory card; and a power switching section configured to detect whether power is provided by said host system apparatus or not and to supply power to said memory card by switching between the power provided by said battery and the power provided by said host system apparatus, so that said power switching section supplies power to each section of said memory card using said battery, when the power provided by said host system apparatus is cut off.

14. The memory card defined in claim 13, wherein:

when the power provided by said host system apparatus is cut off, said power switching section is further configured to output a predetermined power-off detection signal into said control section;

when said power-off detection signal is received, said control section is further configured to write all the data stored in said main memory into said submemory at addresses, corresponding to original addresses of said main memory;

when power is provided by said host system apparatus, said power switching section is further configured to supply power to said memory card using the power provided by said host system apparatus and output a predetermined power-on detection signal into said control section; and when said power-on detection signal is received, said control section is further configured to write all the data stored in said submemory into said main memory at the original addresses.

15. The memory card defined in claim 13, wherein:

when power provided by said host system apparatus is cut off, said power switching is further configured to output a predetermined power-off detection signal into said control section;

when a write-enable signal output from said host system apparatus during the writing of data into said main memory is received, said control section is further configured to record the addresses of said main memory at which data are written;

when said power-off detection signal output from said power switching section is received, said control section is further configured to write data stored at the recorded addresses of said main memory into said submemory at addresses corresponding to original addresses of said main memory;

when power is provided by said host system apparatus, said power switching section is further configured to supply power to each section of said memory card using the power provided by said host system apparatus and output a predetermined power-on detection signal into said control section; and when said power-on detection signal is received, said control section is further configured to write all the data stored in said submemory into said main memory at the original addresses.

16. The memory card defined in claim 13, wherein said control section is further configured to:

add an error-correcting code to data stored in said main memory to write into said submemory, and write data stored in said submemory into said main memory after performing an error correction procedure using the added error-correcting codes.

17. The memory card defined in claim 9, wherein said control section is further configured to:

add a copy of the data and a checksum for the data stored in said main memory to write into said submemory, and write data stored in said submemory into said main memory after performing an error correction procedure using the added copy and checksum.

18. The memory card defined in claim 9, wherein said control section is further configured to:

compress data stored in said main memory to write into said submemory using a predetermined compression method, and decompress data stored in said submemory using a predetermined decompression method to write into said main memory.

19. The memory card defined in claim 9, wherein said control section is further configured to:

encrypt data stored in said main memory section following a predetermined encryption method to write into said submemory, read out data stored in said submemory only if a password input from said host system apparatus agrees with a preset password, and decrypt the read data following a predetermined decryption method to write said main memory.

20. The memory card defined in claim 9, wherein:

in response to a write-enable signal output from said host system apparatus, said control section is further configured to write data stored in said memory into said submemory at the addresses indicated by the address data stored in said main memory by said host system apparatus.

* * * * *